United States Patent [19]
Shibayama et al.

[11] Patent Number: 5,668,668
[45] Date of Patent: Sep. 16, 1997

[54] ZOOM LENS WITH FIVE LENS GROUPS

[75] Inventors: Atsushi Shibayama, Tokyo; Masatoshi Suzuki, Ohtawara; Takanori Fujita, Kuroiso, all of Japan

[73] Assignee: Nikon Corporation, Tokyo, Japan

[21] Appl. No.: 613,254

[22] Filed: Mar. 8, 1996

[30] Foreign Application Priority Data

| Mar. 8, 1995 | [JP] | Japan | 7-048339 |
| Mar. 8, 1995 | [JP] | Japan | 7-048340 |
| Mar. 8, 1995 | [JP] | Japan | 7-048341 |
| Feb. 7, 1996 | [JP] | Japan | 8-020930 |

[51] Int. Cl.⁶ ............................................. G02B 15/14
[52] U.S. Cl. ................................. 359/683; 359/684
[58] Field of Search ............................. 359/684, 685, 359/686, 689, 690, 691, 683, 676

[56] References Cited

U.S. PATENT DOCUMENTS

| 4,269,484 | 5/1981 | Laurent | 359/683 |
| 4,634,236 | 1/1987 | Masumoto. | |
| 5,276,553 | 1/1994 | Tatsuno | 359/686 |

FOREIGN PATENT DOCUMENTS

| 57-5012 | 1/1982 | Japan. |
| 64-44908 | 2/1989 | Japan. |

*Primary Examiner*—David C. Nelms
*Assistant Examiner*—John P. Cornely
*Attorney, Agent, or Firm*—Shapiro and Shapiro

[57] ABSTRACT

A zoom lens is composed of a first lens group of a negative refractive power, a second lens group of a positive refractive power and a third lens group of a positive refractive power, in which, in the zooming operation from the wide angle end to the telephoto end, the distance between the first and second lens groups decreases, the distance between the second and third lens groups varies, the distance between the third and fourth lens groups increases, and the distance between the fourth and fifth lens groups decreases.

11 Claims, 51 Drawing Sheets

SPHERICAL ABERRATION
FNO=2.88

0.500

ASTIGMATISM
Y = 21.60

1.000

DISTORTION
Y = 21.60

5.000 (%)

SPHERICAL ABERRATION
FNO=2.87

0.500

ASTIGMATISM
Y = 21.60

1.000

DISTORTION
Y = 21.60

5.000 (%)

SPHERICAL ABERRATION
NA=0.17

0.500

ASTIGMATISM
Y = 21.60

1.000

DISTORTION
Y = 21.60

5.000 (%)

SPHERICAL ABERRATION
NA=0.17

0.500

ASTIGMATISM
Y = 21.60

1.000

DISTORTION
Y = 21.60

5.000 (%)

SPHERICAL ABERRATION
FNO=2.88

0.500

ASTIGMATISM
Y = 21.60

1.000

DISTORTION
Y = 21.60

5.000 (%)

SPHERICAL ABERRATION
FNO=2.87

0.500

ASTIGMATISM
Y = 21.60

1.000

DISTORTION
Y = 21.60

5.000 (%)

SPHERICAL ABERRATION
NA=0.17

0.500

ASTIGMATISM
Y = 21.60

1.000

DISTORTION
Y = 21.60

5.000 (%)

SPHERICAL ABERRATION
NA=0.17

0.500

ASTIGMATISM
Y = 21.60

1.000

DISTORTION
Y = 21.60

5.000 (%)

SPHERICAL ABERRATION
FNO=2.88

0.500

ASTIGMATISM
Y = 21.60

1.000

DISTORTION
Y = 21.60

5.000 (%)

SPHERICAL ABERRATION
FNO=2.87

0.500

ASTIGMATISM
Y = 21.60

1.000

DISTORTION
Y = 21.60

5.000 (%)

SPHERICAL ABERRATION
NA=0.17

0.500

ASTIGMATISM
Y = 21.60

1.000

DISTORTION
Y = 21.60

5.000 (%)

SPHERICAL ABERRATION
NA=0.17

0.500

ASTIGMATISM
Y = 21.60

1.000

DISTORTION
Y = 21.60

5.000 (%)

SPHERICAL ABERRATION
FNO=2.88

0.500

ASTIGMATISM
Y=21.60

1.000

DISTORTION
Y=21.60

5.000 (%)

SPHERICAL ABERRATION
FNO=2.87

0.500

ASTIGMATISM
Y=21.60

1.000

DISTORTION
Y=21.60

5.000 (%)

SPHERICAL ABERRATION
NA=0.17

0.500

ASTIGMATISM
Y=21.60

1.000

DISTORTION
Y=21.60

5.000 (%)

SPHERICAL ABERRATION
NA=0.17

0.500

ASTIGMATISM
Y=21.60

1.000

DISTORTION
Y=21.60

5.000 (%)

SPHERICAL ABERRATION
FNO=2.87

0.500

ASTIGMATISM
Y = 21.60

1.000

DISTORTION
Y = 21.60

5.000 (%)

SPHERICAL ABERRATION
FNO=2.87

0.500

ASTIGMATISM
Y = 21.60

1.000

DISTORTION
Y = 21.60

5.000 (%)

SPHERICAL ABERRATION
NA=0.17

0.500

ASTIGMATISM
Y = 21.60

1.000

DISTORTION
Y = 21.60

5.000 (%)

SPHERICAL ABERRATION
NA=0.17

0.500

ASTIGMATISM
Y = 21.60

1.000

DISTORTION
Y = 21.60

5.000 (%)

SPHERICAL ABERRATION
FNO=4.15

0.500

ASTIGMATISM
Y = 21.60

1.000

DISTORTION
Y = 21.60

5.000 (%)

SPHERICAL ABERRATION
FNO=5.57

0.500

ASTIGMATISM
Y = 21.60

1.000

DISTORTION
Y = 21.60

5.000 (%)

SPHERICAL ABERRATION
NA=0.12

0.500

ASTIGMATISM
Y = 21.60

1.000

DISTORTION
Y = 21.60

5.000 (%)

SPHERICAL ABERRATION
NA=0.09

0.500

ASTIGMATISM
Y = 21.60

1.000

DISTORTION
Y = 21.60

5.000 (%)

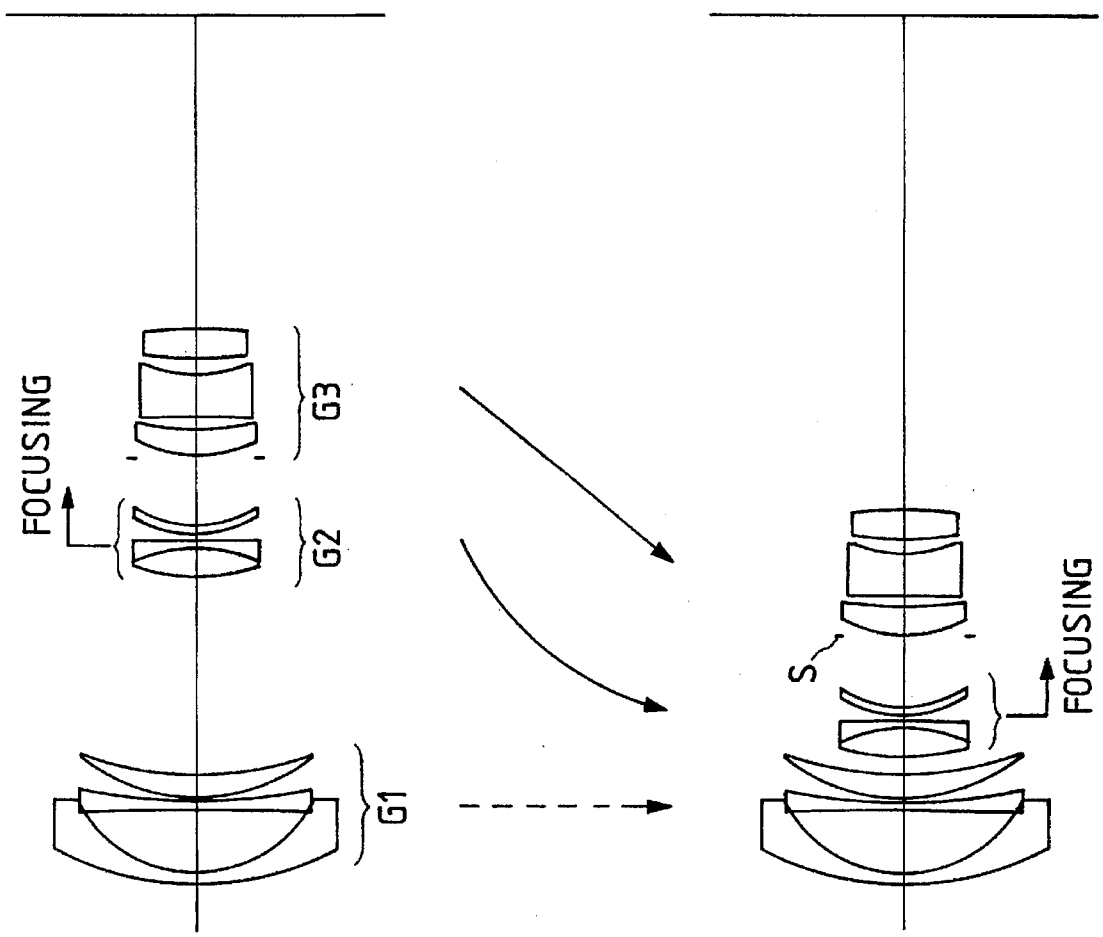

SPHERICAL ABERRATION
FNO=3.72

0.500

ASTIGMATISM
Y = 21.60

1.000

DISTORTION
Y = 21.60

5.000 (%)

SPHERICAL ABERRATION
FNO=5.03

0.500

ASTIGMATISM
Y = 21.60

1.000

DISTORTION
Y = 21.60

5.000 (%)

SPHERICAL ABERRATION
NA=0.14

0.500

ASTIGMATISM
Y = 21.60

1.000

DISTORTION
Y = 21.60

5.000 (%)

SPHERICAL ABERRATION
NA=0.10

0.500

ASTIGMATISM
Y = 21.60

1.000

DISTORTION
Y = 21.60

5.000 (%)

SPHERICAL ABERRATION
FNO=3.60

0.500

ASTIGMATISM
Y=21.60

0.500

DISTORTION
Y=21.60

5.000 (%)

SPHERICAL ABERRATION
FNO=4.82

0.500

ASTIGMATISM
Y=21.60

0.500

DISTORTION
Y=21.60

5.000 (%)

SPHERICAL ABERRATION
NA=0.14

0.500

ASTIGMATISM
Y = 21.60

0.500

DISTORTION
Y = 21.60

5.000 (%)

SPHERICAL ABERRATION
NA=0.10

0.500

ASTIGMATISM
Y = 21.60

0.500

DISTORTION
Y = 21.60

5.000 (%)

SPHERICAL ABERRATION
FNO=4.12

0.500

ASTIGMATISM
Y = 21.60

1.000

DISTORTION
Y = 21.60

5.000 (%)

SPHERICAL ABERRATION
FNO=5.99

0.500

ASTIGMATISM
Y = 21.60

1.000

DISTORTION
Y = 21.60

5.000 (%)

SPHERICAL ABERRATION
NA=0.12

0.500

ASTIGMATISM
Y = 21.60

1.000

DISTORTION
Y = 21.60

5.000 (%)

SPHERICAL ABERRATION
NA=0.08

0.500

ASTIGMATISM
Y = 21.60

1.000

DISTORTION
Y = 21.60

5.000 (%)

SPHERICAL ABERRATION
FNO=3.58

1.000

ASTIGMATISM
Y=21.60

1.000

DISTORTION
Y=21.60

5.000 (%)

SPHERICAL ABERRATION
FNO=4.61

1.000

ASTIGMATISM
Y=21.60

1.000

DISTORTION
Y=21.60

5.000 (%)

SPHERICAL ABERRATION
NA=0.14

1.000

ASTIGMATISM
Y = 21.60

1.000

DISTORTION
Y = 21.60

5.000 (%)

SPHERICAL ABERRATION
NA=0.11

1.000

ASTIGMATISM
Y = 21.60

1.000

DISTORTION
Y = 21.60

5.000 (%)

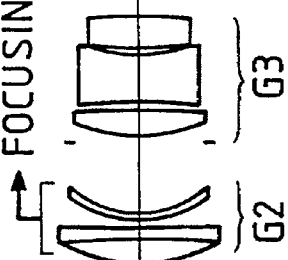
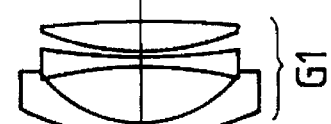
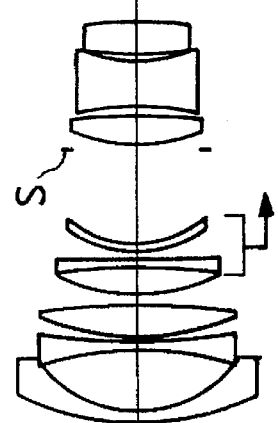
FIG. 51A
FIG. 51B

SPHERICAL ABERRATION
FNO=3.49

0.500

ASTIGMATISM
Y=21.60

0.500

DISTORTION
Y=21.60

5.000 (%)

SPHERICAL ABERRATION
FNO=5.58

0.500

ASTIGMATISM
Y=21.60

0.500

DISTORTION
Y=21.60

5.000 (%)

SPHERICAL ABERRATION
NA=0.14

0.500

ASTIGMATISM
Y = 21.60

0.500

DISTORTION
Y = 21.60

5.000 (%)

SPHERICAL ABERRATION
NA=0.09

0.500

ASTIGMATISM
Y = 21.60

0.500

DISTORTION
Y = 21.60

5.000 (%)

SPHERICAL ABERRATION
FNO=4.03

1.000

ASTIGMATISM
Y = 21.60

1.000

DISTORTION
Y = 21.60

5.000 (%)

SPHERICAL ABERRATION
FNO=5.97

1.000

ASTIGMATISM
Y = 21.60

1.000

DISTORTION
Y = 21.60

5.000 (%)

SPHERICAL ABERRATION
NA=0.12

1.000

ASTIGMATISM
Y = 21.60

1.000

DISTORTION
Y = 21.60

5.000 (%)

SPHERICAL ABERRATION
NA=0.08

1.000

ASTIGMATISM
Y = 21.60

1.000

DISTORTION
Y = 21.60

5.000 (%)

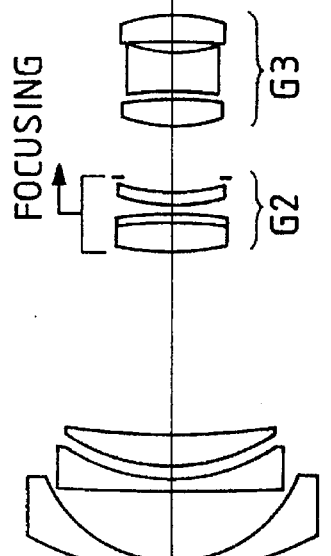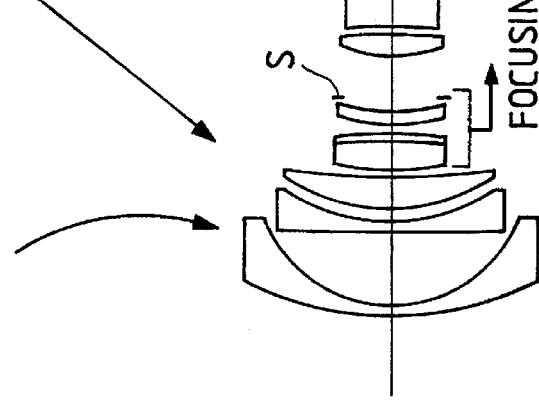
FIG. 61A
FIG. 61B

SPHERICAL ABERRATION
FNO=3.97

1.000

ASTIGMATISM
Y = 21.60

1.000

DISTORTION
Y = 21.60

5.000 (%)

SPHERICAL ABERRATION
FNO=5.76

1.000

ASTIGMATISM
Y = 21.60

1.000

DISTORTION
Y = 21.60

5.000 (%)

SPHERICAL ABERRATION
NA=0.12

1.000

ASTIGMATISM
Y = 21.60

1.000

DISTORTION
Y = 21.60

5.000 (%)

SPHERICAL ABERRATION
NA=0.09

1.000

ASTIGMATISM
Y = 21.60

1.000

DISTORTION
Y = 21.60

5.000 (%)

SPHERICAL ABERRATION
FNO=4.06

0.500

ASTIGMATISM
Y = 21.60

0.500

DISTORTION
Y = 21.60

5.000 (%)

SPHERICAL ABERRATION
FNO=5.60

0.500

ASTIGMATISM
Y = 21.60

0.500

DISTORTION
Y = 21.60

5.000 (%)

SPHERICAL ABERRATION
NA=0.12

0.500

ASTIGMATISM
Y = 21.60

0.500

DISTORTION
Y = 21.60

5.000 (%)

SPHERICAL ABERRATION
NA=0.09

0.500

ASTIGMATISM
Y = 21.60

0.500

DISTORTION
Y = 21.60

5.000 (%)

SPHERICAL ABERRATION
FNO=3.62

1.000

ASTIGMATISM
Y=21.60

1.000

DISTORTION
Y=21.60

5.000 (%)

SPHERICAL ABERRATION
FNO=5.63

1.000

ASTIGMATISM
Y=21.60

1.000

DISTORTION
Y=21.60

5.000 (%)

SPHERICAL ABERRATION
NA=0.14

1.000

ASTIGMATISM
Y = 21.60

1.000

DISTORTION
Y = 21.60

5.000 (%)

SPHERICAL ABERRATION
NA=0.09

1.000

ASTIGMATISM
Y = 21.60

1.000

DISTORTION
Y = 21.60

5.000 (%)

SPHERICAL ABERRATION
FNO=3.97

1.000

ASTIGMATISM
Y=21.60

1.000

DISTORTION
Y=21.60

5.000 (%)

SPHERICAL ABERRATION
FNO=5.62

1.000

ASTIGMATISM
Y=21.60

1.000

DISTORTION
Y=21.60

5.000 (%)

SPHERICAL ABERRATION
NA=0.13

1.000

ASTIGMATISM
Y = 21.60

1.000

DISTORTION
Y = 21.60

5.000 (%)

SPHERICAL ABERRATION
NA=0.09

1.000

ASTIGMATISM
Y = 21.60

1.000

DISTORTION
Y = 21.60

5.000 (%)

SPHERICAL ABERRATION
FNO=3.47

1.000

ASTIGMATISM
Y = 21.60

1.000

DISTORTION
Y = 21.60

5.000 (%)

SPHERICAL ABERRATION
FNO=4.73

1.000

ASTIGMATISM
Y = 21.60

1.000

DISTORTION
Y = 21.60

5.000 (%)

SPHERICAL ABERRATION
NA=0.14

1.000

ASTIGMATISM
Y = 21.60

1.000

DISTORTION
Y = 21.60

5.000 (%)

SPHERICAL ABERRATION
NA=0.10

1.000

ASTIGMATISM
Y = 21.60

1.000

DISTORTION
Y = 21.60

5.000 (%)

ZOOM LENS WITH FIVE LENS GROUPS

BACKGROUND OF THE INVENTION

1. Field of the Invention

The present invention relates to a zoom lens. In an aspect, it relates to a wide-angle zoom lens adapted for use in a single lens reflex camera, and more particularly to a zoom lens having a large aperture ratio and suitable for automatic focusing. In another aspect, it relates to a zooming method of the zoom lens, and more particularly to a zooming method suitable for inner focusing.

2. Related Background Art

For zoom lenses, particularly those of wide angle for use in single-lens reflex cameras, there have been widely utilized a negative-positive two-group configuration and a negative-positive-negative-positive 4-group configuration.

However, it has been difficult to achieve a large aperture ratio with the negative-positive 2-group zoom lens. Also if the negative-positive-negative-positive 4-group zoom lens is designed with a large aperture ratio, the first focusing lens group becomes large, thus increasing the burden on the motor in the case of auto focusing, so that a high focusing speed is difficult to achieve.

The focusing of the zoom lens is generally achieved by a method for moving the first lens group toward the object. Such a method is widely utilized because of an advantage that the amount of movement of the first lens group for focusing to a given object distance does not depend on the focal length of the zoom lens.

Also, there have been proposed, for example in the Japanese Patent Application Laid-open No. 57-5012, zoom lenses of an inner focus method or a rear focus method in which a lens group, positioned closer to the image plane than the first lens group, is moved for focusing.

The first group moving method, in which the relatively large and heavy first lens group is moved for focusing, is associated with a lower focusing speed when auto focusing, in comparison with the inner or rear focusing method. It is also inadequate for a waterdrop-proof or water-proof camera, as the outermost lens group has to be moved.

On the other hand, in the zoom lens of the rear focusing method proposed in Japanese Patent Application Laid-open No. 57-5012, the amount of movement of the focusing lens group, required for focusing to the object at a given distance varies significantly depending on the focal length of the zoom lens, and the lens becomes defocused if a zooming operation is conducted after the lens is focused to the object at a short distance.

SUMMARY OF THE INVENTION

A first object of the present invention is to provide a zoom lens having a large aperture ratio and a wide field angle, and still suitable for auto focusing.

The above-mentioned object can be attained, according to the present invention, by a zoom lens provided, in the order from the object side, at least with a first lens group of a negative refractive power, a second lens group of a positive refractive power, a third lens group of a positive refractive power and a fourth lens group of a negative refractive power, wherein, in the zooming operation from the wide angle end to the telephoto end, the distance between the first and second lens groups decreases, that between the second and third lens groups varies and that between the third and fourth lens groups increases.

In the above-mentioned configuration, the following condition is preferably satisfied:

$$0.3 < f2/f3 < 3 \quad (1\text{-}1)$$

wherein
f2: focal length of second lens group; and
f3: focal length of third lens group.

In the focusing operation from a long object distance to a short object distance, the second lens group is moved toward the image plane.

According to the present invention, in the conventional negative-positive-negative-positive 4-group zoom lens, the second lens group is divided into two positive groups, thereby reducing the positive refractive powers both in the second and third lens groups and thus facilitating the correction of aberrations and simplifying the configuration of these two lens groups. Also, the distance between the second and third lens groups is varied at the zooming, thereby facilitating the correction of astigmatism and achieving satisfactory correction of the aberrations from the wide angle end to the telephoto end.

The condition (1-1) defines a range for obtaining such effects. Above the upper limit of the condition (1-1), the refractive power of the third lens group becomes excessively large, so that the configuration thereof becomes difficult to simplify. On the other hand, below the lower limit of the condition (1-1), the refractive power of the second lens group becomes excessively large, so that the configuration thereof becomes difficult to simplify.

For focusing a zoom lens, there is generally employed the first group moving method of moving the first lens group toward the object, and focusing by such a first group moving method is also possible in the zoom lens of the present invention, but the effective diameter of the first lens group becomes large if the field angle and the aperture ratio are made larger. In such a zoom lens, it is difficult to achieve high-speed focusing as the movement of the first lens group in auto focusing gives a heavy burden on the focusing motor etc. In the present invention, therefore, the focusing from a long object distance to a short object distance is achieved by a movement of the relatively small second lens group toward the image plane, thereby achieving a high-speed focusing operation when auto focusing. Besides, a configuration satisfying the aforementioned condition (1-1) reduces the difference, between the wide angle end and the telephoto end, in the amount of focusing movement of the second lens group, and is therefore convenient in case zooming is conducted after focusing, or in case the manual zooming is utilized in combination.

It is furthermore possible to maintain the first lens group fixed at the zooming operation, by varying the distance between the second and third lens groups for correcting the position of the image plane at the zooming operation. Thus, in combination with the inner focusing method, it is possible to maintain the first lens group fixed in the zooming and focusing operations, so that there can be realized a zoom lens resistant to the external shock and to the intrusion of waterdrops and dusts.

It is also possible, at the zooming operation, to integrally move the third and fifth lens groups or to maintain the fourth lens group fixed, thereby simplifying the configuration of the zoom lens.

A second object of the present invention is to provide a zoom lens in which, even in the use of the inner focusing method, the amount of movement of the focusing lens group required for focusing to the object of a given distance remains substantially constant regardless of the focal length of the zoom lens.

The above-mentioned second object can be attained, according to the present invention, by a zoom lens provided, in the order from the object side, with a first lens group of a negative refractive power, a second lens group of a positive refractive power and a third lens group of a positive refractive power, wherein, at the zooming operation from the wide angle end to the telephoto end, the first lens group remains fixed, the second and third lens groups move toward the object side with a varying distance therebetween, and the imaging magnification of the second lens group does not become −1 in any focal length between the wide angle end to the telephoto end.

Also, there is provided a configuration provided, in the order from the object side, with a first lens group of a negative refractive power, a second lens group of a positive refractive power, and a third lens group of a positive refractive power, wherein, in the zooming operation from the wide angle end to the telephoto end, the distance between the first and second lens group and that between the second and third lens groups vary, and the focusing from a long object distance to a short object distance is achieved by the movement of the second lens group toward the image plane.

Also, there is provided a configuration provided, in the order from the object side, with a first lens group of a negative refractive power, a second lens group of a positive refractive power, a third lens group of a positive refractive power, and a fourth lens group of a negative refractive power, wherein, at the zooming from the wide angle end to the telephoto end, the distance between the first and second lens groups decreases, that between the second and third lens groups increases and that between the third and fourth lens groups increases.

Also, there is provided a configuration provided, in the order from the object side, with a first lens group of a negative refractive power, a second lens group of a positive refractive power, a third lens group of a positive refractive power, and a fourth lens group of a negative refractive power, wherein, at the zooming from the wide angle end to the telephoto end, the first lens groups remains fixed, the distance between the first and second lens groups decreases, that between the second and third lens groups varies and that between the third and fourth lens groups increases.

Also, there is provided a configuration provided, in the order from the object side, with a first lens group of a negative refractive power, a second lens group of a positive refractive power, a third lens group of a positive refractive power, a fourth lens group of a negative refractive power, and a fifth lens group of a positive refractive power, wherein, at the zooming from the wide angle end to the telephoto end, the distance between the first and second lens groups decreases, that between the second and third lens groups varies, that between the third and fourth lens groups increases, and that between the fourth and fifth lens groups decreases.

Also, there is provided a configuration provided, in the order from the object side, with a first lens group of a negative refractive power, with a second lens group of a positive refractive power, a third lens group of a positive refractive power, and a fourth lens group of a positive refractive power, wherein, at the zooming from the wide angle end to the telephoto end, the distance between the first and second lens groups decreases, that between the second and third lens groups and that between the third and fourth lens groups vary, and the focusing from a long object distance to a short object distance is achieved by the movement of the second lens group toward the image plane.

The foregoing configurations preferably satisfy at least one of the following conditions:

$$|\beta 2t|>2 \quad (2\text{-}1)$$

$$|\beta 2w|>2 \quad (2\text{-}2)$$

$$\beta 2t>2 \quad (2\text{-}3)$$

$$\beta 2w<-2 \quad (2\text{-}4)$$

$$0.5<f2/f3<2 \quad (2\text{-}5)$$

$$f2/(|f1|+e1t)>0.8 \; (f1<0) \quad (2\text{-}6)$$

$$f2/(|f1|+e1w)<1.2 \quad (2\text{-}7)$$

wherein

β2t: imaging magnification of the second lens group at the telephoto end;

β2w: imaging magnification of the second lens group at the wide angle end;

f1: focal length of the first lens group;

f2: focal length of the second lens group;

f3: focal length of the third lens group;

e1w: distance from the image-side principal point of the first lens group to the object-side principal point of the second lens group at the wide angle end; and e1t: distance from the image-side principal point of the first lens group to the object-side principal point of the second lens group at the telephoto end.

Also, in the case of the zoom lens consisting of the negative first lens group, the positive second lens group and the positive third lens group, the following conditions are preferably satisfied:

$$f3/e3w>0.8 \quad (2\text{-}8)$$

$$f3/e3t<1.2 \quad (2\text{-}9)$$

wherein e3w: distance from the image-side principal point of the third lens group to the image plane at the wide angle end;

e3t: distance from the image-side principal point of the third lens group to the image plane at the telephoto end.

The zoom lens attaining the second object of the present invention is provided, in the order from the object side, with a negative first lens group, a positive second lens group and a positive third lens group, wherein the second lens group is given a large imaging magnification in the entire zooming range from the wide angle end to the telephoto end.

In such configuration, in effecting the focusing by the movement of the second lens group toward the image plane, the amount Δ of focusing movement of the second lens group can be approximated by:

$$\Delta \cong \{\beta^2/(\beta^2-1)\} \cdot \{f1^2/(D0-f1)\} \quad (2\text{-}10)$$

wherein

β: imaging magnification of the second lens group;

f1: focal length of the first lens group; and

D0: distance from the object point to the object-side principal point of the first lens group.

The f1 in the right-hand term of the equation (2-10) is a constant, and D0 becomes a constant in a zoom lens of which length does not vary in the zooming operation. β varies in the zooming, but, if given a large absolute value, $\{\beta^2/(\beta^2-1)\}$ approaches 1 and varies little in the zooming. Also the focusing becomes impossible if the imaging magnification β of the second lens group is −1.

Based on these facts, $|\beta|$ has to be made large in order to decrease the variation, in the zooming, of the amount of the focusing movement of the second lens group. It is also desirable that D0 does not vary, or the first lens group does not move, in the zooming operation.

The conditions (2-1) and (2-2) define the value of $|\beta|$ at the wide angle end and at the telephoto end. Below the lower limits of the conditions (2-1) and (2-2), the variation, in the zooming operation, of the amount of focusing movement of the second lens group undesirably increases. The above-mentioned variation can be further decreased by adopting "3" as the lower limit of the conditions (2-1) and (2-2).

By selecting substantially same values for $|\beta|$ at the wide angle end and at the telephoto end, the amount of focusing movement of the second lens group can be made approximately same at the wide angle end and at the telephoto end. For achieving efficient zooming, in such case, it is desirable to select the imaging magnification $\beta 2w$ of the second lens group at the wide angle end as negative and the image magnification $\beta 2t$ at the telephoto end as positive, and preferably to satisfy the conditions (2-3) and (2-4).

It is also possible to fix the first lens group, by using the second or third lens group as a compensator. The condition (2-5) defines the appropriate ratio of the focal lengths of the second and third lens groups, in such case. Below the lower limit of the condition (2-5), the refractive power of the second lens group increases and the spherical aberration becomes difficult to correct. On the other hand, above the upper limit of the condition (2-5), it becomes difficult to secure the back focus distance and to reduce the entire length of the zoom lens.

In the case of varying the distance of the second and third lens groups at the zooming from the wide angle end to the telephoto end with the second or third lens group used as the compensator, it is effective, for reducing the entire lens length, to increase the distance of the second and third lens groups in the vicinity of the wide angle end and decrease this distance in the vicinity of the telephoto end.

The conditions (2-6) and (2-7) define the appropriate relationship in the first and second lens groups when the focusing is made with the second lens group. Below the lower limit of the condition (2-6) or above the upper limit of the condition (2-7), the variation, in the zooming operation, of the amount of focusing movement of the second lens group becomes undesirably large.

The conditions (2-8) and (2-9) define an appropriate range of the focal length of the third lens group, in case the focusing is made by the second lens group in a zoom lens consisting of a negative first lens group, a positive second lens group and a positive third lens group. Below the lower limit of the condition (2-8) or above the upper limit of the condition (2-9), the variation, in the zooming operation, of the amount of focusing movement of the second lens group becomes undesirably large.

The zoom lens attaining the second object of the present invention is basically composed of a negative first lens group, a positive second lens group and a positive third lens group, but there may be added, at the image side, a positive or negative fourth lens group for increasing the aperture ratio or reducing the dimension, or a negative fourth lens group and a positive fifth lens group for increasing the zoom ratio or the aperture ratio. In such case, it is desirable, at the zooming operation from the wide angle end to the telephoto end, to increase the distance between the third and fourth lens groups and to decrease the distance between the fourth and fifth lens groups.

A third object of the present invention is to provide a zoom lens in which, even in the use of the inner focusing method, the amount of movement of the focusing lens group required for focusing to the object of a given distance remains substantially constant regardless of the focal length of the zoom lens.

The above-mentioned third object can be attained, according to the present invention, by a zoom lens provided, in the order from the object side, with a first lens group consisting of a negative meniscus lens convex to the object side, a negative lens and a positive lens and having a negative refractive power in the entire group, a second lens group of a positive refractive power, and a third lens group of a positive refractive power, wherein, at the zooming operation from the wide angle end to the telephoto end, the distance between the first and second lens groups decreases, while that between the second and third lens groups varies and the following conditions are satisfied:

$$1 < |f1|/fw < 1.5 \, (f1<0) \qquad (3\text{-}1)$$

$$0.5 < f2/f3 < 2 \qquad (3\text{-}2)$$

wherein fw: focal length of the entire lens system at the wide angle end;

f1: focal length of the first lens group;

f2: focal length of the second lens group; and f3: focal length of the third lens group.

Also, there is provided a configuration provided, in the order from the object side, with a first lens group of a negative refractive power, a second lens group of a positive refractive power, and a third lens group of a positive refractive power, wherein, at the zooming operation from the wide angle end to the telephoto end, the distance between the first and second lens groups decreases, while that between the second and third lens groups varies, and the following conditions are satisfied:

$$1 < |f1|/fw < 1.5 \, (f1<0) \qquad (3\text{-}1)$$

$$0.5 < f2/f3 < 2 \qquad (3\text{-}2)$$

$$0.8 < x2/x3 < 1.2 \qquad (3\text{-}3)$$

wherein fw: focal length of the entire system at the wide angle end;

f1: focal length of the first lens group;

f2: focal length of the second lens group;

f3: focal length of the third lens group;

x2: amount of zooming movement, from the wide angle end to the telephoto end, of the second lens group relative to the image plane; and x3: amount of zooming movement, from the wide angle end to the telephoto end, of the third lens group relative to the image plane.

The above-mentioned configurations preferably satisfy at least one of the following conditions:

$$f2/(|f1|+e1t) > 0.8 \qquad (3\text{-}4)$$

$$f2/(|f1|+e1w) < 1.2 \qquad (3\text{-}5)$$

$$|\beta 2t| > 2 \qquad (3\text{-}6)$$

$$|\beta 2w| > 2 \qquad (3\text{-}7)$$

$$\beta 2t > 2 \qquad (3\text{-}8)$$

$$\beta 2w < -2 \qquad (3\text{-}9)$$

wherein $\beta 2t$: imaging magnification of the second lens group at the telephoto end;

$\beta 2w$: imaging magnification of the second lens group at the wide angle end;

$fw$: focal length of the entire system at the wide angle end;

$f1$: focal length of the first lens group;

$f2$: focal length of the second lens group;

$f3$: focal length of the third lens group;

$e1w$: distance from the image-side principal point of the first lens group to the object-side principal point of the second lens group at the wide angle end; and $e1t$: distance from the image-side principal point of the first lens group to the object-side principal point of the second lens group at the telephoto end.

Also, in the case of the zoom lens consisting of a negative first lens group, a positive second lens group and a positive third lens group, the following conditions are preferably satisfied:

$$f3/e3w > 0.8 \quad (3\text{-}10)$$

$$f3/e3t > 1.2 \quad (3\text{-}11)$$

wherein $e3w$: distance from the image-side principal point of the third lens group to the image plane at the wide angle end;

$e3t$: distance from the image-side principal point of the third lens group to the image plane at the telephoto end.

The above-mentioned zoom lens, attaining the third object of the present invention, is provided, in the order from the object side, with a negative first lens group, a positive second lens group and a positive third lens group, wherein the second lens group is given a large imaging magnification in the entire zooming range from the wide angle end to the telephoto end.

In such configuration, in effecting the focusing by the movement of the second lens group toward the image plane, the amount $\Delta$ of focusing movement of the second lens group can be approximated by:

$$\Delta 1 \cong \{\beta^2/(\beta^2-1)\} \cdot \{f1^2/(D0-f1)\} \quad (3\text{-}12)$$

wherein $\beta$: imaging magnification of the second lens group;

$f1$: focal length of the first lens group;

$D0$: distance from the object point to the object-side principal point of the first lens group.

The $f1$ in the right-hand term of the equation (3-12) is a constant, and $D0$ becomes substantially constant if the variation in the entire length by zooming is small in comparison with the phototaking distance. On the other hand, $\beta$ varies in the zooming, but, if given a large absolute value, $\{\beta^2/(\beta^2-1)\}$ approaches 1 and varies little in the zooming.

Based on these facts, $|\beta|$ has to be made large in order to decrease the variation, in the zooming, of the amount of the focusing movement of the second lens group. It is also desirable that $D0$ does not vary, or the first lens group does not move, in the zooming operation.

Also, as will be apparent from the equation (3-12), a smaller value of $|f1|$ decreases the amount of focusing movement of the second lens group and also allows for decreasing the variation, by the zooming, in the amount of focusing movement of the second lens group.

The condition (3-1) defines the appropriate focal length for the first lens group. Above the upper limit of the condition (3-1), the entire lens length becomes difficult to decrease. Also in case of focusing by the movement of the second lens group toward the image plane, it is desirable to satisfy the upper limit of the condition (3-1), in order to decrease the variation, by the zooming, in the amount of focusing movement of the second lens group and to decrease the amount of focusing movement of the second lens group. Also the decrease of the amount of focusing movement of the second lens group is effective for decreasing the variations in the aberrations by the focusing operation. On the other hand, below the lower limit of the condition (3-1), the negative distortion aberration increases undesirably at the wide angle end.

The condition (3-2) defines the appropriate ratio of the focal lengths of the second and third lens groups. Below the lower limit of the condition (3-2), the refractive power of the second lens group increases and the spherical aberration becomes difficult to correct. On the other hand, above the upper limit of the condition (3-2), it becomes difficult to secure the back focus length and to decrease the entire length of the zoom lens.

Also, the condition (3-3) defines the appropriate ratio of the amounts of zooming movement of the second and third lens groups from the wide angle end to the telephoto end. Below the lower limit of the condition (3-3), the distance between the second and third lens groups increases at the wide angle end, whereby the compactization becomes difficult and the distortion and other off-axial aberrations become difficult to correct. On the other hand, above the upper limit of the condition (3-3), the entire lens length increases at the telephoto end and the distance $D0$ from the object point to the object-side principal point of the first lens group at the telephoto end becomes small in comparison with $D0$ at the wide angle end. This fact leads, as indicated by the equation (3-12), to an undesirable increase of the variation, in the zooming, of the amount of focusing movement of the second lens group.

The conditions (3-4) and (3-5) define the appropriate relationship between the focal lengths of the first and second lens group. Below the lower limit of the condition (3-4) or above the upper limit of the condition (3-5), the variation, by the zooming, in the amount of focusing movement of the second lens group increases undesirably.

The conditions (3-6) and (3-7) define the value of $|\beta|$ at the wide angle end and at the telephoto end. Below the lower limits of the conditions (3-6) and (3-7), the variation, by the zooming, in the amount of focusing movement of the second lens group increase, undesirably. The above-mentioned variation can be decreased further by taking "3" as the lower limit of the conditions (3-6) and (3-7).

By selecting substantially same values for $|\beta|$ at the wide angle end and at the telephoto end, the amount of focusing movement of the second lens group can be made approximately the same at the wide angle end and at the telephoto end. For achieving efficient zooming, in such case, it is desirable to select the imaging magnification $\beta 2w$ of the second lens group at the wide angle end as negative and the imaged magnification $\beta 2t$ at the telephoto end as positive, and preferably to satisfy the conditions (3-8) and (3-9).

The conditions (3-10) and (3-11) define, in the zoom lens consisting of a negative first lens group, a positive second lens group and a positive third lens group, the appropriate range of the focal length of the third lens group in case the focusing is effected by the second lens group. Below the lower limit of the condition (3-10) or above the upper limit of the condition (3-11), the variation, by the zooming, in the amount of focusing movement of the second lens group increases undesirably.

It is also possible to fix the first lens group, by using the second or third lens group as a compensator. In such case, it is effective for decreasing the entire lens length if, at the zooming from the wide angle end to the telephoto end, the distance between the second and third lens groups increases in the vicinity of the wide angle end and decreases in the vicinity of the telephoto end.

Also, in the case of focusing with the second lens group, in order to decrease the variation of the aberrations by the zooming, the second lens group is preferably composed of an cemented positive lens and a negative meniscus lens convex to the object side.

Also, the first lens group composed, in the order from the object side, of a negative meniscus lens convex to the object side, a negative lens and positive lens is effective for satisfactory aberrations with a relatively simple structure. Furthermore, the addition of a positive lens at the object side of the above-mentioned negative meniscus lens is particularly effective for correcting the distortion aberration at the wide angle end, thus for achieving a wide image angle.

Furthermore, inclusion of at least an aspherical lens in the first lens group is effective for correcting the astigmatism, particularly at the wide angle end.

Also, the third lens group composed, in the order from the object side, of a positive lens, a negative lens and a positive lens is effective for correcting the spherical aberration over the entire focal length range with a relatively simple structure.

Furthermore, a diaphragm is preferably provided between the second and third lens groups, in order to satisfactorily correct the aberrations over the entire focal length range from the wide angle end to the telephoto end.

The present invention is based on a 3-group zoom lens consisting of a negative first lens group, a positive second lens group and a positive third lens group, but a positive or negative fourth lens group may be added at the image side of the above-mentioned 3-group zoom lens, for increasing the aperture ratio or reducing the dimension.

BRIEF DESCRIPTION OF THE DRAWINGS

FIGS. 31A and 31B are views showing the configuration of an embodiment 9 of the present invention;

FIGS. 47A to 47C are aberration charts of the embodiment 12 at the wide angle end and at a phototaking distance R=inf.;

FIGS. 51A and 51B are views showing the configuration of an embodiment 13 of the present invention;

FIGS. 61A and 61B are views showing the configuration of an embodiment 15 of the present invention;

DESCRIPTION OF THE PREFERRED EMBODIMENTS

Now the present invention will be described in greater detail by reference to preferred embodiments thereof.

[Embodiment 1]

Figures 1A, 1B:
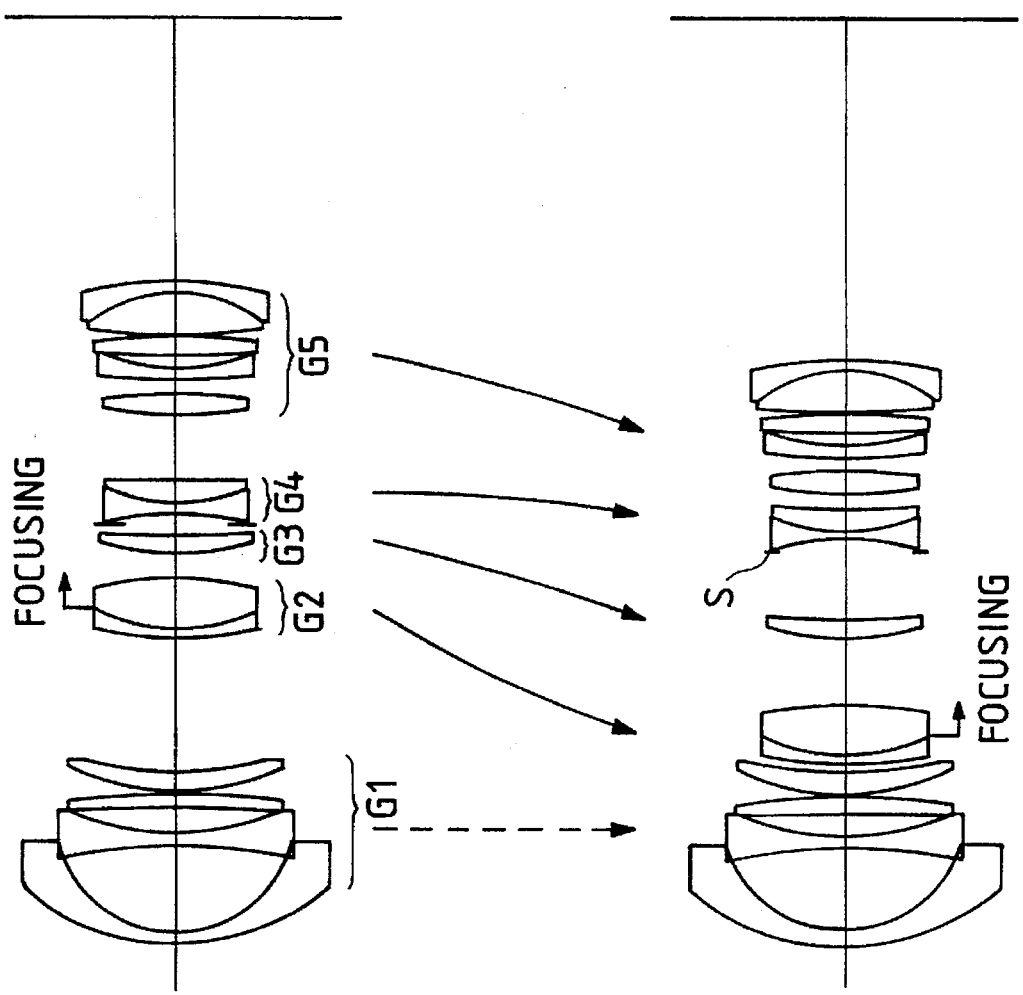
FIGS. 1A and 1B are views showing the configuration of an embodiment 1 of the present invention.
Figure 2A:
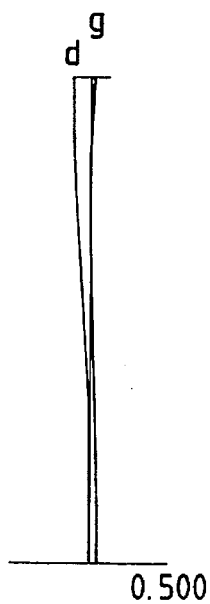
FIGS. 2A to 2C are aberration charts of the embodiment 1 at the wide angle end and at a phototaking distance R=inf.
Figure 2B:
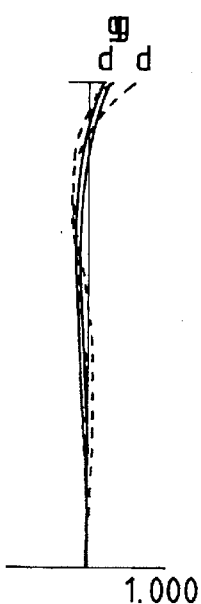
Figure 2C:
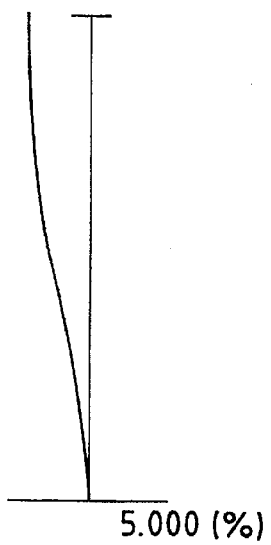
Figure 3A:
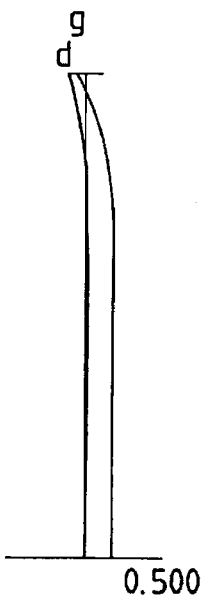
FIGS. 3A to 3C are aberration charts of the embodiment 1 at the telephoto end and at a phototaking distance R=inf.
Figure 3B:
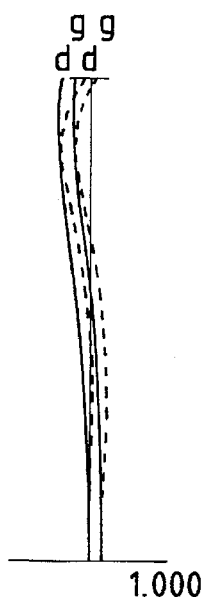
Figure 3C:
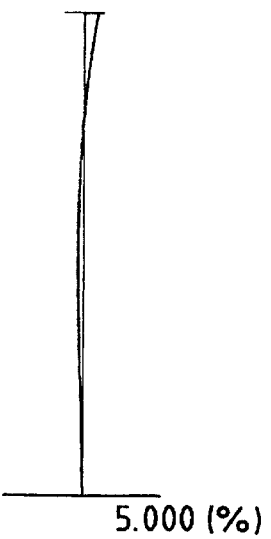
Figure 4A:
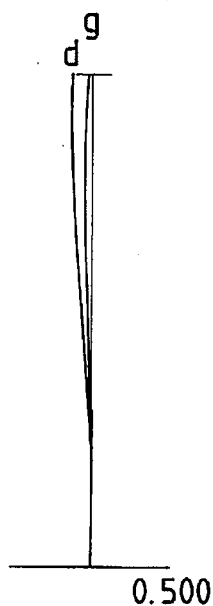
FIGS. 4A to 4C are aberration charts of the embodiment 1 at the wide angle end and at a phototaking distance R=500.
Figure 4B:
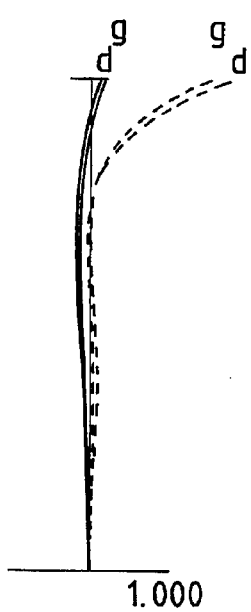
Figure 4C:
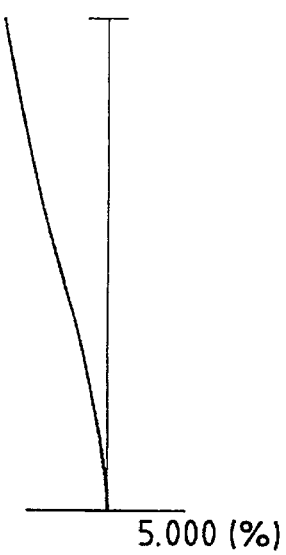
Figure 5A:
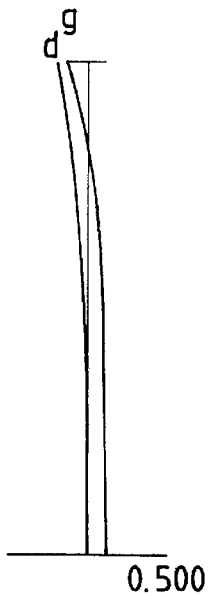
FIGS. 5A to 5C are aberration charts of the embodiment 1 at the telephoto end and at a phototaking distance R=500.
Figure 5B:
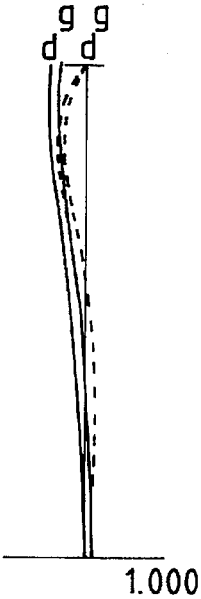
Figure 5C:
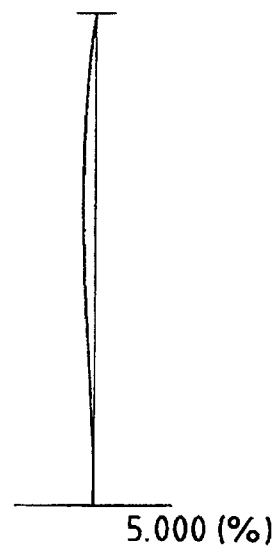

FIGS. 1A and 1B are views showing the configuration of the zoom lens of an embodiment 1, respectively at the wide angle end and at the telephoto end. The zoom lens is composed, in the order from the object side, of a negative first lens group G1, a positive second lens group G2, a positive third lens group G3, a negative fourth lens group G4 and a positive fifth lens group G5, wherein, at the zooming from the wide angle end to the telephoto end, the first lens group remains fixed while the second to fifth lens groups move toward the object side, the air gap between the first and second lens groups decreases, that between the second and third lens groups and that between the third and fourth lens groups both increase, and that between the fourth and fifth lens groups decreases.

The focusing from a long object distance to a short object distance is executed by a movement of the second lens group toward the image plane.

The lens face, closest to the object side, in the first lens group is an aspherical face, the shape of which is given by:

$$X(y)=y^2/[r\{1+(1-k\cdot y^2/r^2)^{1/2}\}]+C2\cdot y^2+C4\cdot y^4+C6\cdot y^6+C8\cdot y^8+C10\cdot y^{10}$$

wherein X(y) is the axial distance from a tangential plane at the vertex of the aspherical face to a point of a height y on the aspherical face, r is the radius of paraxial curvature, k is the conical constant, and Ci is the i-th order aspherical coefficient.

The following Table 1 shows the parameters of the embodiment 1 of the present invention, wherein f is the focal length, F is the F-number, and $2\omega$ is the image angle. The numbers in the left-hand column indicate the order from the object side, r indicates the radius of curvature of the lens face, d is the distance between the lens faces, n and ν are the refractive index and the Abbe's number for d-line ($\lambda$=587.6 nm). R in the table of variable distances indicates the phototaking distance.

TABLE 1

| | f = 20.50–24.00–28.00–34.00 F/2.88 2ω = 95.36–84.20–74.79–64.41° | | | |
|---|---|---|---|---|
| | r | d | ν | n |
| 1 | 42.8646 | 2.5000 | 49.5 | 1.77279 |
| 2 | 19.0563 | 12.2538 | | |
| 3 | −89.7386 | 2.0000 | 47.5 | 1.78797 |

TABLE 1-continued

| | f = 20.50–24.00–28.00–34.00 F/2.88 2ω = 95.36–84.20–74.79–64.41° | | | |
|---|---|---|---|---|
| | r | d | ν | n |
| 4 | 43.6226 | 3.0774 | | |
| 5 | −1278.6770 | 2.7808 | 31.6 | 1.75692 |
| 6 | −114.4184 | 0.2000 | | |
| 7 | 37.2342 | 3.5000 | 31.6 | 1.75692 |
| 8 | 70.6430 | (d8) | | |
| 9 | 58.7658 | 1.2000 | 29.5 | 1.71736 |
| 10 | 27.8095 | 7.7426 | 70.0 | 1.51860 |
| 11 | −62.9952 | (d11) | | |
| 12 | 40.9312 | 2.9396 | 53.9 | 1.71300 |
| 13 | 178.2683 | (d13) | | |
| 14 | (diaphragm) | 2.0000 | | |
| 15 | −40.2685 | 1.2000 | 52.3 | 1.74810 |
| 16 | 28.7416 | 3.3073 | 25.4 | 1.80518 |
| 17 | 203.9851 | (d17) | | |
| 18 | 59.1968 | 3.8000 | 50.8 | 1.65844 |
| 19 | −63.0449 | 1.5000 | | |
| 20 | 79.5746 | 2.0000 | 26.1 | 1.78470 |
| 21 | 30.6815 | 1.8153 | | |
| 22 | 121.6247 | 3.3377 | 45.4 | 1.79668 |
| 23 | −76.5204 | 0.2000 | | |
| 24 | 275.3981 | 6.1577 | 57.0 | 1.62280 |
| 25 | −21.9059 | 1.7000 | 23.0 | 1.86074 |
| 26 | −60.5026 | | | |

Aspherical coefficients of first face:

k=1.0000
C2=0.0000
C4=3.9551E-6
C6=7.4971E-9
C8=−1.2898E-11
C11=2.0419E-14

Table of variable distances:

| f | 20.50 | 24.00 | 28.00 | 34.00 |
|---|---|---|---|---|
| R | inf | inf | inf | inf |
| d8 | 19.53510 | 12.68258 | 7.15140 | 1.00000 |
| d11 | 3.53475 | 7.61249 | 9.66310 | 9.97063 |
| d13 | 1.54528 | 4.05890 | 7.08276 | 9.83202 |
| d17 | 9.73143 | 7.26988 | 4.61998 | 2.00000 |
| f | 20.50 | 24.00 | 28.00 | 34.00 |
| R | 500.00 | 500.00 | 500.00 | 500.00 |
| d8 | 22.07078 | 15.26240 | 9.79958 | 3.76429 |
| d11 | 0.99907 | 5.03267 | 7.01491 | 7.20634 |
| d13 | 1.54528 | 4.05890 | 7.08276 | 9.83202 |
| d17 | 9.73143 | 7.26988 | 4.61998 | 2.00000 |

Values corresponding to the conditions:

$f2/f3$=1.036     (1-1)

FIGS. 2A to 2C and 3A to 3C are aberration charts of the embodiment 1 at a phototaking distance R=inf., respectively at the wide angle end and at the telephoto end, while FIGS. 4A to 4C and 5A to 5C are aberration charts of the embodiment 1 at a phototaking distance R=500, respectively at the wide angle end and at the telephoto end. In these charts, FNO indicates F-number, NA indicates numerical aperture, Y indicates image height, d indicates d-line ($\lambda$=587.6 nm) and g indicates g-line ($\lambda$=435.6 nm). In the astigmatism chart, the solid line and broken line respectively indicate the sagittal and meridional image planes.

These aberration charts indicate that the present embodiment is satisfactorily corrected for the various aberrations and has excellent imaging performance.

15

[Embodiment 2]

Figures 6A, 6B:
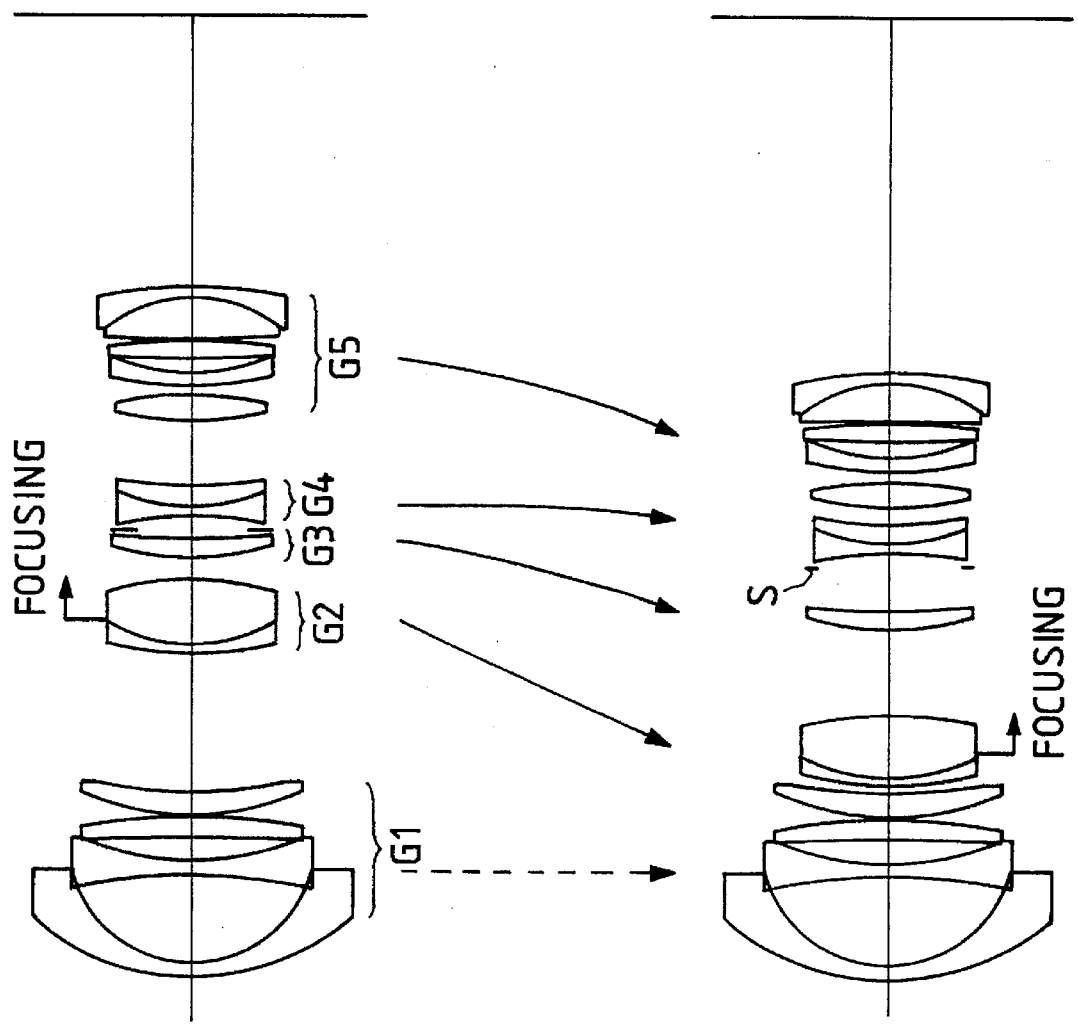
FIGS. 6A and 6B are views showing the configuration of an embodiment 2 of the present invention.
Figure 7A:
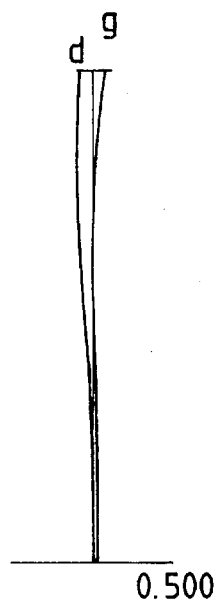
FIGS. 7A to 7C are aberration charts of the embodiment 2 at the wide angle end and at a phototaking distance R=inf.
Figure 7B:
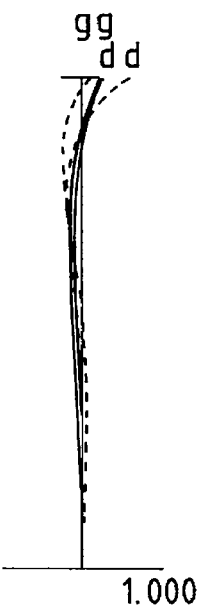
Figure 7C:
Figure 8A:
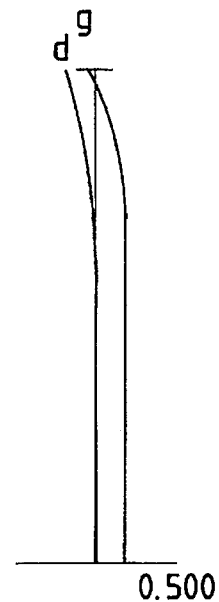
FIGS. 8A to 8C are aberration charts of the embodiment 2 at the telephoto end and at a phototaking distance R=inf.
Figure 8B:
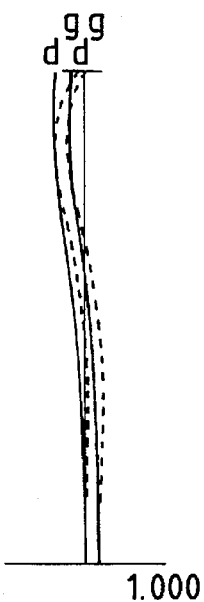
Figure 8C:
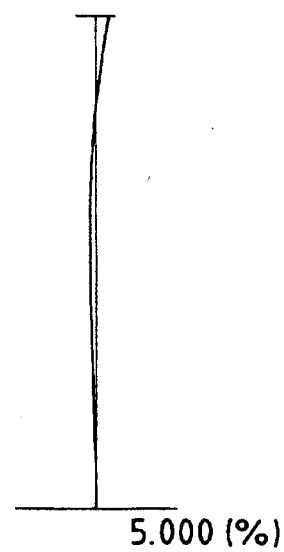
Figure 9A:
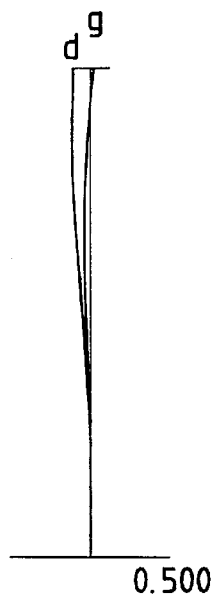
FIGS. 9A to 9C are aberration charts of the embodiment 2 at the wide angle end and at a phototaking distance R=500.
Figure 9B:
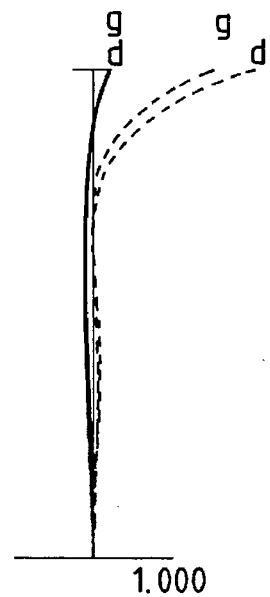
Figure 9C:
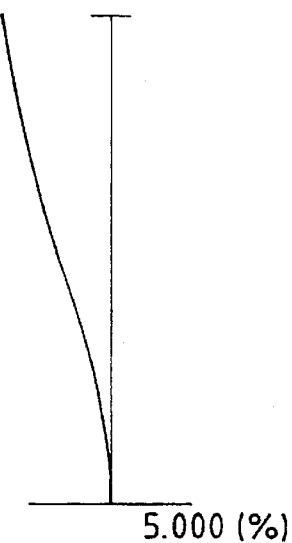
Figure 10A:
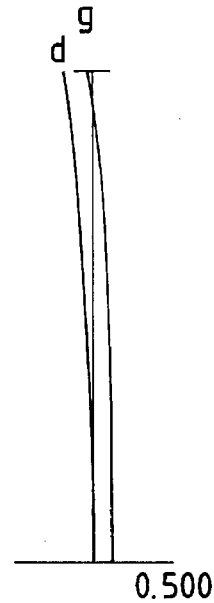
FIGS. 10A to 10C are aberration charts of the embodiment 2 at the telephoto end and at a phototaking distance R=500.
Figure 10B:
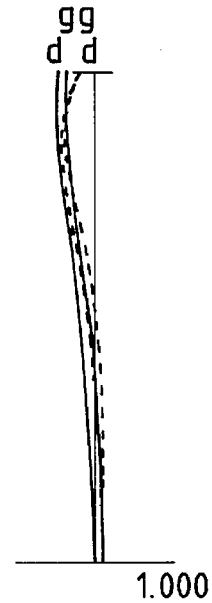
Figure 10C:
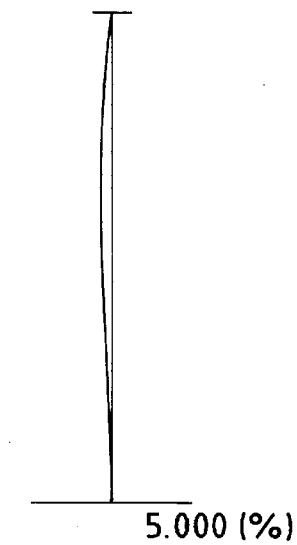

FIGS. 6A and 6B are views showing the configuration of the zoom lens of an embodiment 2, respectively at the wide angle end and at the telephoto end. The zoom lens is composed, in the order from the object side, of a negative first lens group G1, a positive second lens group G2, a positive third lens group G3, a negative fourth lens group G4 and a positive fifth lens group G5, wherein, at the zooming from the wide angle end to the telephoto end, the first lens group remains fixed while the second to fifth lens groups move toward the object side, the air gap between the first and second lens groups decreases, that between the second and third lens groups and that between the third and fourth lens groups both increase, and that between the fourth and fifth lens groups decreases.

The focusing from a long object distance to a short object distance is executed by a movement of the second lens group toward the image plane.

The lens face, closest to the object side, in the first lens group is an aspherical face, the shape of which is given by:

$$X(y)=y^2/r\{1+(1-k\cdot y^2/r^2)^{1/2}\}+C2\cdot y^2+C4\cdot y^4+C6\cdot y^6+C8\cdot y^8+C10\cdot y^{10}$$

wherein X(y) is the axial distance from a tangential plane at the vertex of the aspherical face to a point of a height y on the aspherical face, r is the radius of paraxial curvature, k is the conical constant, and Ci is the i-th order aspherical coefficient.

The following Table 2 shows the parameters of the embodiment 2 of the present invention, wherein f is the focal length, F is the F-number and 2ω is the image angle. The numbers in the left-hand column indicate the order from the object side, r indicates the radius of curvature of the lens face, d is the distance between the lens faces, n and ν are the refractive index and the Abbe's number for d-line (λ=587.6 nm). R in the table of variable distances indicates the phototaking distance.

TABLE 2 f = 20.50–24.00–28.00–34.00
F/2.88
2ω = 95.32–84.13–74.68–64.33°

|    | r         | d        | ν    | n       |
|----|-----------|----------|------|---------|
| 1  | 42.2348   | 2.5000   | 49.5 | 1.77279 |
| 2  | 18.6087   | 12.6784  |      |         |
| 3  | −85.0463  | 2.0000   | 47.5 | 1.78797 |
| 4  | 42.8849   | 3.4377   |      |         |
| 5  | −281.6993 | 2.8294   | 31.6 | 1.75692 |
| 6  | −91.5606  | 0.2000   |      |         |
| 7  | 37.8425   | 3.5687   | 31.6 | 1.75692 |
| 8  | 79.7702   | (d8)     |      |         |
| 9  | 49.3392   | 1.2000   | 29.5 | 1.71736 |
| 10 | 25.1981   | 8.9627   | 70.0 | 1.51860 |
| 11 | −57.2394  | (d11)    |      |         |
| 12 | 38.8324   | 2.9313   | 53.9 | 1.71300 |
| 13 | 141.4542  | (d13)    |      |         |
| 14 | (diaphragm) | 2.0000 |      |         |
| 15 | −45.2367  | 1.2000   | 52.3 | 1.74810 |
| 16 | 25.3136   | 3.2146   | 25.4 | 1.80518 |
| 17 | 86.3355   | (d17)    |      |         |
| 18 | 49.6845   | 3.7880   | 50.8 | 1.65844 |
| 19 | −66.2974  | 1.5000   |      |         |
| 20 | 52.9095   | 2.0000   | 26.1 | 1.78470 |
| 21 | 26.8530   | 1.9865   |      |         |
| 22 | 134.4554  | 2.8736   | 45.4 | 1.79668 |
| 23 | −107.7591 | 0.2000   |      |         |
| 24 | 540.8718  | 5.9855   | 57.0 | 1.62280 |
| 25 | −19.9107  | 1.7000   | 23.0 | 1.86074 |
| 26 | −49.3725  |          |      |         |

16

Aspherical coefficients of first
k=1.0000
C2=0.0000
C4=3.9665E-6
C6=7.7825E-9
C8=−1.3483E-11
C10=2.1699E-14

Table of variable distances:

|     | 20.50    | 24.00    | 28.00    | 34.00    |
|-----|----------|----------|----------|----------|
| f   | 20.50    | 24.00    | 28.00    | 34.00    |
| R   | inf      | inf      | inf      | inf      |
| d8  | 19.81245 | 13.19465 | 7.54540  | 1.00000  |
| d11 | 3.53277  | 8.03935  | 10.95058 | 12.18067 |
| d13 | 1.30000  | 3.06781  | 5.05089  | 6.45949  |
| d17 | 9.12737  | 6.88872  | 4.40569  | 2.00000  |
| f   | 20.50    | 24.00    | 28.00    | 34.00    |
| R   | 500.00   | 500.00   | 500.00   | 500.00   |
| d8  | 22.34554 | 15.67965 | 10.03095 | 3.53360  |
| d11 | 0.99968  | 5.55435  | 8.46503  | 9.64707  |
| d13 | 1.30000  | 3.06781  | 5.05089  | 6.45949  |
| d17 | 9.12737  | 6.88872  | 4.40569  | 2.00000  |

Values corresponding to the conditions:

$f2/f3=0.879$           (1-1)

FIGS. 7A to 7C and 8A to 8C are aberration charts of the embodiment 2 at a phototaking distance R=inf., respectively at the wide angle end and at the telephoto end, while FIGS. 9A to 9C and 10A to 10C are aberration charts of the embodiment 2 at a phototaking distance R=500, respectively at the wide angle end and at the telephoto end. In these charts, FNO indicates F-number, NA indicates numerical aperture, Y indicates image height, d indicates d-line (λ=587.6 nm) and g indicates g-line (λ=435.6 nm). In the astigmatism chart, the solid line and broken line respectively indicate the sagittal and meridional image planes.

These aberration charts indicate that the present embodiment is satisfactorily corrected for the various aberrations and has excellent imaging performance.

[Embodiment 3]

Figures 11A, 11B:
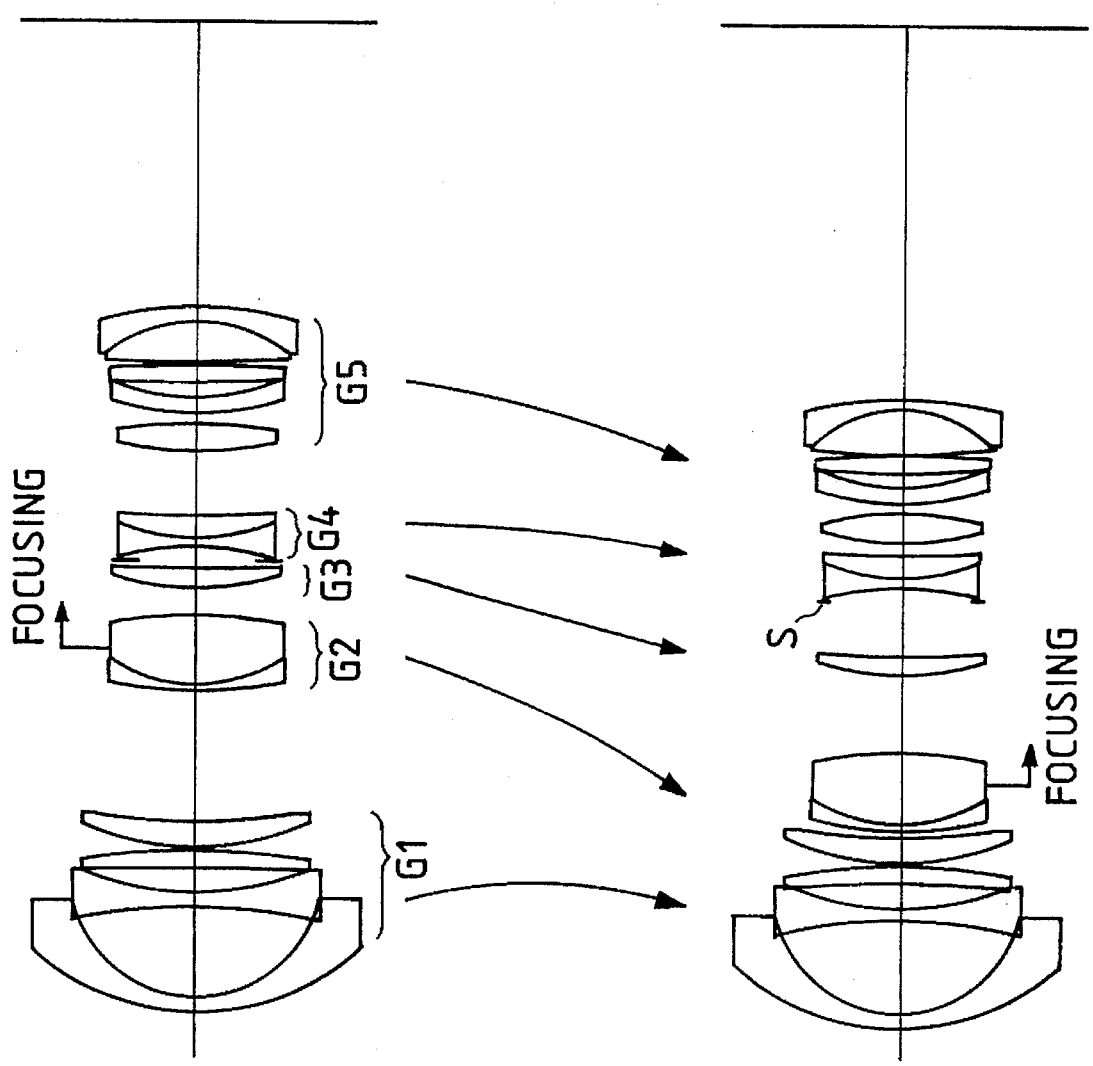
FIGS. 11A and 11B are views showing the configuration of an embodiment 3 of the present invention.
Figure 12A:
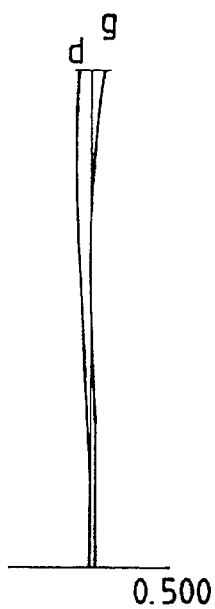
FIGS. 12A to 12C are aberration charts of the embodiment 3 at the wide angle end and at a phototaking distance R=inf.
Figure 12B:
Figure 12C:
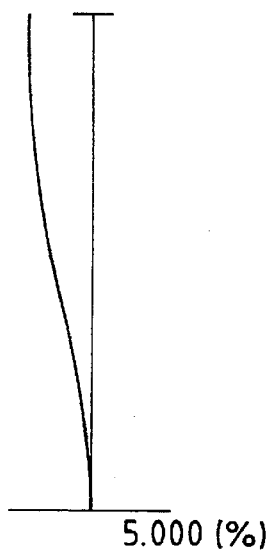
Figure 13A:
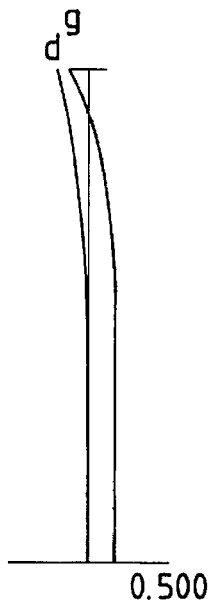
FIGS. 13A to 13C are aberration charts of the embodiment 3 at the telephoto end and at a phototaking distance R=inf.
Figure 13B:
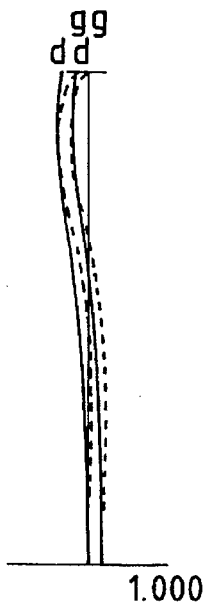
Figure 13C:
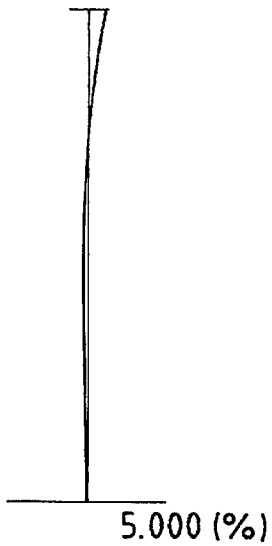
Figure 14A:
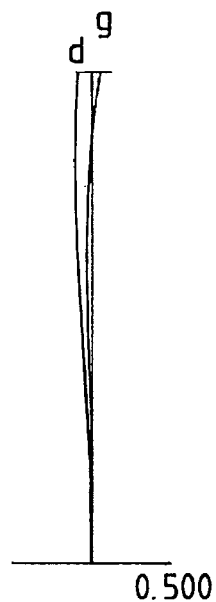
FIGS. 14A to 14C are aberration charts of the embodiment 3 at the wide angle end and at a phototaking distance R=500.
Figure 14B:
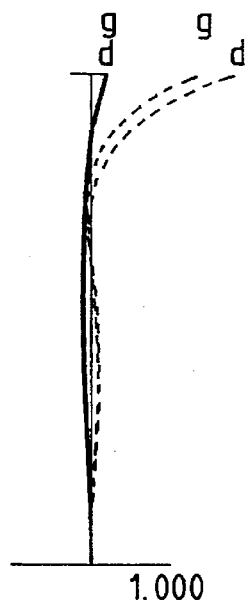
Figure 14C:
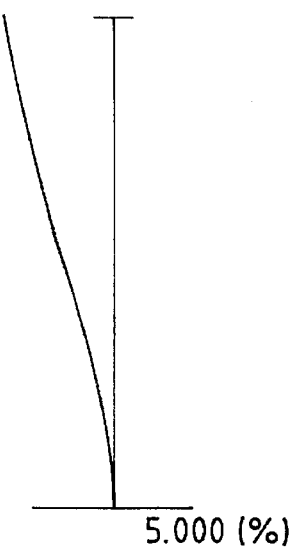
Figure 15A:
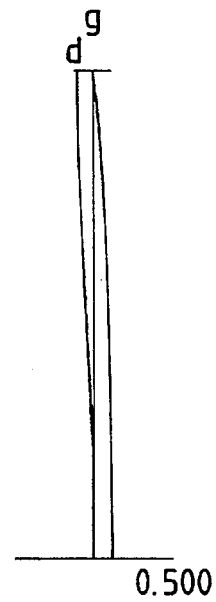
FIGS. 15A to 15C are aberration charts of the embodiment 3 at the telephoto end and at a phototaking distance R=500.
Figure 15B:
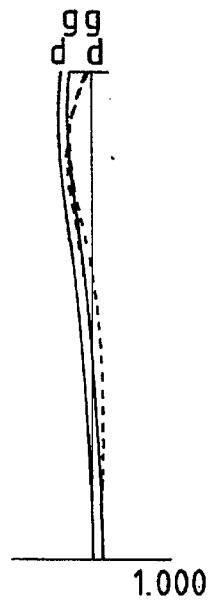
Figure 15C:
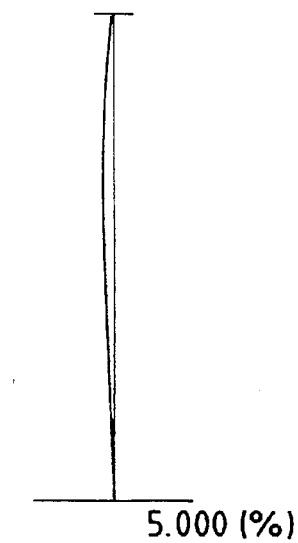

FIGS. 11A and 11B are views showing the configuration of the zoom lens of an embodiment 3, respectively at the wide angle end and at the telephoto end. The zoom lens is composed, in the order from the object side, of a negative first lens group G1, a positive second lens group G2, a positive third lens group G3, a negative fourth lens group G4 and a positive fifth lens group G5, wherein, at the zooming from the wide angle end to the telephoto end, the first lens group at first moves toward the image plane and then toward the object side, while the second to fifth lens groups move toward the object side, the air gap between the first and second lens groups decreases, that between the second and third lens groups and that between the third and fourth lens groups both increase, and that between the fourth and fifth lens groups decreases.

The focusing from a long object distance to a short object distance is executed by a movement of the second lens group toward the image plane.

The lens face, closest to the object side, in the first lens group is an aspherical face, the shape of which is given by:

$$X(y)=y^2/r\{1+(1-k\cdot y^2/r^2)^{1/2}\}+C2\cdot y^2+C4\cdot y^4+C6\cdot y^6+C8\cdot y^8+C10\cdot y^{10}$$

wherein X(y) is the axial distance from a tangential plane at the vertex of the aspherical face to a point of a height y on the aspherical face, r is the radius of paraxial curvature, k is the conical constant, and Ci is the i-th order aspherical coefficient.

The following Table 3 shows the parameters of the embodiment 3 of the present invention, wherein f is the focal length, F is the F-number and 2ω is the image angle. The numbers in the left-hand column indicate the order from the object side, r indicates the radius of curvature of the lens face, d is the distance between the lens faces, n and ν are the refractive index and the Abbe's number for d-line (λ=587.6 nm). R in the table of variable distances indicates the phototaking distance.

TABLE 3 f = 20.50–24.00–28.00–34.00
F/2 2.88
2ω = 95.35–85.14–75.16–64.32°

| | r | d | ν | n |
|---|---|---|---|---|
| 1 | 42.2787 | 2.5000 | 49.5 | 1.77279 |
| 2 | 18.5956 | 12.8205 | | |
| 3 | –83.4503 | 2.0000 | 47.5 | 1.78797 |
| 4 | 43.6860 | 3.3554 | | |
| 5 | –313.6719 | 2.6689 | 31.6 | 1.75692 |
| 6 | –98.0620 | 0.2000 | | |
| 7 | 37.0798 | 3.6299 | 31.6 | 1.75692 |
| 8 | 78.4894 | (d8) | | |
| 9 | 49.4652 | 1.2000 | 29.5 | 1.71736 |
| 10 | 24.3696 | 9.9505 | 70.0 | 1.51860 |
| 11 | –57.4190 | (d11) | | |
| 12 | 39.5690 | 2.8332 | 53.9 | 1.71300 |
| 13 | 126.0564 | (d13) | | |
| 14 | (diaphragm) | 2.0000 | | |
| 15 | –39.3369 | 1.2000 | 52.3 | 1.74810 |
| 16 | 25.9580 | 3.2949 | 25.4 | 1.80518 |
| 17 | 115.5584 | (d17) | | |
| 18 | 55.1843 | 4.2195 | 50.8 | 1.65844 |
| 19 | –54.8544 | 1.5000 | | |
| 20 | 48.3880 | 2.0000 | 26.1 | 1.78470 |
| 21 | 27.2065 | 2.0504 | | |
| 22 | 157.1203 | 2.7578 | 45.4 | 1.79668 |
| 23 | –119.4629 | 0.2000 | | |
| 24 | 319.2649 | 6.1314 | 57.0 | 1.62280 |
| 25 | –19.7617 | 1.7000 | 23.0 | 1.86074 |
| 26 | –51.3296 | | | |

Aspherical coefficients of first face:
k=1.0000
C2=0.0000
C4=4.1617E-6
C6=7.6785E-9
C8=–1.3588E-11
C10=2.2624E-14

Table of variable distances:

| f | 20.50 | 24.00 | 28.00 | 34.00 |
|---|---|---|---|---|
| R | inf | inf | inf | inf |
| d8 | 18.54847 | 12.02987 | 6.96334 | 1.00000 |
| d11 | 3.49271 | 3.02353 | 6.52852 | 11.09590 |
| d13 | 1.30000 | 3.89859 | 6.19148 | 7.83521 |
| d17 | 9.14416 | 7.61705 | 5.08422 | 2.00000 |
| f | 20.50 | 24.00 | 28.00 | 34.00 |
| R | 500.00 | 500.00 | 500.00 | 500.00 |
| d8 | 21.04149 | 14.47691 | 9.43263 | 3.54552 |
| d11 | 0.99969 | 0.57649 | 4.05923 | 8.55038 |
| d13 | 1.30000 | 3.89859 | 6.19148 | 7.83521 |
| d17 | 9.14416 | 7.61705 | 5.08422 | 2.00000 |

Values corresponding to the conditions:

$f2/f3 = 0.836$      (1-1)

FIGS. 12A to 12C and 13A to 13C are aberration charts of the embodiment 3 at a phototaking distance R=inf., respectively at the wide angle end and at the telephoto end,
while FIGS. 14A to 14C and 15A to 15C are aberration charts of the embodiment 3 at a phototaking distance r=500, respectively at the wide angle end and at the telephoto end. In these charts, FNO indicates F-number, NA indicates numerical aperture, Y indicates image height, d indicates d-line (λ=587.6 nm) and g indicates g-line (λ=435.6 nm). In the astigmatism chart, the solid line and broken line respectively indicate the sagittal and meridional image planes.

These aberration charts indicate that the present embodiment is satisfactorily corrected for the various aberrations and has excellent imaging performance.

[Embodiment 4]

Figures 16A, 16B:
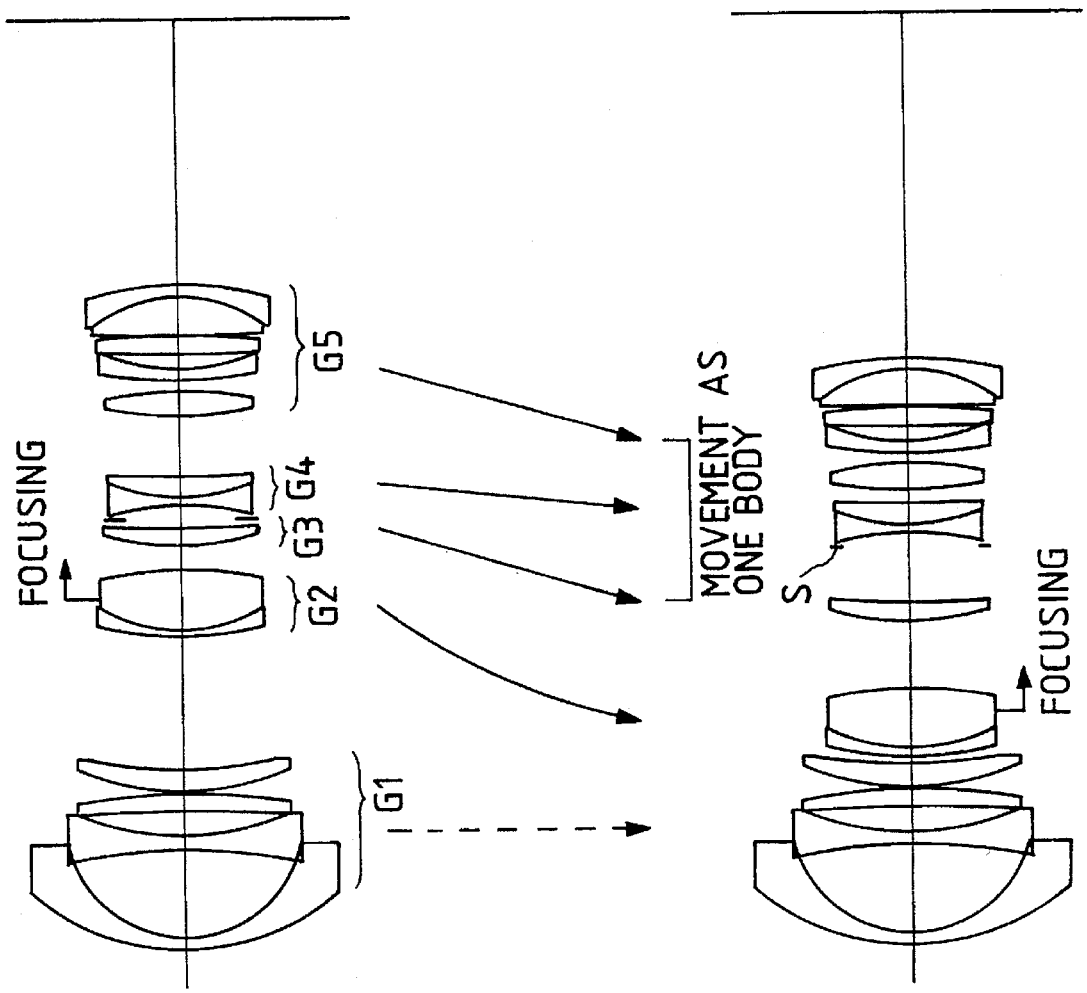
FIGS. 16A and 16B are views showing the configuration of an embodiment 4 of the present invention.
Figure 17A:
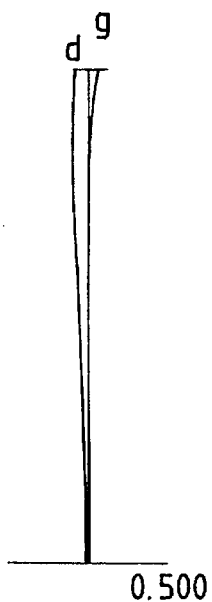
FIGS. 17A to 17C are aberration charts of the embodiment 4 at the wide angle end and at a phototaking distance R=inf.
Figure 17B:
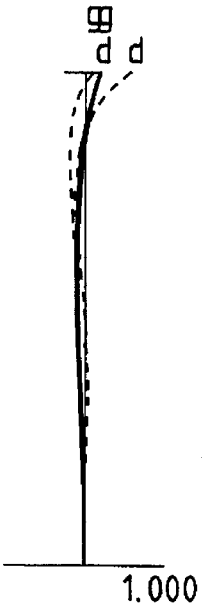
Figure 17C:
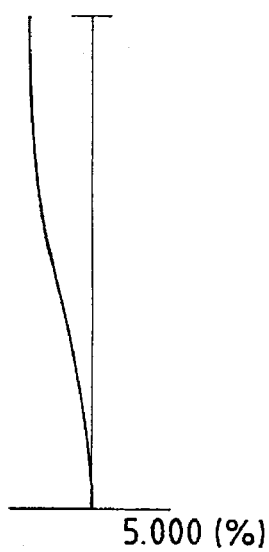
Figure 18A:
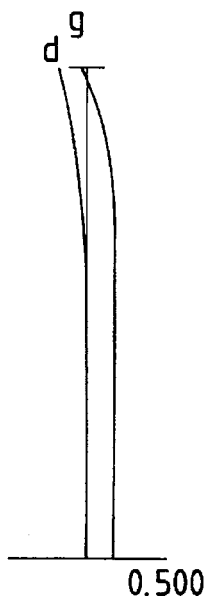
FIGS. 18A to 18C are aberration charts of the embodiment 4 at the telephoto end and at a phototaking distance R=inf.
Figure 18B:
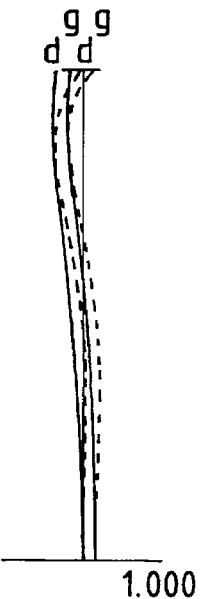
Figure 18C:
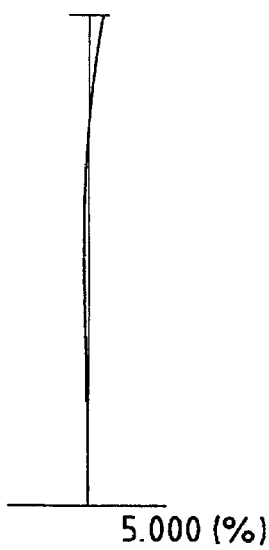
Figure 19A:
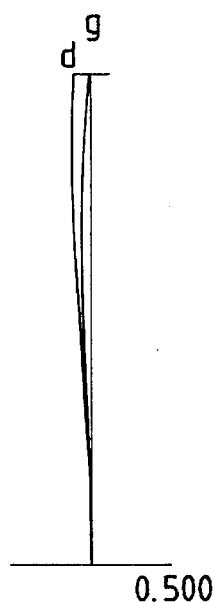
FIGS. 19A to 19C are aberration charts of the embodiment 4 at the wide angle end and at a phototaking distance R=500.
Figure 19B:
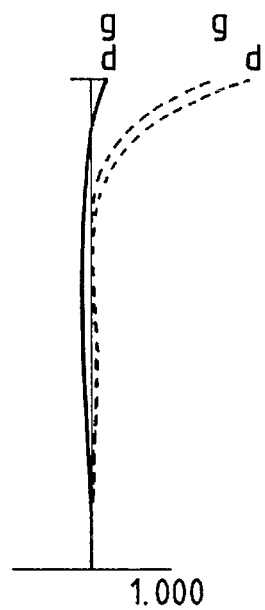
Figure 19C:
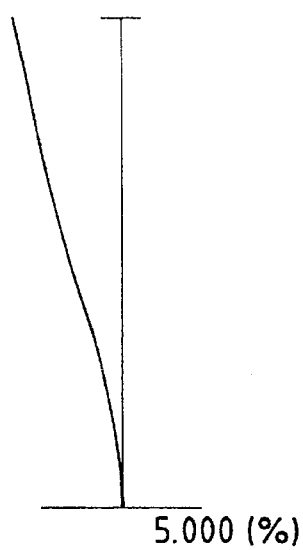
Figure 20A:
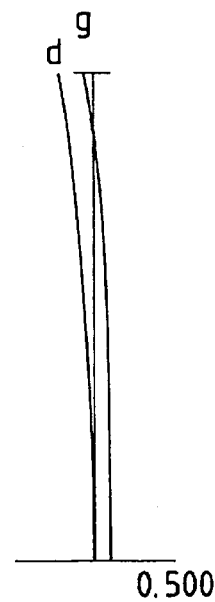
FIGS. 20A to 20C are aberration charts of the embodiment 4 at the telephoto end and at a phototaking distance R=500.
Figure 20B:
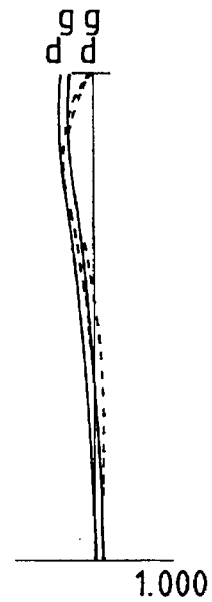
Figure 20C:
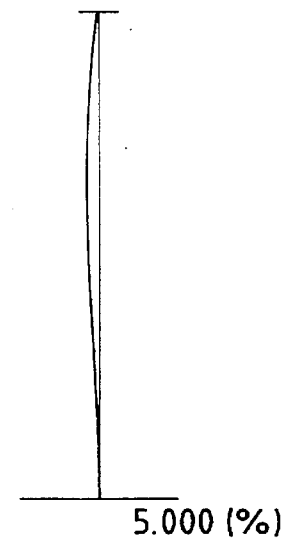

FIGS. 16A and 16B are views showing the configuration of the zoom lens of an embodiment 4, respectively at the wide angle end and at the telephoto end. The zoom lens is composed, in the order from the object side, of a negative first lens group G1, a positive second lens group G2, a positive third lens group G3, a negative fourth lens group G4 and a positive fifth lens group G5, wherein, at the zooming from the wide angle end to the telephoto end, the first lens group remains fixed while the second to fifth lens groups move toward the object side, in which the third and fifth lens groups move integrally, the air gap between the first and second lens groups decreases, that between the second and third lens groups and that between the third and fourth lens groups both increase, and that between the fourth and fifth lens groups decreases.

The focusing from a long object distance to a short object distance is executed by a movement of the second lens group toward the image plane.

The lens face, closest to the object side, in the first lens group is an aspherical face, the shape of which is given by:

$$X(y) = y^2/r \cdot \{1+(1-k \cdot y^2/r^2)^{1/2}\} + C2 \cdot y^2 + C4 \cdot y^4 + C6 \cdot y^6 + C8 \cdot y^8 + C10 \cdot y^{10}$$

wherein X(y) is the axial distance from a tangential plane at the vertex of the aspherical face to a point of a height y on the aspherical face, r is the radius of paraxial curvature, k is the conical constant, and Ci is the i-th order aspherical coefficient.

The following Table 4 shows the parameters of the embodiment 4 of the present invention, wherein f is the focal length, F is the F-number and 2ω is the image angle. The numbers in the left-hand column indicate the order from the object side, r indicates the radius of curvature of the lens face, d is the distance between the lens faces, n and ν are the refractive index and the Abbe's number for d-line (λ=587.6 nm). R in the table of variable distances indicates the phototaking distance.

TABLE 4 f = 20.50–24.00–28.00–34.00
F/2.88
2ω = 95.35–85.18–74.16–64.34°

| | r | d | ν | n |
|---|---|---|---|---|
| 1 | 42.9194 | 2.5000 | 49.5 | 1.77279 |
| 2 | 18.7365 | 12.6821 | | |
| 3 | –82.5205 | 2.0000 | 47.5 | 1.78797 |
| 4 | 43.4952 | 3.4977 | | |
| 5 | –238.6736 | 2.7663 | 31.6 | 1.75692 |
| 6 | –83.8838 | 0.2000 | | |
| 7 | 38.0192 | 3.5274 | 31.6 | 1.75692 |
| 8 | 77.9821 | (d8) | | |
| 9 | 48.0044 | 1.2000 | 29.5 | 1.71736 |
| 10 | 24.7177 | 9.0251 | 70.0 | 1.51860 |
| 11 | –58.6904 | (d11) | | |
| 12 | 40.7663 | 2.7567 | 53.9 | 1.71300 |
| 13 | 118.4476 | (d13) | | |
| 14 | (diaphragm) | 2.0000 | | |

TABLE 4-continued f = 20.50–24.00–28.00–34.00
F/2.88
2ω = 95.35–85.18–74.16–64.34°

| | r | d | ν | n |
|---|---|---|---|---|
| 15 | −40.4319 | 1.2000 | 52.3 | 1.74810 |
| 16 | 28.4761 | 3.2720 | 25.4 | 1.80518 |
| 17 | 189.1119 | (d17) | | |
| 18 | 57.0051 | 3.7547 | 50.8 | 1.65844 |
| 19 | −58.5179 | 1.5000 | | |
| 20 | 56.2881 | 2.0000 | 26.1 | 1.78470 |
| 21 | 27.4966 | 1.8584 | | |
| 22 | 117.3432 | 2.9130 | 45.4 | 1.79668 |
| 23 | −113.2325 | 0.2000 | | |
| 24 | 618.0544 | 5.9171 | 57.0 | 1.62280 |
| 25 | −19.9986 | 1.7000 | 23.0 | 1.86074 |
| 26 | −51.7194 | | | |

Aspherical coefficients of first face:
k=1.0000
C2=0.0000
C4=4.0841E-6
C6=7.8040E-9
C8=−1.3893E-11
C10=2.1905E-14

Table of variable distances:

| f | 20.50 | 24.00 | 28.00 | 34.00 |
|---|---|---|---|---|
| R | inf | inf | inf | inf |
| d8 | 19.64565 | 13.03788 | 7.41693 | 1.06090 |
| d11 | 3.52598 | 7.52908 | 9.88906 | 10.32421 |
| d13 | 1.30000 | 3.48108 | 5.93295 | 8.33028 |
| d17 | 9.03027 | 6.84919 | 4.39732 | 2.00000 |
| f | 20.50 | 24.00 | 28.00 | 34.00 |
| R | 500.00 | 500.00 | 500.00 | 500.00 |
| d8 | 22.17212 | 15.51720 | 9.89740 | 3.58791 |
| d11 | 0.99950 | 5.04976 | 7.40860 | 7.79719 |
| d13 | 1.30000 | 3.48108 | 5.93295 | 8.33028 |
| d17 | 9.03027 | 6.84919 | 4.39732 | 2.00000 |

Values corresponding to the conditions:

$f2/f3=0.758$ (1-1)

FIGS. 17A to 17C and 18A to 18C are aberration charts of the embodiment 4 at a phototaking distance R=inf., respectively at the wide angle end and at the telephoto end, while FIGS. 19A to 19C and 20A to 20C are aberration charts of the embodiment 4 at a phototaking distance R=500, respectively at the wide angle end and at the telephoto end. In these charts, FNO indicates F-number, NA indicates numerical aperture, Y indicates image height, d indicates d-line (λ=587.6 nm) and g indicates g-line (λ=435.6 nm). In the astigmatism chart, the solid line and broken line respectively indicate the sagittal and meridional planes.

These aberration charts indicate that the present embodiment is satisfactorily corrected for the various aberrations and has excellent imaging performance.

[Embodiment 5]

Figures 21A, 21B:
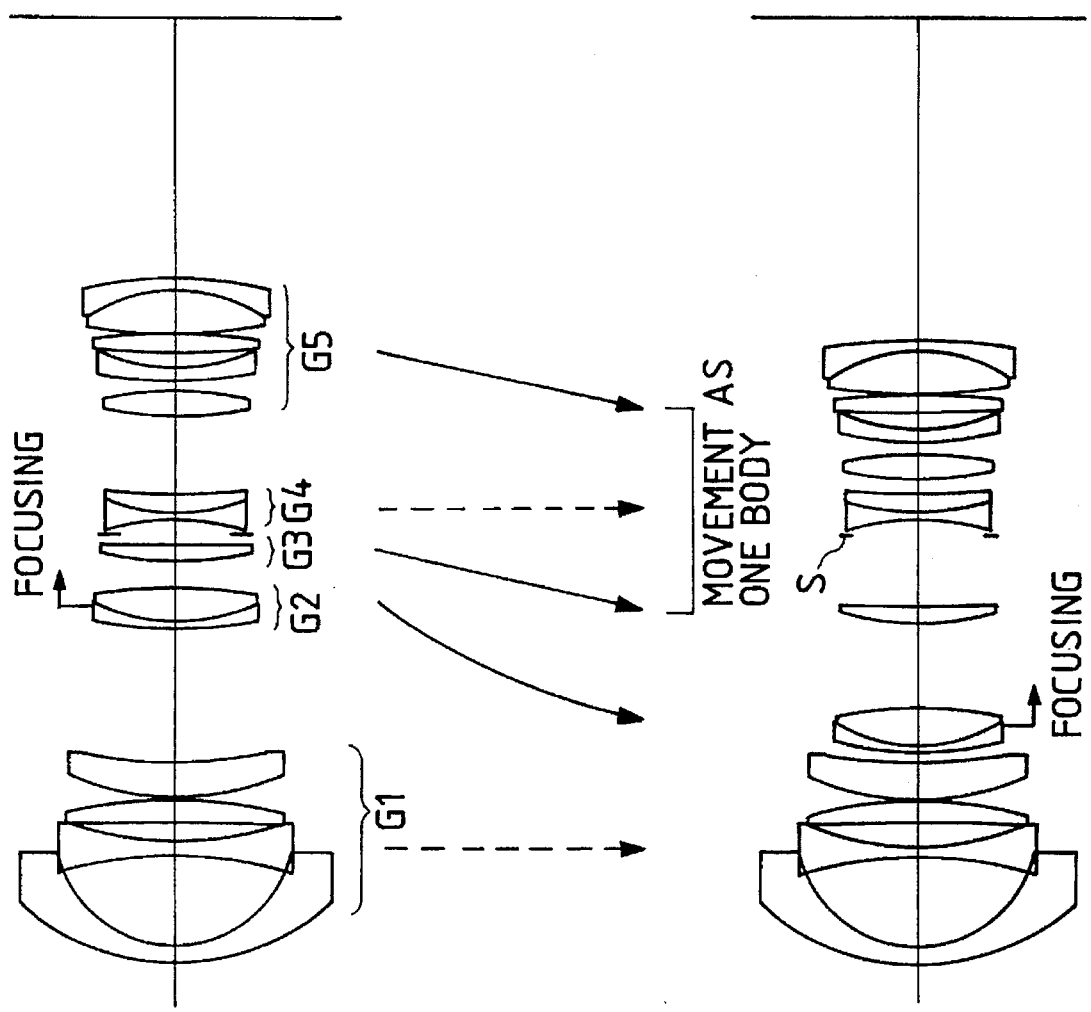
FIGS. 21A and 21B are views showing the configuration of an embodiment 5 of the present invention.
Figure 22A:
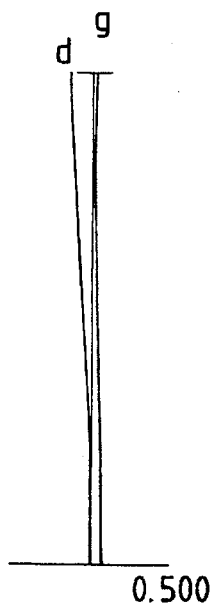
FIGS. 22A to 22C are aberration charts of the embodiment 5 at the wide angle end and at a phototaking distance R=inf.
Figure 22B:
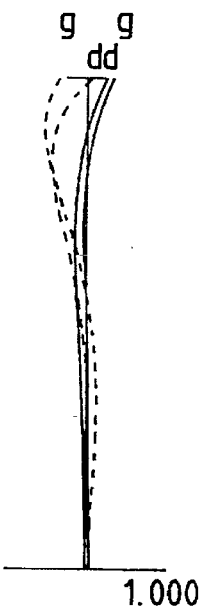
Figure 22C:
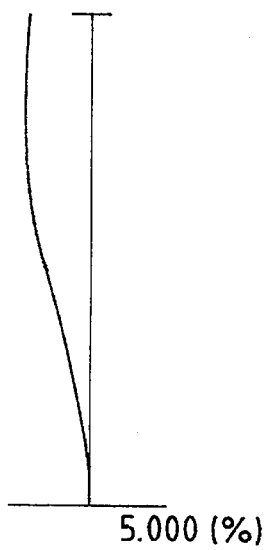
Figure 23A:
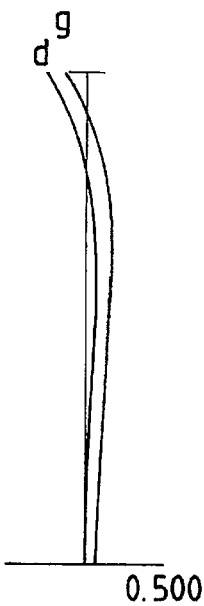
FIGS. 23A to 23C are aberration charts of the embodiment 5 at the telephoto end and at a phototaking distance R=inf.
Figure 23B:
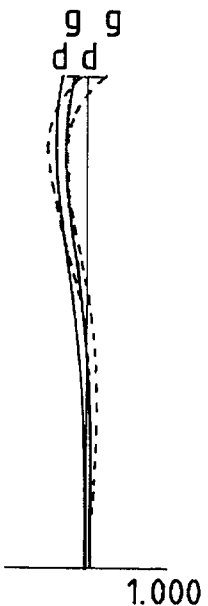
Figure 23C:
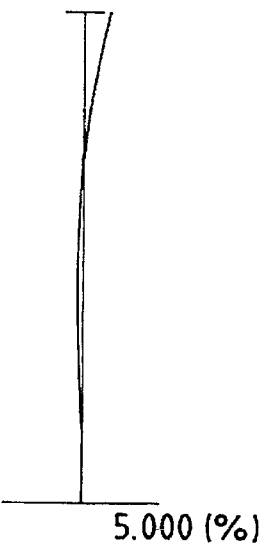
Figure 24A:
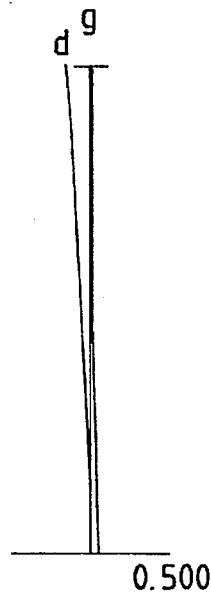
FIGS. 24A to 24C are aberration charts of the embodiment 5 at the wide angle end and at a phototaking distance R=500.
Figure 24B:
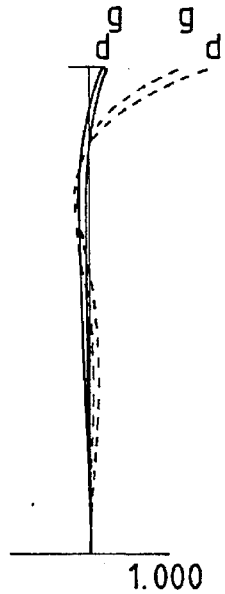
Figure 24C:
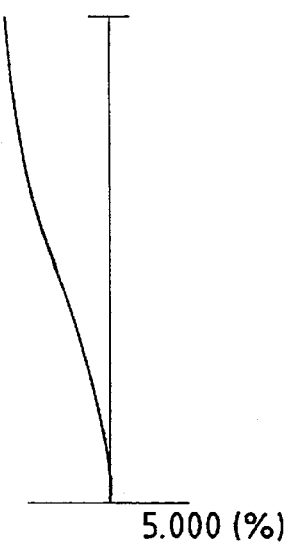
Figure 25A:
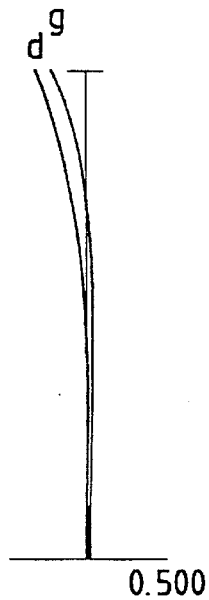
FIGS. 25A to 25C are aberration charts of the embodiment 5 at the telephoto end and at a phototaking distance R=500.
Figure 25B:
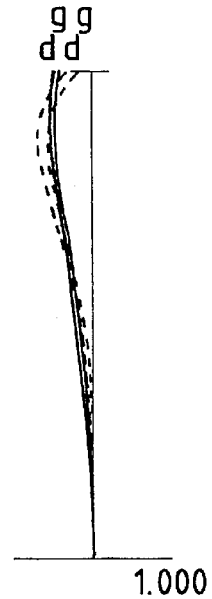
Figure 25C:
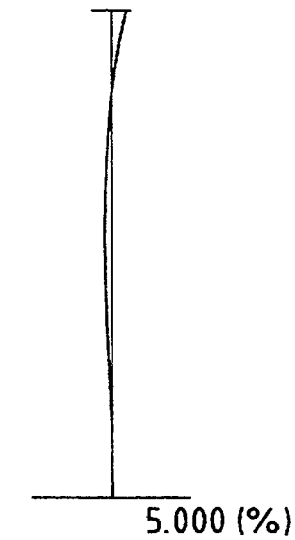

FIGS. 21A and 21B are views showing the configuration of the zoom lens of an embodiment 5, respectively at the wide angle end and at the telephoto end. The zoom lens is composed, in the order from the object side, of a negative first lens group G1, a positive second lens group G2, a positive third lens group G3, a negative fourth lens group G4 and a positive fifth lens group G5, wherein, at the zooming from the wide angle end to the telephoto end, the first and fourth lens group remain fixed while the second, third and fifth lens groups move toward the object side, in which the third and fifth lens groups move integrally, the air gap between the first and second lens groups decreases, that between the second and third lens groups and that between the third and fourth lens groups both increase, and that between the fourth and fifth lens groups decreases.

The focusing from a long object distance to a short object distance is executed by a movement of the second lens group toward the image plane.

The lens face, closest to the object side, in the first lens group is an aspherical face, the shape of which is given by:

$$X(y)=y^2/[r \cdot \{1+(1-k \cdot y^2/r^2)^{1/2}\}]+C2 \cdot y^2+C4 \cdot y^4+C6 \cdot y^6+C8 \cdot y^8+C10 \cdot y^{10}$$

wherein $X(y)$ is the axial distance from a tangential plane at the vertex of the aspherical face to a point of a height y on the aspherical face, r is the radius of paraxial curvature, k is the conical constant, and Ci is the i-th order aspherical coefficient.

The following Table 5 shows the parameters of the embodiment 5 of the present invention, wherein f is the focal length, F is the F-number and 2ω is the image angle. The numbers in the left-hand column indicate the order from the object side, r indicates the radius of curvature of the lens face, d is the distance between the lens faces, n and ν are the refractive index and the Abbe's number for d-line (λ=587.6 nm). R in the table of variable distances indicates the phototaking distance.

TABLE 5 f = 20.50–24.00–28.00–34.00
F/2.88
2ω = 95.26–84.00–74.54–63.93°

| | r | d | ν | n |
|---|---|---|---|---|
| 1 | 45.0946 | 2.5000 | 49.5 | 1.77279 |
| 2 | 18.5508 | 12.8994 | | |
| 3 | −69.9954 | 2.0000 | 47.5 | 1.78797 |
| 4 | 52.6057 | 3.0830 | | |
| 5 | −206.1849 | 3.0425 | 31.6 | 1.75692 |
| 6 | −68.5671 | 0.2000 | | |
| 7 | 38.2998 | 5.4790 | 31.6 | 1.75692 |
| 8 | 71.0594 | (d8) | | |
| 9 | 49.2052 | 1.2000 | 29.5 | 1.71736 |
| 10 | 25.8105 | 5.3940 | 70.0 | 1.51860 |
| 11 | −60.9739 | (d11) | | |
| 12 | 50.6519 | 2.8567 | 53.9 | 1.71300 |
| 13 | 834.2608 | (d13) | | |
| 14 | (diaphragm) | 2.0000 | | |
| 15 | −42.6372 | 1.2000 | 52.3 | 1.74810 |
| 16 | 34.1340 | 2.7374 | 25.4 | 1.80518 |
| 17 | 131.5213 | (d17) | | |
| 18 | 63.4331 | 3.8965 | 50.8 | 1.65844 |
| 19 | −58.1149 | 1.5000 | | |
| 20 | 55.4961 | 2.0000 | 26.1 | 1.78470 |
| 21 | 28.4509 | 2.2469 | | |
| 22 | 140.8853 | 2.8147 | 45.4 | 1.79668 |
| 23 | −161.0326 | 0.2000 | | |
| 24 | 111.3437 | 6.3885 | 57.0 | 1.62280 |
| 25 | −24.7081 | 1.7000 | 23.0 | 1.86074 |
| 26 | −66.6294 | | | |

Aspherical coefficients of first face:
k=1.0000
C2=0.0000
C4=3.9675E-6
C6=7.7738E-9
C8=−1.2284E-11
C10=1.8402E-14

| Table of variable distances: | | | | |
|---|---|---|---|---|
| f | 20.50 | 24.00 | 28.00 | 34.00 |
| R | inf | inf | inf | inf |
| d8 | 19.41514 | 12.67603 | 7.00320 | 1.42703 |
| d11 | 3.64652 | 8.11874 | 11.05741 | 12.60499 |
| d13 | 1.30000 | 3.56689 | 6.30106 | 10.32964 |
| d17 | 11.29960 | 9.03271 | 6.29854 | 2.26996 |
| f | 20.50 | 24.00 | 28.00 | 34.00 |
| R | 500.00 | 500.00 | 500.00 | 500.00 |
| d8 | 22.06199 | 15.27809 | 9.61057 | 4.07782 |
| d11 | 0.99967 | 5.51668 | 8.45003 | 9.95420 |
| d13 | 1.30000 | 3.56689 | 6.30106 | 10.32964 |
| d17 | 11.29960 | 9.03271 | 6.29854 | 2.26996 |

Values corresponding to the conditions:

$f2/f3 = 0.873$ \hfill (1-1)

FIGS. 22A to 22C and 23A to 23C are aberration charts of the embodiment 5 at a phototaking distance R=inf., respectively at the wide angle end and at the telephoto end, while FIGS. 24A to 24C and 25A to 25C are aberration charts of the embodiment 5 at a phototaking distance R=500, respectively at the wide angle end and at the telephoto end. In these charts, FNO indicates F-number, NA indicates numerical aperture, Y indicates image height, d indicates d-line ($\lambda$=587.6 nm) and g indicates g-line ($\lambda$=435.6 nm). In the astigmatism chart, the solid line and broken line respectively indicate the sagittal and meridional planes.

These aberration charts indicate that the present embodiment is satisfactorily corrected for the various aberrations, and has excellent imaging performance.

As explained in the foregoing, according to a first aspect of the present invention, there can be provided a zoom lens enabling the focusing in the inner focusing method suitable for auto focusing, while achieving a wider image angle and a larger aperture ratio. Also, even in the use of the inner focusing, the amount of movement of the focusing lens group for a given phototaking distance can be made substantially constant for any focal length, so that satisfactory operation performance can also be attained.

It is furthermore possible to fix the first lens group, thereby improving the resistance of the zoom lens against mechanical shock, intrusion of waterdrops and dusts.

It is furthermore possible to simplify the structure and to reduce the number of components, by fixing the first or fourth lens group, or by integrally moving the third and fifth lens groups.

[Embodiment 6]

Figures 26A, 26B:
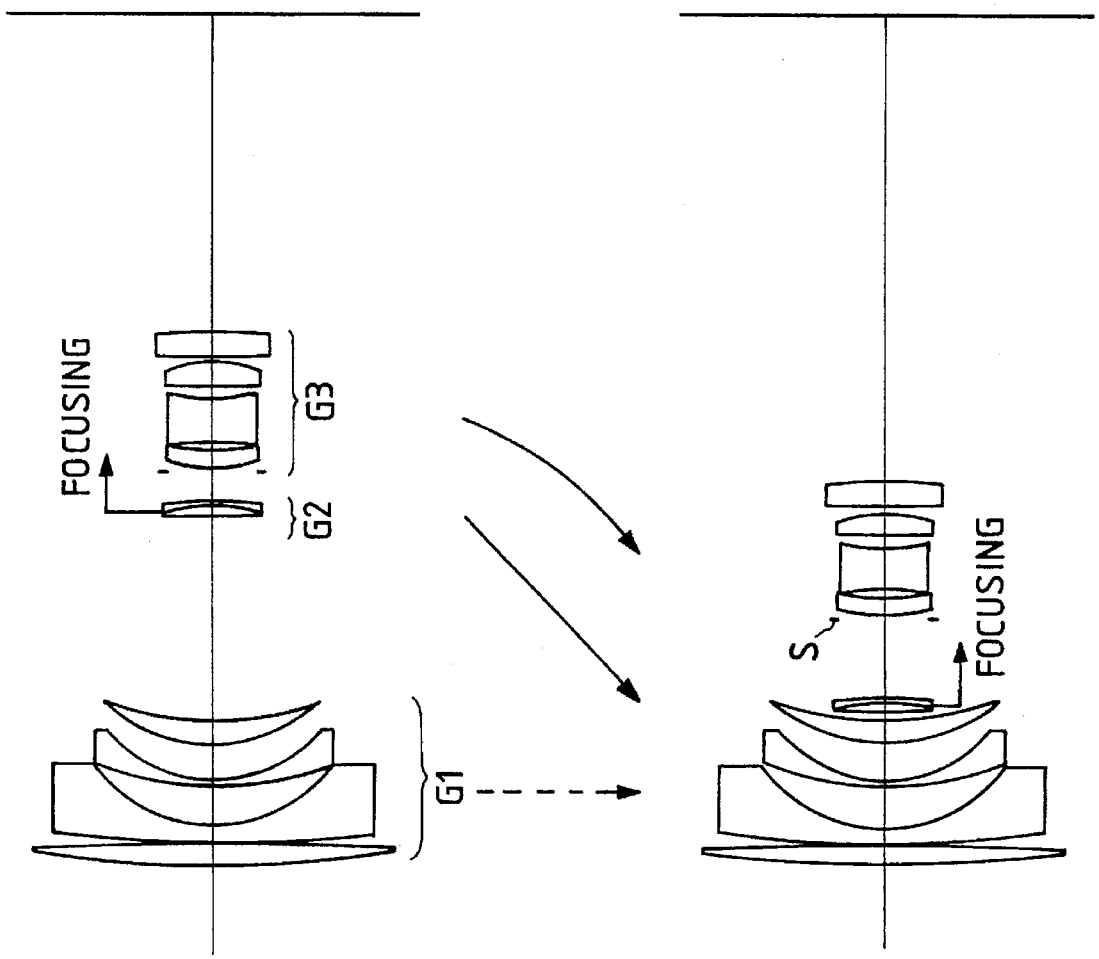
FIGS. 26A and 26B are views showing the configuration of an embodiment 6 of the present invention.
Figure 27A:
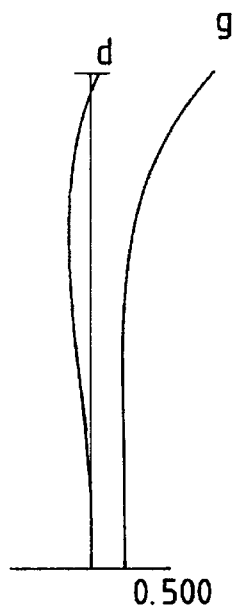
FIGS. 27A to 27C are aberration charts of the embodiment 6 at the wide angle end and at a phototaking distance R=inf.
Figure 27B:
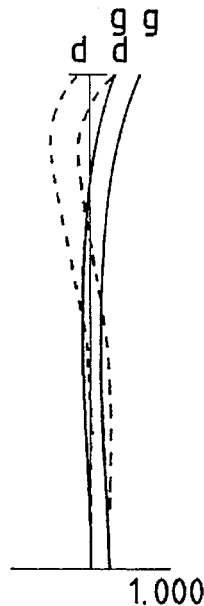
Figure 27C:
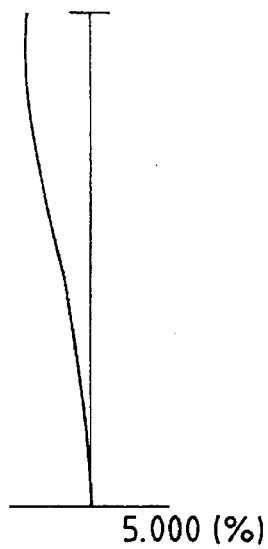
Figure 28A:
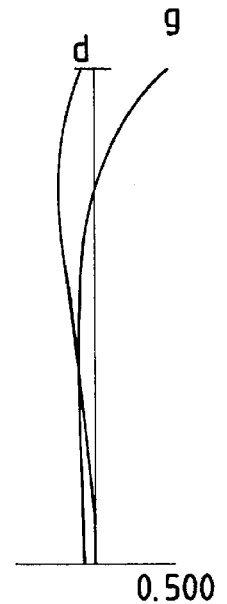
FIGS. 28A to 28C are aberration charts of the embodiment 6 at the telephoto end and at a phototaking distance R=inf.
Figure 28B:
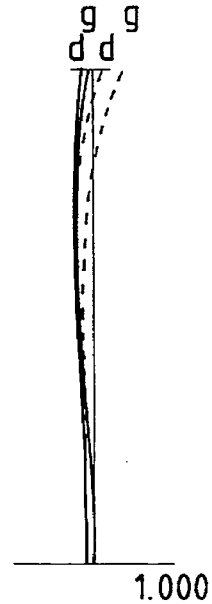
Figure 28C:
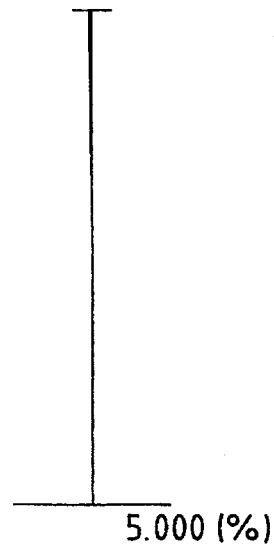
Figure 29A:
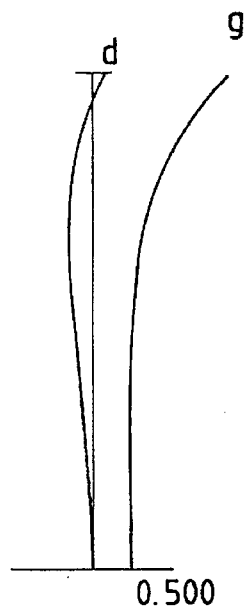
FIGS. 29A to 29C are aberration charts of the embodiment 6 at the wide angle end and at a phototaking distance R=500.
Figure 29B:
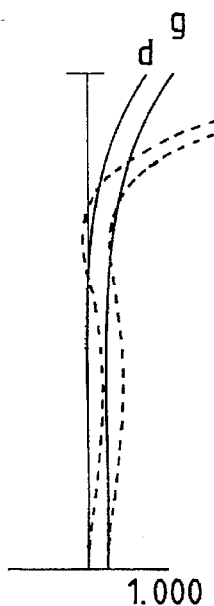
Figure 29C:
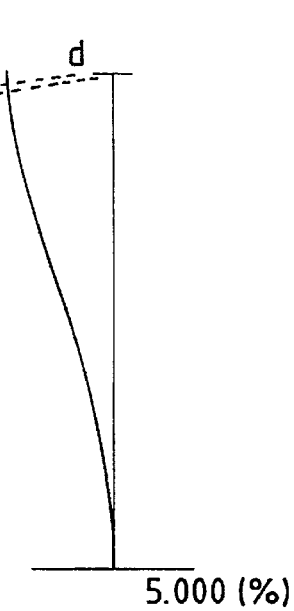
Figure 30A:
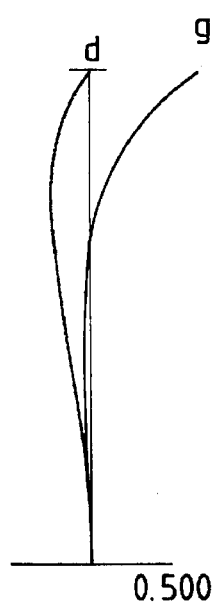
FIGS. 30A to 30C are aberration charts of the embodiment 6 at the telephoto end and at a phototaking distance R=500.
Figure 30B:
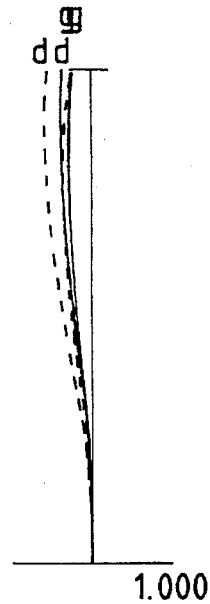
Figure 30C:
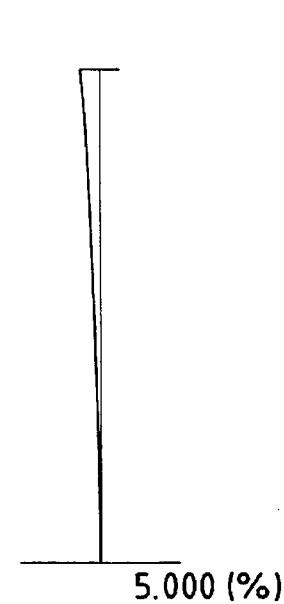
Figure 32A:
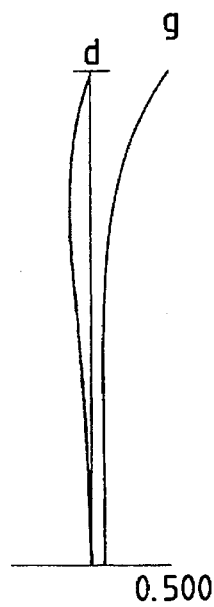
FIGS. 32A to 32C are aberration charts of the embodiment 9 at the wide angle end and at a phototaking distance R=inf.
Figure 32B:
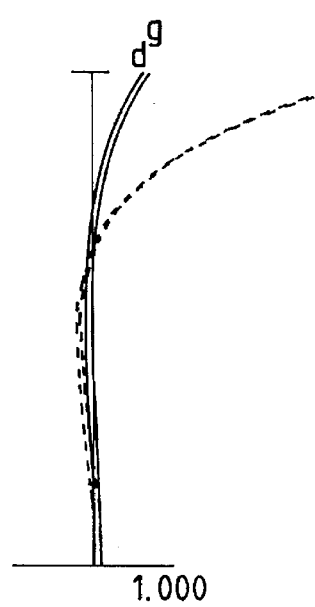
Figure 32C:
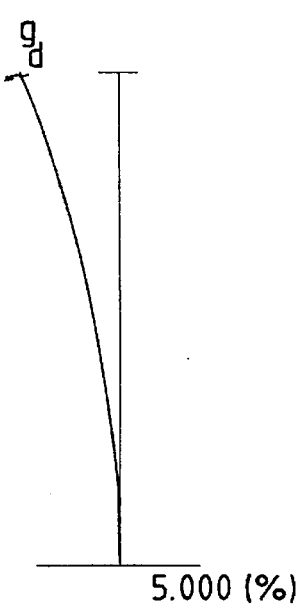
Figure 33A:
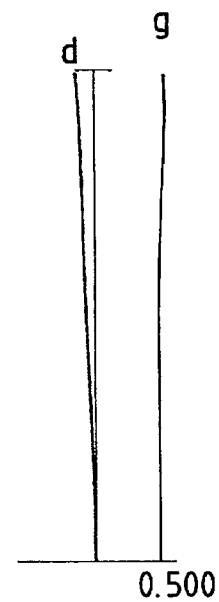
FIGS. 33A to 33C are aberration charts of the embodiment 9 at the telephoto end and at a phototaking distance R=inf.
Figure 33B:
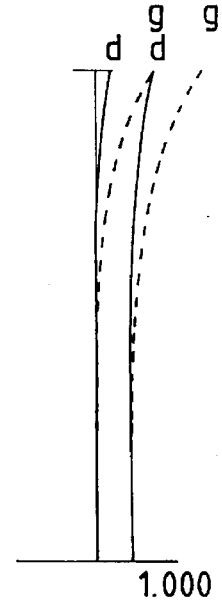
Figure 33C:
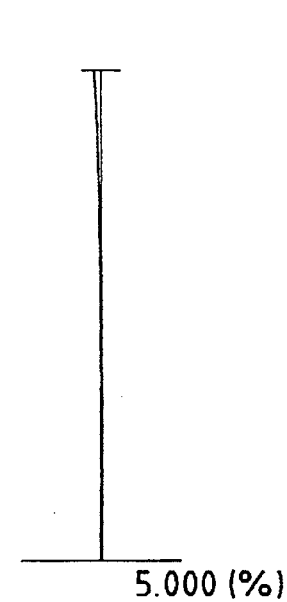
Figure 34A:
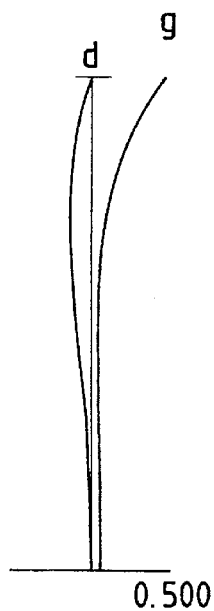
FIGS. 34A to 34C are aberration charts of the embodiment 9 at the wide angle end and at a phototaking distance R=500.
Figure 34B:
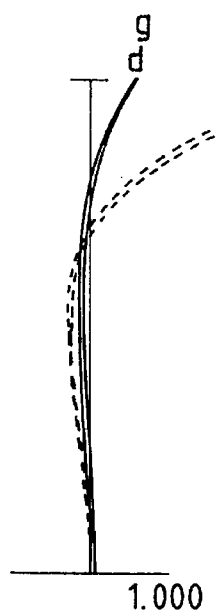
Figure 34C:
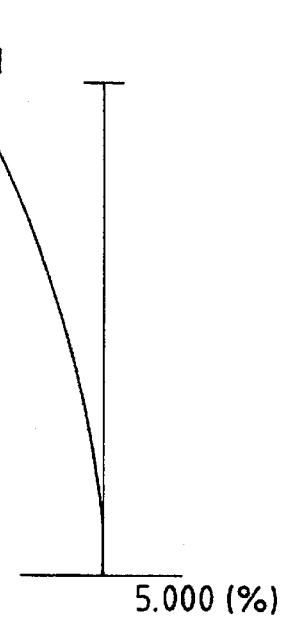
Figure 35A:
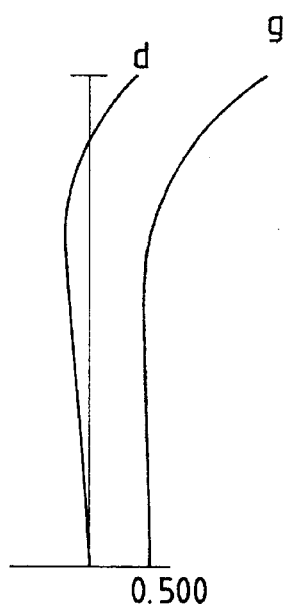
FIGS. 35A to 35C are aberration charts of the embodiment 9 at the telephoto end and at a phototaking distance R=500.
Figure 35B:
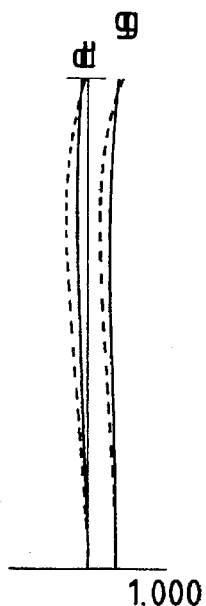
Figure 35C:
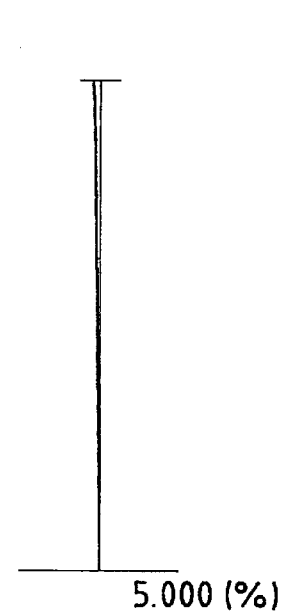

FIGS. 26A and 26B are views showing the configuration of the zoom lens of an embodiment 6, respectively at the wide angle end and at the telephoto end. The zoom lens is composed, in the order from the object side, of a negative first lens group G1, a positive second lens group G2 and a positive third lens group G3, wherein, at the zooming from the wide angle end to the telephoto end, the first lens group remains fixed while the second and third lens groups move toward the object side, the air gap between the first and second lens groups decreases and that between the second and third lens groups increases in the vicinity of the wide angle end and decreases in the vicinity of the telephoto end.

The fourth lens face, from the object side, in the first lens group is an aspherical face, the shape of which is given by:

$$X(y) = y^2/[r\{1+(1-k \cdot y^2/r^2)^{1/2}\}] + C2 \cdot y^2 + C4 \cdot y^4 + C6 \cdot y^6 + C8 \cdot y^8 + C10 \cdot y^{10}$$

wherein X(y) is the axial distance from a tangential plane at the vertex of the aspherical face to a point of a height y on the aspherical face, r is the radius of paraxial curvature, k is the conical constant, and Ci is the i-th order aspherical coefficient.

The focusing from a long object distance to a short object distance is achieved by a movement of the second lens group toward the image plane.

The following Table 6 shows the parameters of the embodiment 6 of the present invention, wherein f is the focal length, F is the F-number and 2$\omega$ is the image angle. The numbers in the left-hand column indicate the order from the object side, r indicates the radius of curvature of the lens face, d is the distance between the lens faces, n and v are the refractive index and the Abbe's number for d-line ($\lambda$=587.6 nm). R in the table of variable distances indicates the phototaking distance.

TABLE 6 f = 25.50–35.00–48.80
F/4.14–4.70–5.57
2$\omega$ = 82.91–63.70–47.79°

| | r | d | v | n |
|---|---|---|---|---|
| 1 | 208.6765 | 3.0000 | 65.4 | 1.60300 |
| 2 | −623.7782 | 0.0548 | | |
| 3 | 210.5357 | 2.5000 | 65.4 | 1.60300 |
| 4 | 19.9725 | 5.5000 | | |
| 5 | 42.5624 | 1.2000 | 45.4 | 1.79668 |
| 6 | 20.4141 | 5.6000 | | |
| 7 | 24.8382 | 4.0000 | 25.5 | 1.73038 |
| 8 | 53.0935 | (d8) | | |
| 9 | 1084.4533 | 1.6000 | 57.5 | 1.67025 |
| 10 | −27.9749 | 0.7000 | 28.6 | 1.79504 |
| 11 | −45.7106 | (d11) | | |
| 12 | (diaphragm) | 0.2000 | | |
| 13 | 16.7266 | 3.0018 | 38.2 | 1.65128 |
| 14 | 41.3336 | 1.2876 | | |
| 15 | −45.9100 | 6.1272 | 28.2 | 1.74000 |
| 16 | 22.3961 | 1.7690 | | |
| 17 | 90.0420 | 3.6026 | 58.9 | 1.51823 |
| 18 | −21.8614 | 0.8623 | | |
| 19 | 457.3628 | 4.0430 | 40.8 | 1.58144 |
| 20 | −77.1791 | | | |

Aspherical coefficients of fourth face:
k=0.9187
C2=0.0000
C4=−7.5000E-6
C6=−1.0998E-8
C8=−9.0408E-12
C10=−1.6277E-13

| Table of variable distances: | | | |
|---|---|---|---|
| f | 25.50 | 35.00 | 48.80 |
| R | inf | inf | inf |
| d8 | 30.70235 | 14.23426 | 0.97971 |
| d11 | 4.48860 | 12.19658 | 11.98281 |
| f | 25.50 | 35.00 | 48.80 |
| R | 500.00 | 500.00 | 500.00 |
| d8 | 34.91466 | 18.27179 | 5.18155 |
| d11 | 0.27629 | 8.15905 | 7.78097 |

Values corresponding to the conditions:
$\beta2t = 5.004$
$\beta2w = -4.915$
$f2/f3 = 1.208$
$f2/(|f1|+e1t) = 1.250$
$f2/(|f1|+e1w) = 0.831$
$f3/e3w = 1.145$
$f3/e3t = 0.808$ FIGS. 27A to 27C and 28A to 28C are aberration charts of the embodiment 6 at a phototaking distance R=inf., respectively at the wide angle end and at the telephoto end, while FIGS. 29A to 29C and 30A to 30C are aberration charts of the embodiment 6 at a phototaking distance R=500, respectively at the wide angle end and at the telephoto end. In these charts, FNO indicates F-number, NA indicates numerical aperture, Y indicates image height, d indicates d-line (λ=587.6 nm) and g indicates g-line (λ=435.6 nm). In the astigmatism chart, the solid line and broken line respectively indicate the sagittal and meridional planes.

These aberration charts indicate that the present embodiment is satisfactorily corrected for the various aberrations, and has excellent imaging performance.

[Embodiment 7]

The zoom lens of the embodiment 7 is the same, in the configuration and the parameters, as that of the embodiment 1, except for the following values, and the aberration charts are also the same as those of the embodiment 1:

Values corresponding to the conditions:

β2t=3.410

β2w=19.601 f2/f3=1.036 f2/(|f1|+e1t)=1.414 f2/(|f1|+e1w)=1.054

[Embodiment 8]

The zoom lens of the embodiment 8 is the same, in the configuration and the parameters, as that of the embodiment 2, except for the following values, and the aberration charts are also the same as those of the embodiment 2:

Values corresponding to the conditions:

β2t=6.895

β2w=−6.967 f2/f3=0.879 f2/(|f1|+e1t)=1.170 f2/(|f1|+e1w)=0.874

[Embodiment 9]

FIGS. 31A and 31B are views showing the configuration of the zoom lens of an embodiment 9, respectively at the wide angle end and at the telephoto end. The zoom lens is composed, in the order from the object side, of a negative first lens group G1, a positive second lens group G2 and a positive third lens group G3, wherein, at the zooming from the wide angle end to the telephoto end, the first lens group remains fixed while the second and third lens groups move toward the object side, the air gap between the first and second lens groups decreases and that between the second and third lens groups increases in the vicinity of the wide angle end and decreases in the vicinity of the telephoto end.

The fourth lens face, from the object side, in the first lens group is an aspherical face, the shape of which is given by:

$$X(y)=y^2/[r\{1+(1-k\cdot y^2/r^2)^{1/2}\}]+C2\cdot y^2+C4\cdot y^4+C6\cdot y^6+C8\cdot y^8+C10\cdot y^{10}$$

wherein X(y) is the axial distance from a tangential plane at the vertex of the aspherical face to a point of a height y on the aspherical face, r is the radius of paraxial curvature, k is the conical constant, and Ci is the i-th order aspherical coefficient.

The focusing from a long object distance to a short object distance is achieved by a movement of the second lens group toward the image plane.

The following Table 9 shows the parameters of the embodiment 9 of the present invention, wherein f is the focal length, F is the F-number and 2ω is the image angle. The numbers in the left-hand column indicate the order from the object side, r indicates the radius of curvature of the lens face, d is the distance between the lens faces, n and ν are the refractive index and the Abbe's number for d-line (λ=587.6 nm). R in the table of variable distances indicates the phototaking distance.

TABLE 9 f = 36.00–50.00–68.00
F/3.71–4.29–5.05
2ω = 65.26–47.15–35.14°

|   | r | d | ν | n |
|---|---|---|---|---|
| 1 | 42.9538 | 1.7000 | 52.3 | 1.74810 |
| 2 | 18.6729 | 9.0000 | | |
| 3 | −1257.1068 | 1.2000 | 52.3 | 1.74810 |
| 4 | 67.2504 | 0.5000 | | |
| 5 | 27.7414 | 3.6000 | 28.6 | 1.79504 |
| 6 | 51.3930 | (d6) | | |
| 7 | 34.7935 | 4.0000 | 58.5 | 1.65160 |
| 8 | −22.9172 | 1.0000 | 38.0 | 1.60342 |
| 9 | 313.8602 | 1.0000 | | |
| 10 | 17.8387 | 1.0000 | 31.6 | 1.75692 |
| 11 | 15.3780 | (d11) | | |
| 12 | (diaphragm) | 0.0000 | | |
| 13 | 18.7094 | 4.0000 | 35.2 | 1.74950 |
| 14 | 45.8231 | 1.5000 | | |
| 15 | −368.2824 | 6.0000 | 28.3 | 1.72825 |
| 16 | 17.8973 | 2.0000 | | |
| 17 | 39.4924 | 4.5000 | 48.0 | 1.71700 |
| 18 | −68.5074 | | | |

Table of variable distances:

| f | 36.00 | 50.00 | 68.00 |
|---|---|---|---|
| R | inf | inf | inf |
| d6 | 28.09724 | 12.76604 | 2.28664 |
| d11 | 9.80868 | 14.10148 | 10.32888 |
| f | 36.00 | 50.00 | 68.00 |
| R | 500.00 | 500.00 | 500.00 |
| d6 | 34.22707 | 18.59607 | 8.24860 |
| d11 | 3.67885 | 8.27145 | 4.36692 |

Values corresponding to the conditions:

β2t=6.680

β2w=−4.566 f2/f3=1.000 f2/(|f1|+e1t)=1.176 f2/(|f1|+e1w)=0.820 f3/e3w=1.187 f3/e3t=0.831

FIGS. 32A to 32C and 33A to 33C are aberration charts of the embodiment 9 at a phototaking distance R=inf., respectively at the wide angle end and at the telephoto end, while FIGS. 34A to 34C and 35A to 35C are aberration charts of the embodiment 9 at a phototaking distance R=500, respectively at the wide angle end and at the telephoto end. In these charts, FNO indicates F-number, NA indicates numerical aperture, Y indicates image height, d indicates d-line (λ=587.6 nm) and g indicates g-line (λ=435.6 nm). In the astigmatism chart, the solid line and the broken line respectively indicate the sagittal and meridional planes.

These aberration charts indicates that the present embodiment is satisfactorily corrected for the various aberrations, and has excellent imaging performance.

[Embodiment 10]

Figures 36A, 36B:
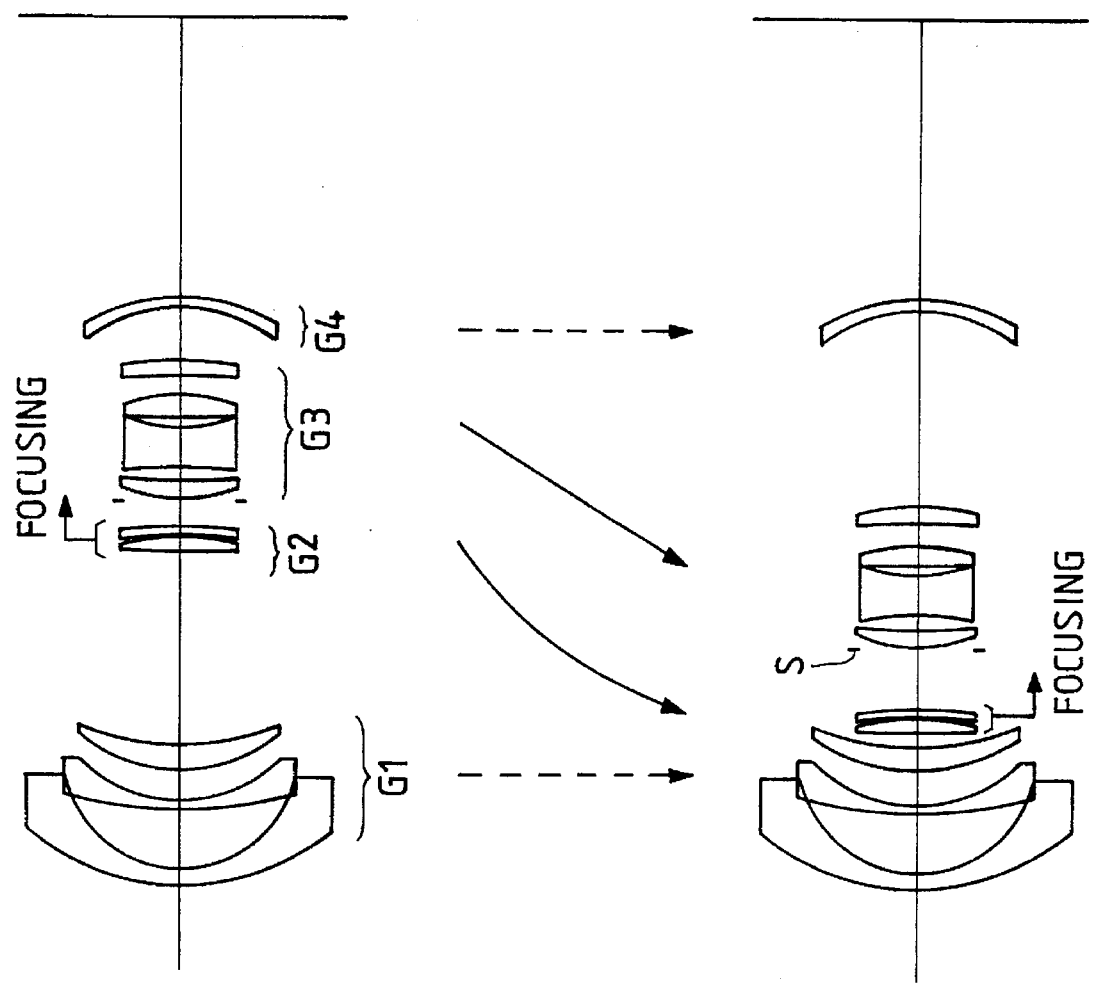
FIGS. 36A and 36B are views showing the configuration of an embodiment 10 of the present invention.
Figure 37A:
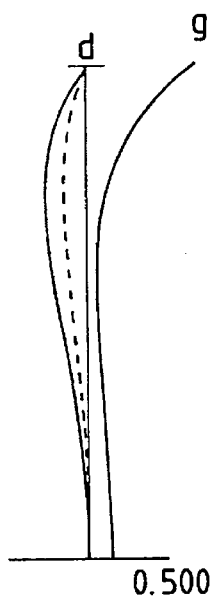
FIGS. 37A to 37C are aberration charts of the embodiment 10 at the wide angle end and at a phototaking distance R=inf.
Figure 37B:
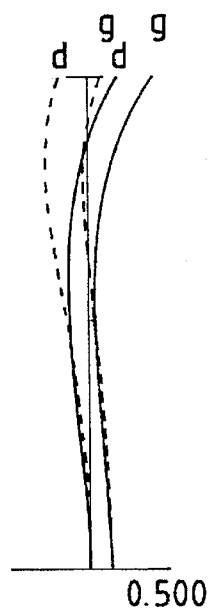
Figure 37C:
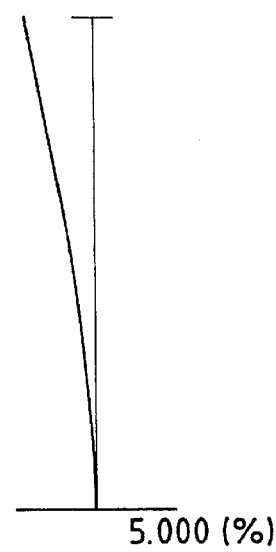
Figure 38A:
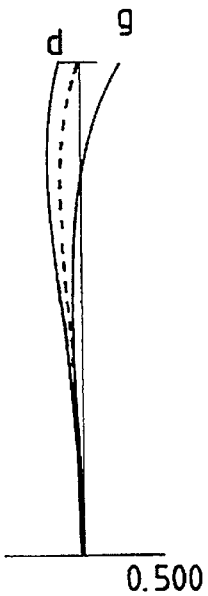
FIGS. 38A to 38C are aberration charts of the embodiment 10 at the telephoto end and at a phototaking distance R=inf.
Figure 38B:
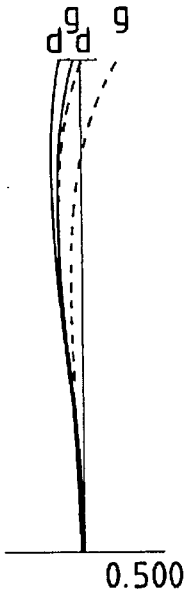
Figure 38C:
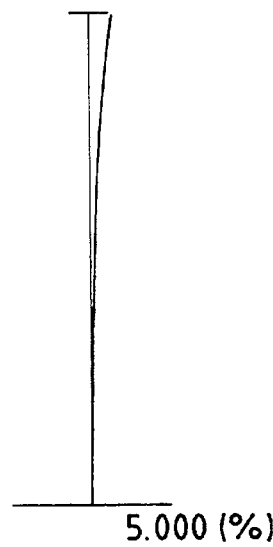
Figure 39A:
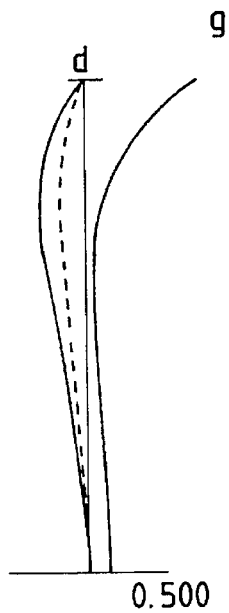
FIGS. 39A to 39C are aberration charts of the embodiment 10 at the wide angle end and at a phototaking distance R=500.
Figure 39B:
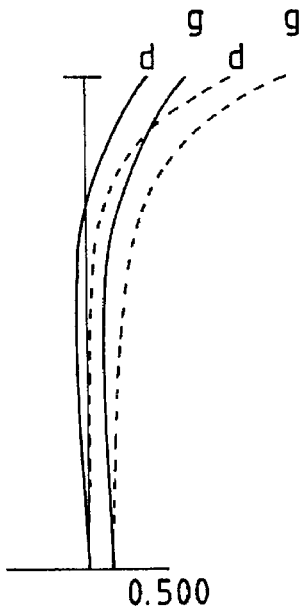
Figure 39C:
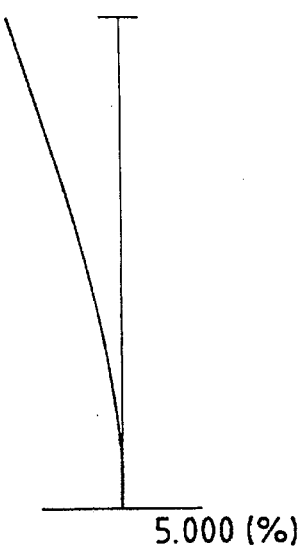
Figure 40A:
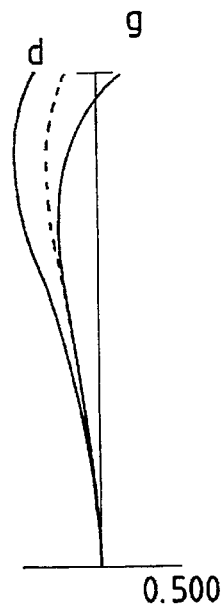
FIGS. 40A to 40C are aberration charts of the embodiment 10 at the telephoto end and at a phototaking distance R=500.
Figure 40B:
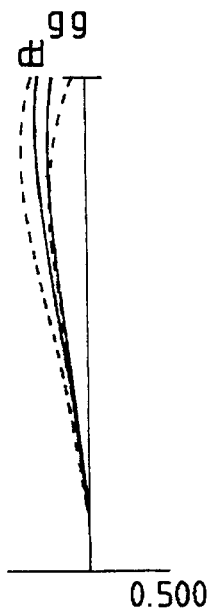
Figure 40C:
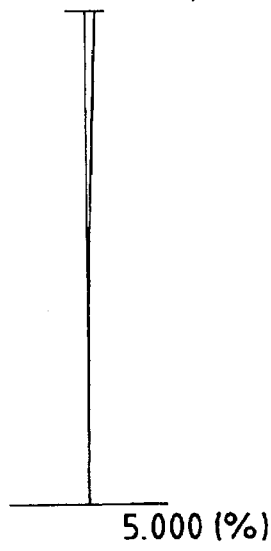

FIGS. 36A and 36B are views showing the configuration of the zoom lens of an embodiment 10, respectively at the wide angle end and at the telephoto end. The zoom lens is composed, in the order from the object side, of a negative first lens group G1, a positive second lens group G2, a diaphragm, a positive third lens group G3, and a negative fourth lens group G4, wherein, at the zooming from the wide angle end to the telephoto end, the first and fourth lens groups remain fixed while the second and third lens groups move toward the object side, the air gap between the first and second lens groups decreases while that between the second and third lens groups increases in the vicinity of the wide angle end and decreases in the vicinity of the telephoto end, and that between the third and fourth lens groups increases.

The second lens face, from the object side, in the first lens group is an aspherical face, the shape of which is given by:

$$X(y)=y^2/[r\cdot\{1+(1-k\cdot y^2/r^2)^{1/2}\}]+C2\cdot y^2+C4\cdot y^4+C6\cdot y^6+C8\cdot y^8+C10\cdot y^{10}$$

wherein $X(y)$ is the axial distance from a tangential plane at the vertex of the aspherical face to a point of a height y on the aspherical face, r is the radius of paraxial curvature, k is the conical constant, and Ci is the i-th order aspherical coefficient.

The focusing from a long object distance to a short object distance is achieved by a movement of the second lens group toward the image plane.

The following Table 10 shows the parameters of the embodiment 10 of the present invention, wherein f is the focal length, F is the F-number and $2\omega$ is the image angle. The numbers in the left-hand column indicate the order from the object side, r indicates the radius of curvature of the lens face, d is the distance between the lens faces, n and $\nu$ are the refractive index and the Abbe's number for d-line ($\lambda$=587.6 nm). R in the table of variable distances indicates the phototaking distance.

TABLE 10 f = 25.85–35.00–48.80
F/3.59–4.06–4.82
$2\omega$ = 82.36–63.05–47.17°

| | r | d | $\nu$ | n |
|---|---|---|---|---|
| 1 | 33.9136 | 2.2500 | 60.0 | 1.64000 |
| 2 | 14.8847 | 8.0000 | | |
| 3 | 57.9384 | 1.4400 | 55.6 | 1.69680 |
| 4 | 21.4272 | 4.1400 | | |
| 5 | 22.6601 | 3.6000 | 25.5 | 1.73038 |
| 6 | 39.3975 | (d6) | | |
| 7 | 141.9564 | 2.2000 | 67.9 | 1.59319 |
| 8 | −30.3117 | 0.3700 | | |
| 9 | −34.1460 | 0.9000 | 26.1 | 1.78470 |
| 10 | −51.9266 | (d10) | | |
| 11 | (diaphragm) | 0.2000 | | |
| 12 | 19.2304 | 2.6394 | 42.0 | 1.66755 |
| 13 | 69.8977 | 1.9603 | | |
| 14 | −42.4063 | 5.5739 | 31.6 | 1.75692 |
| 15 | 25.3216 | 1.1000 | | |
| 16 | 138.5052 | 3.1182 | 59.6 | 1.53996 |
| 17 | −22.6525 | 2.8000 | | |
| 18 | −83.5118 | 2.3534 | 70.0 | 1.51860 |
| 19 | −30.5445 | (d19) | | |
| 20 | −21.7666 | 1.7864 | 64.1 | 1.51680 |
| 21 | −25.1077 | | | |

Aspherical coefficients of second face:

k=0.7249

C2=0.0000

C4=0.0000

C6=0.0000

C8=3.6018E-11

C10=−1.8653E-13

| Table of variable distances: | | | |
|---|---|---|---|
| f | 25.85 | 35.00 | 48.80 |
| R | inf | inf | inf |
| d6 | 26.10426 | 12.71992 | 1.58658 |
| d10 | 3.47119 | 9.09754 | 8.05943 |
| d19 | 6.72166 | 14.47964 | 26.65110 |
| f | 25.85 | 35.00 | 48.80 |
| R | 500.00 | 500.00 | 500.00 |
| d6 | 29.15901 | 15.65564 | 4.63303 |
| d10 | 0.41644 | 6.16182 | 5.01298 |
| d19 | 6.72166 | 14.47964 | 26.65110 |

Values corresponding to the conditions:

$\beta 2t$=5.205

$\beta 2w$=−5.075 f2/f3=1.157 f2/(|f1|+e1t)=1.238 f2/(|f1|+e1w)=0.835 f3/e3w=1.022 f3/e3t=0.744

FIGS. 37A to 37C and 38A to 38C are aberration charts of the embodiment 10 at a phototaking distance R=inf., respectively at the wide angle end and at the telephoto end, while FIGS. 39A to 39C and 40A to 40C are aberration charts of the embodiment 10 at a phototaking distance R=500, respectively at the wide angle end and at the telephoto end. In these charts, FNO indicates F-number, NA indicates numerical aperture, Y indicates image height, d indicates d-line ($\lambda$=587.6 nm) and g indicates g-line ($\lambda$=435.6 nm). In the astigmatism chart, the solid line and the broken line respectively indicate the sagittal and meridional planes.

These aberration charts indicate that the present embodiment is satisfactorily corrected for the various aberrations, and has excellent imaging performance.

[Embodiment 11]

Figures 41A, 41B:
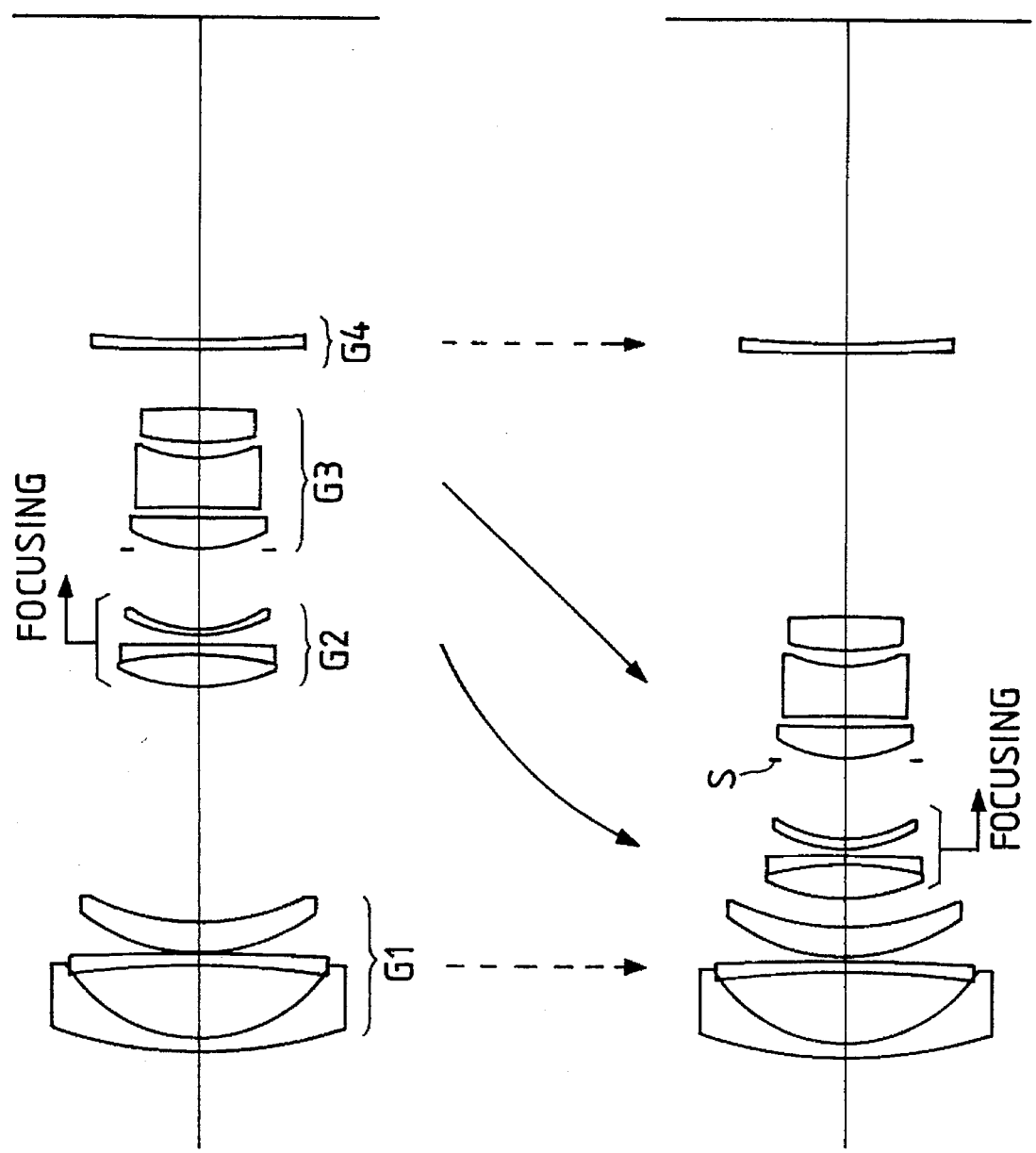
FIGS. 41A and 41B are views showing the configuration of an embodiment 11 of the present invention.
Figure 42A:
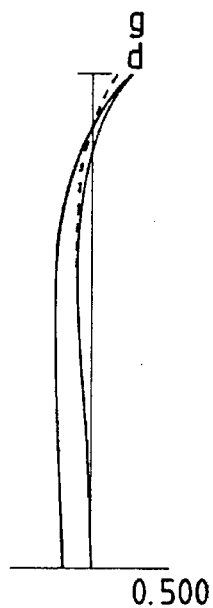
FIGS. 42A to 42C are aberration charts of the embodiment 11 at the wide angle end and at a phototaking distance R=inf.
Figure 42B:
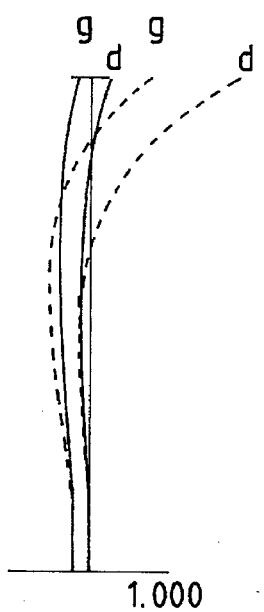
Figure 42C:
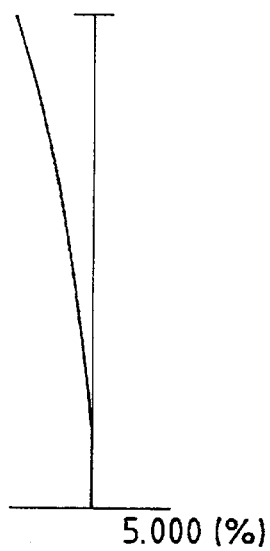
Figure 43A:
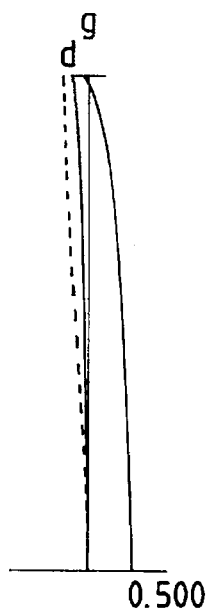
FIGS. 43A to 43C are aberration charts of the embodiment 11 at the telephoto end and at a phototaking distance R=inf.
Figure 43B:
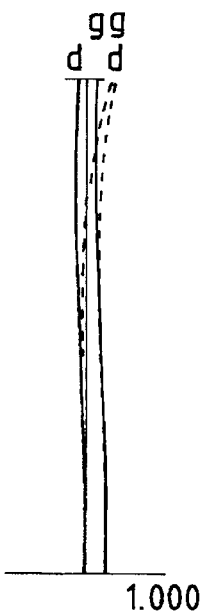
Figure 43C:
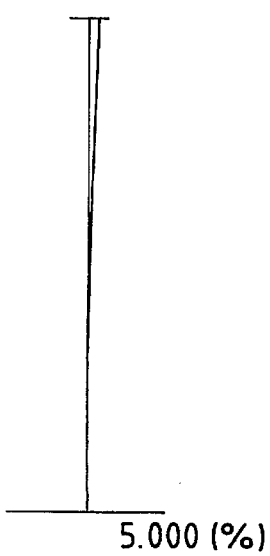
Figure 44A:
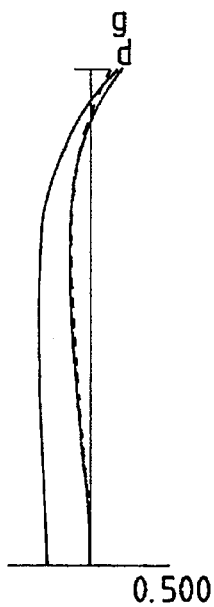
FIGS. 44A to 44C are aberration charts of the embodiment 11 at the wide angle end and at a phototaking distance R=500.
Figure 44B:
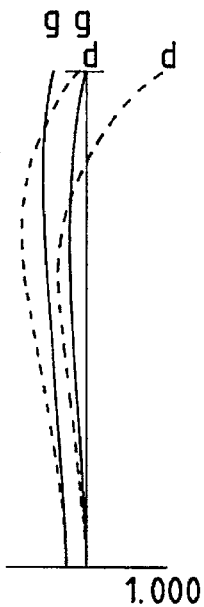
Figure 44C:
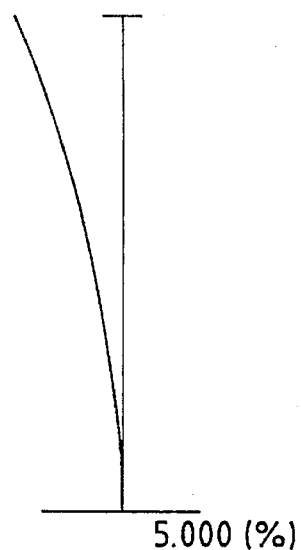
Figure 45A:
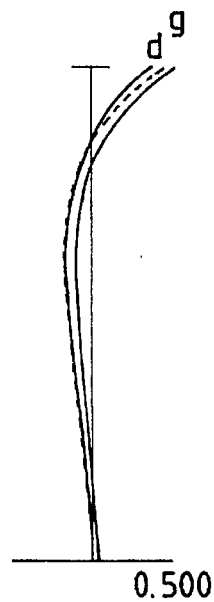
FIGS. 45A to 45C are aberration charts of the embodiment 11 at the telephoto end and at a phototaking distance R=500.
Figure 45B:
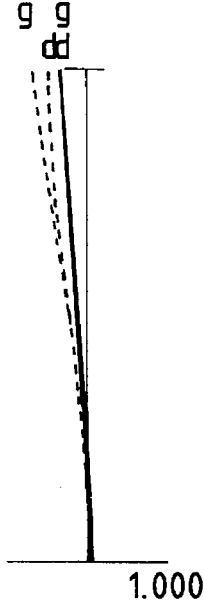
Figure 45C:
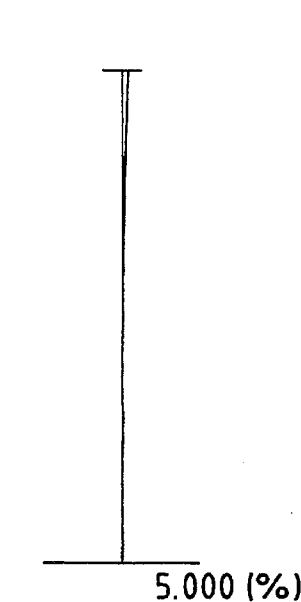

FIGS. 41A and 41B are views showing the configuration of the zoom lens of an embodiment 11, respectively at the wide angle end and at the telephoto end. The zoom lens is composed, in the order from the object side, of a negative first lens group G1, a positive second lens group G2, a diaphragm, a positive third lens group G3 and a negative fourth lens group, wherein, at the zooming from the wide angle end to the telephoto end, the first and fourth lens groups remain fixed while the second and third lens groups move toward the object side, the air gap between the first and second lens groups decreases while that between the second and third lens groups increases in the vicinity of the wide angle end and decreases in the vicinity of the telephoto end, and that between the third and fourth lens groups increases.

The focusing from a long object distance to a short object distance is achieved by a movement of the second lens group toward the image plane.

The following Table 11 shows the parameters of the embodiment 11 of the present invention, wherein f is the focal length, F is the F-number and $2\omega$ is the image angle. The numbers in the left-hand column indicate the order from the object side, r indicates the radius of curvature of the lens face, d is the distance between the lens faces, n and $\nu$ are the refractive index and the Abbe's number for d-line ($\lambda$=587.6 nm). R in the table of variable distances indicates the phototaking distance.

TABLE 11 f = 41.00–55.00–78.00
F/4.10–4.82–6.01
2ω = 58.08–43.29–30.77°

|  | r | d | v | n |
|---|---|---|---|---|
| 1 | 56.1797 | 1.7000 | 58.5 | 1.65160 |
| 2 | 19.0753 | 9.0000 | | |
| 3 | –102.6072 | 1.2000 | 55.6 | 1.69680 |
| 4 | –402.8601 | 0.5000 | | |
| 5 | 23.8515 | 3.6000 | 30.0 | 1.69895 |
| 6 | 30.4342 | (d6) | | |
| 7 | 26.5142 | 4.0000 | 57.0 | 1.62280 |
| 8 | –45.0000 | 1.0000 | 38.8 | 1.67163 |
| 9 | 3813.9157 | 1.0000 | | |
| 10 | 18.6686 | 1.0000 | 35.7 | 1.90265 |
| 11 | 15.1761 | (d11) | | |
| 12 | (diaphragm) | 0.0000 | | |
| 13 | 15.9858 | 4.0000 | 49.7 | 1.55200 |
| 14 | 138.2929 | 1.5000 | | |
| 15 | –153.5728 | 6.0000 | 35.2 | 1.74950 |
| 16 | 15.3828 | 2.0000 | | |
| 17 | 27.3218 | 4.5000 | 47.2 | 1.67003 |
| 18 | –89.4819 | (d18) | | |
| 19 | 355.8035 | 1.2526 | 60.0 | 1.64000 |
| 20 | 124.5345 | | | |

Table of variable distances:

| f | 41.00 | 55.00 | 78.00 |
|---|---|---|---|
| R | inf | inf | inf |
| d6 | 29.85350 | 16.02182 | 3.99996 |
| d11 | 10.00955 | 14.11697 | 10.05648 |
| d18 | 6.99989 | 16.72415 | 32.80650 |
| f | 41.00 | 55.00 | 78.00 |
| R | 500.00 | 500.00 | 500.00 |
| d6 | 36.05087 | 21.92996 | 10.04931 |
| d11 | 3.81218 | 8.20883 | 4.00713 |
| d18 | 6.99989 | 16.72415 | 32.80650 |

Values corresponding to the conditions:

$\beta 2t = 6.463$
$\beta 2w = -4.660$
$f2/f3 = 1.000$
$f2/(|f1|+e1t) = 1.183$
$f2/(|f1|+e1w) = 0.823$
$f3/e3w = 1.090$
$f3/e3t = 0.777$ FIGS. 42A to 42C and 43A to 43C are aberration charts of the embodiment 11 at a phototaking distance R=inf., respectively at the wide angle end and at the telephoto end, while FIGS. 44A to 44C and 45A to 45C are aberration charts of the embodiment 11 at a phototaking distance R=500, respectively at the wide angle end and at the telephoto end. In these charts, FNO indicates F-number, NA indicates numerical aperture, Y indicates image height, d indicates d-line (λ=587.6 nm) and g indicates g-line (λ=435.6 nm). In the astigmatism chart, the solid line and the broken line respectively indicate the sagittal and meridional planes.

These aberration charts indicate that the present embodiment is satisfactorily corrected for the various aberrations, and has excellent imaging performance.

[Embodiment 12]

Figures 46A, 46B:
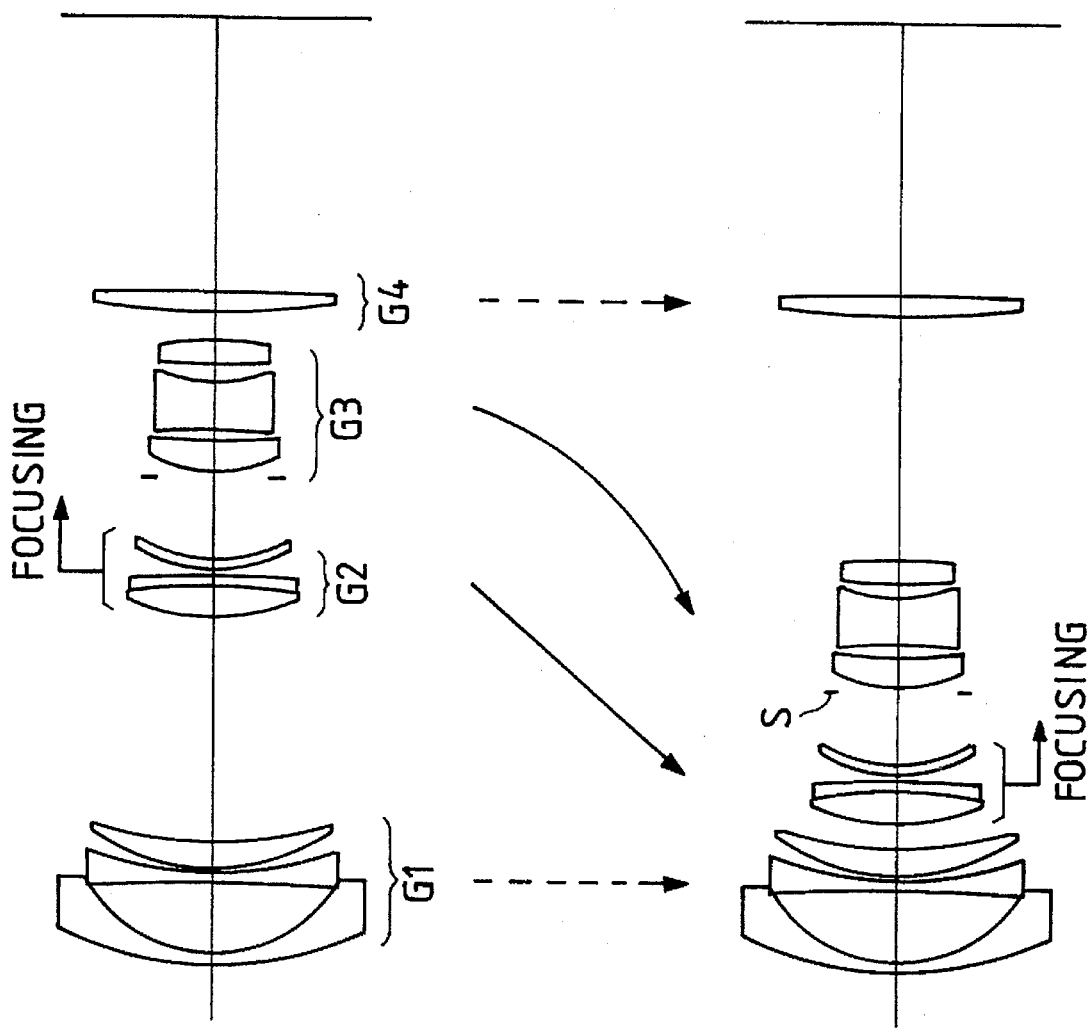
FIGS. 46A and 46B are views showing the configuration of an embodiment 12 of the present invention.
Figure 47B:
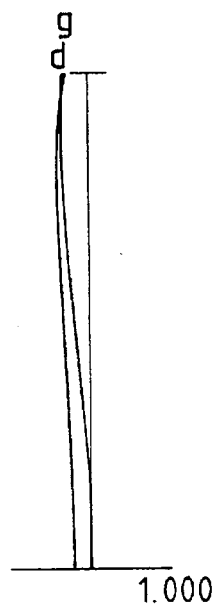
Figure 47B:
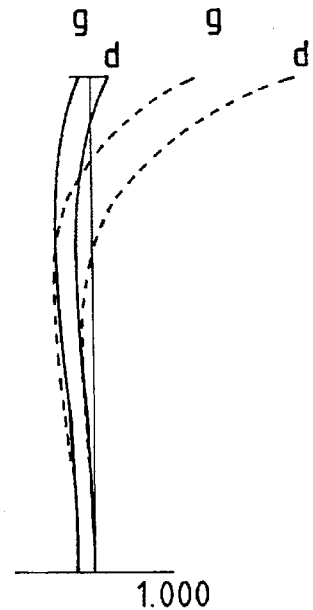
Figure 47C:
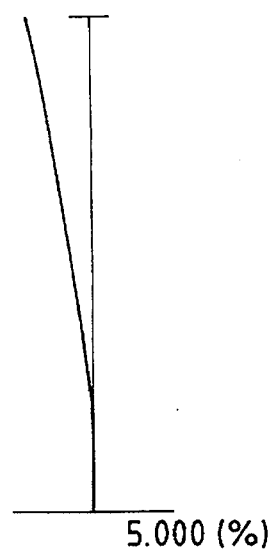
Figure 48A:
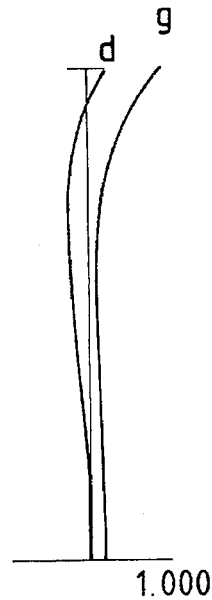
FIGS. 48A to 48C are aberration charts of the embodiment 12 at the telephoto end and at a phototaking distance R=inf.
Figure 48B:
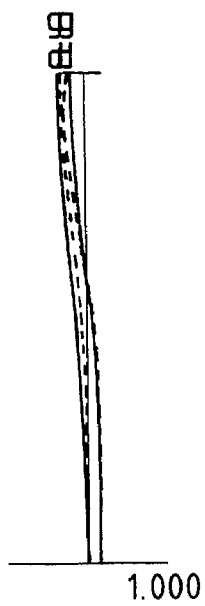
Figure 48C:
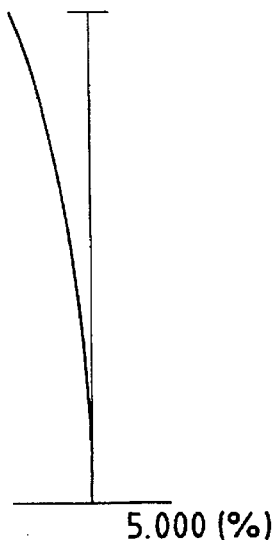
Figure 49A:
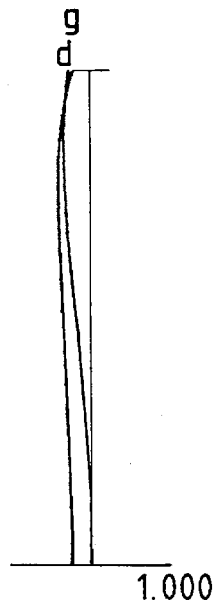
FIGS. 49A to 49C are aberration charts of the embodiment 12 at the wide angle end and at a phototaking distance R=500.
Figure 49B:
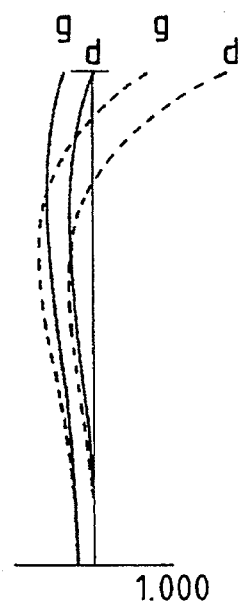
Figure 49C:
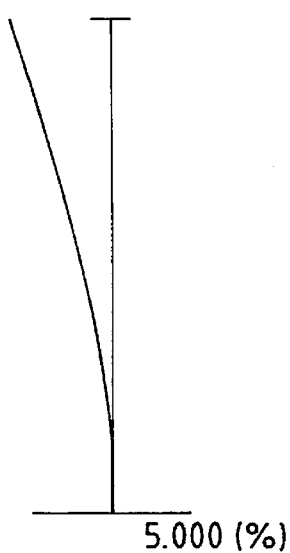
Figure 50A:
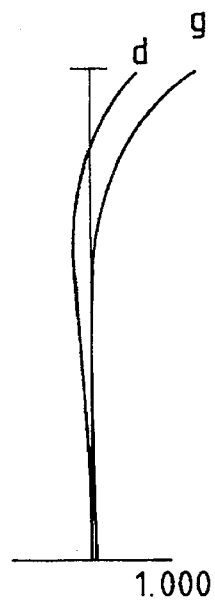
FIGS. 50A to 50C are aberration charts of the embodiment 12 at the telephoto end and at a phototaking distance R=500.
Figure 50B:
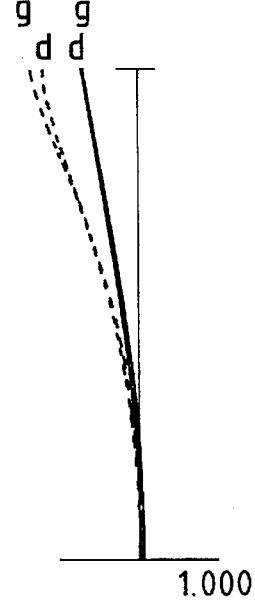
Figure 50C:
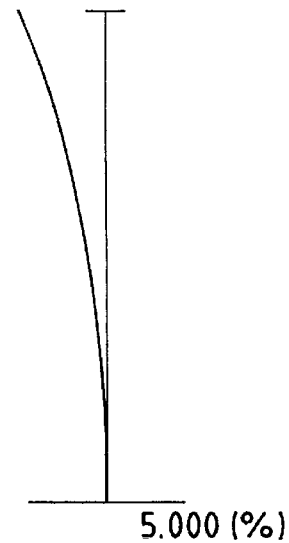
Figure 52A:
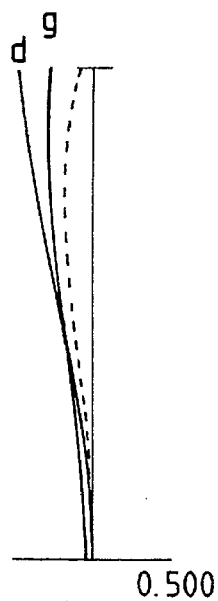
FIGS. 52A to 52C are aberration charts of the embodiment 13 at the wide angle end and at a phototaking distance R=inf.
Figure 52B:
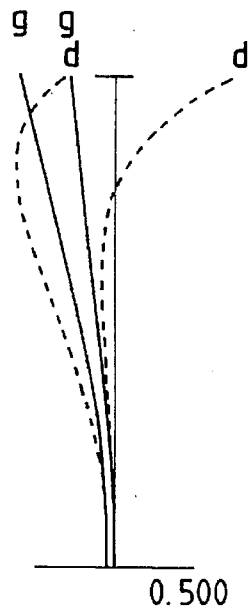
Figure 52C:
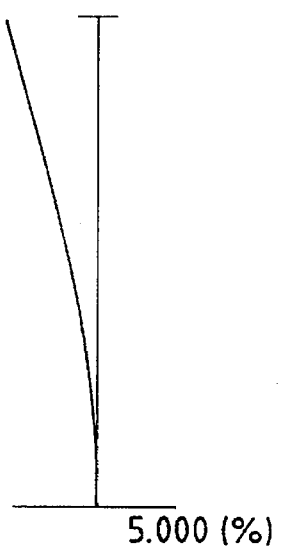
Figure 53A:
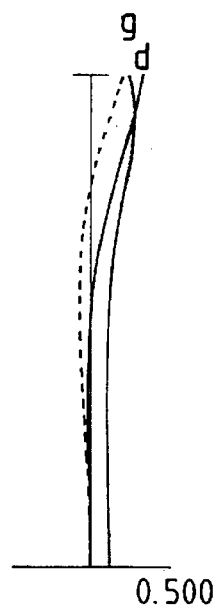
FIGS. 53A to 53C are aberration charts of the embodiment 13 at the telephoto end and at a phototaking distance R=inf.
Figure 53B:
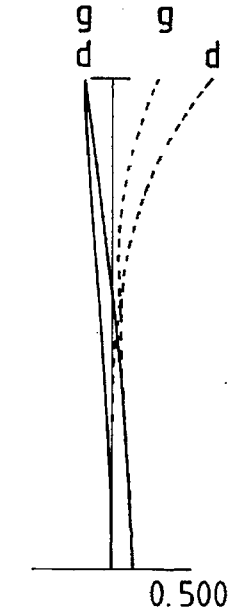
Figure 53C:
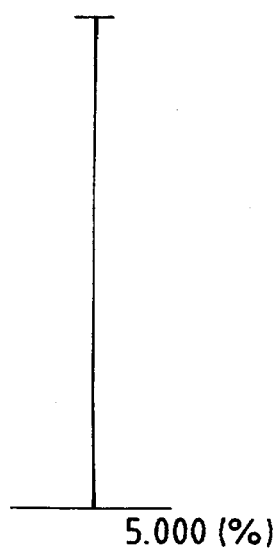
Figure 54A:
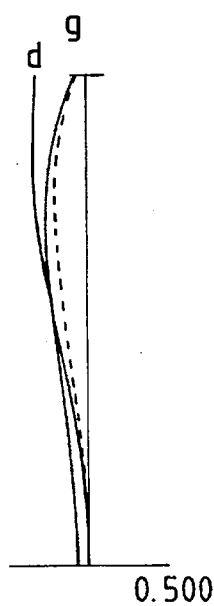
FIGS. 54A to 54C are aberration charts of the embodiment 13 at the wide angle end and at a phototaking distance R=500.
Figure 54B:
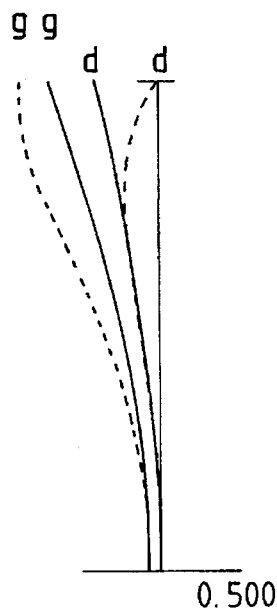
Figure 54C:
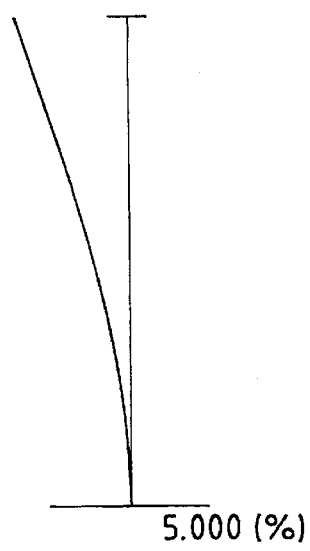
Figure 55A:
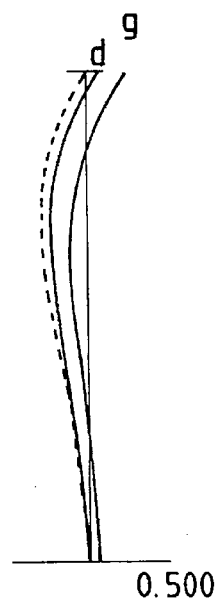
FIGS. 55A to 55C are aberration charts of the embodiment 13 at the telephoto end and at a phototaking distance R=500.
Figure 55B:
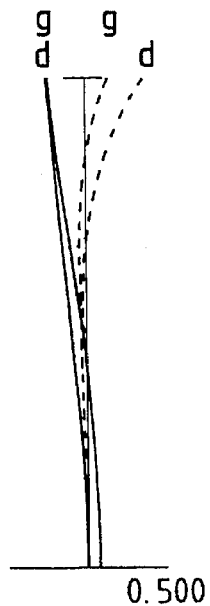
Figure 55C:
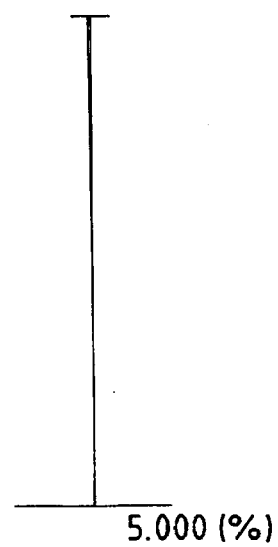

FIGS. 46A and 46B are views showing the configuration of the zoom lens of an embodiment 12, respectively at the wide angle end and at the telephoto end. The zoom lens is composed, in the order from the object side, of a negative first lens group G1, a positive second lens group G2, a positive third lens group G3 and a negative fourth lens group, wherein, at the zooming from the wide angle end to the telephoto end, the first and fourth lens groups remain fixed while the second and third lens groups move toward the object side, the air gap between the first and second lens groups decreases while that between the second and third lens groups increases in the vicinity of the wide angle end and decreases in the vicinity of the telephoto end, and that between the third and fourth lens groups increases.

The lens face closest to the object side in the fourth lens group is an aspherical face, the shape of which is given by:

$$X(y) = y^2/r \cdot \{1 + (1 - k \cdot y^2/r^2)^{1/2}\} + C2 \cdot y^2 + C4 \cdot y^4 + C6 \cdot y^6 + C8 \cdot y^8 + C10 \cdot y^{10}$$

wherein X(y) is the axial distance from a tangential plane at the vertex of the aspherical face to a point of a height y on the aspherical face, r is the radius of paraxial curvature, k is the conical constant, and Ci is the i-th order aspherical coefficient.

The focusing from a long object distance to a short object distance is achieved by a movement of the second lens group toward the image plane.

The following Table 12 shows the parameters of the embodiment 12 of the present invention, wherein f is the focal length, F is the F-number and 2ω is the image angle. The numbers in the left-hand column indicate the order from the object side, r indicates the radius of curvature of the lens face, d is the distance between the lens faces, n and v are the refractive index and the Abbe's number for d-line (λ=587.6 nm). R in the table of variable distances indicates the phototaking distance.

TABLE 12 f = 36.00–50.00–68.00
F/3.61–4.08–4.61
2ω = 64.10–48.07–36.98°

|  | r | d | v | n |
|---|---|---|---|---|
| 1 | 46.4394 | 1.9813 | 42.7 | 1.57309 |
| 2 | 21.3054 | 10.4895 | | |
| 3 | –321.3854 | 1.3986 | 50.2 | 1.72000 |
| 4 | 48.7004 | 0.5827 | | |
| 5 | 31.3413 | 4.1958 | 28.6 | 1.79504 |
| 6 | 71.2763 | (d6) | | |
| 7 | 41.3074 | 4.6620 | 57.0 | 1.62280 |
| 8 | –60.0000 | 1.1655 | 38.8 | 1.67163 |
| 9 | –329.9649 | 1.1655 | | |
| 10 | 25.0017 | 1.1655 | 39.6 | 1.80454 |
| 11 | 21.3604 | (d11) | | |
| 12 | (diaphragm) | 0.5000 | | |
| 13 | 18.1079 | 4.6620 | 60.0 | 1.64000 |
| 14 | 62.6501 | 1.7483 | | |
| 15 | –88.4360 | 7.0000 | 35.2 | 1.74950 |
| 16 | 19.5170 | 2.3310 | | |
| 17 | 65.4577 | 4.0000 | 49.5 | 1.77279 |
| 18 | –46.2966 | (d18) | | |
| 19 | 174.5061 | 3.0000 | 60.0 | 1.64000 |
| 20 | –1067.7624 | | | |

Aspherical coefficients of nineteenth face:

k=1.0000
C2=0.0000
C4=3.1795E-6
C6=2.0784E-9
C8=-3.4864E-12
C10=0.0000

Table of variable distances:

| f | 36.00 | 50.00 | 68.00 |
|---|---|---|---|
| R | inf | inf | inf |
| d6 | 33.08385 | 15.55442 | 3.82044 |

-continued

Table of variable distances:

| | | | |
|---|---|---|---|
| d11 | 12.42458 | 16.23870 | 10.62519 |
| d18 | 3.92552 | 17.64084 | 34.98832 |
| f | 36.00 | 50.00 | 68.00 |
| R | 600.00 | 600.00 | 600.00 |
| d6 | 39.85425 | 22.04028 | 10.46333 |
| d11 | 5.65418 | 9.75284 | 3.98230 |
| d18 | 3.92552 | 17.64084 | 34.98832 |

Values corresponding to the conditions:

$\beta 2t = 6.446$ $\beta 2w = -4.912$ $f2/f3 = 0.979$ $f2/(|f1|+e1t) = 1.184$ $f2/(|f1|+e1w) = 0.831$ $f3/e3w = 1.325$ $f3/e3t = 0.887$ FIGS. 47A to 47C and 48A to 48C are aberration charts of the embodiment 12 at a phototaking distance R=inf., respectively at the wide angle end and at the telephoto end, while FIGS. 49A to 49C and 50A to 50C are aberration charts of the embodiment 12 at a phototaking distance R=500, respectively at the wide angle end and at the telephoto end. In these charts, FNO indicates F-number, NA indicates numerical aperture, Y indicates image height, d indicates d-line ($\lambda$=587.6 nm) and g indicates g-line ($\lambda$=435.6 nm). In the astigmatism chart, the solid line and the broken line respectively indicate the sagittal and meridional planes.

These aberration charts indicate that the present embodiment is satisfactorily corrected for the various aberrations, and has excellent imaging performance.

[Embodiment 13]

FIGS. 51A and 51B are views showing the configuration of the zoom lens of an embodiment 13, respectively at the wide angle end and at the telephoto end. The zoom lens is composed, in the order from the object side, of a negative first lens group G1, a positive second lens group G2, a diaphragm and a positive third lens group G3, wherein, at the zooming from the wide angle end to the telephoto end, the first lens group moves to the image side at the wide angle side and to the object side at the telephoto side while the second and third lens groups move toward the object side, the air gap between the first and second lens groups decreases and that between the second and third lens groups increases.

The focusing from a long object distance to a short object distance is achieved by a movement of the second lens group toward the image plane.

The following Table 13 shows the parameters of the embodiment 13 of the present invention, wherein f is the focal length, F is the F-number and 2ω is the image angle. The numbers in the left-hand column indicate the order from the object side, r indicates the radius of curvature of the lens face, d is the distance between the lens faces, n and ν are the refractive index and the Abbe's number for d-line ($\lambda$=587.6 nm). R in the table of variable distances indicates the phototaking distance.

TABLE 13 f = 36.00 - 50.00 - 68.00
F/3.49 - 4.35 - 5.58
2ω = 64.94 - 47.27 - 35.21°

| | r | d | ν | n |
|---|---|---|---|---|
| 1 | 36.4521 | 1.5000 | 55.6 | 1.69680 |
| 2 | 15.8918 | 8.3000 | | |
| 3 | -44.0087 | 1.1000 | 49.5 | 1.74443 |
| 4 | 81.9753 | 0.5000 | | |
| 5 | 34.0100 | 4.6000 | 35.7 | 1.62588 |
| 6 | -79.4645 | (d 6) | | |
| 7 | 21.0405 | 4.0000 | 61.1 | 1.58913 |
| 8 | -80.0000 | 1.0000 | 30.0 | 1.69895 |
| 9 | 278.0934 | 1.0000 | | |
| 10 | 17.5841 | 1.0000 | 35.2 | 1.74950 |
| 11 | 13.4967 | (d11) | | |
| 12 | (diaphragm) | 0.5000 | | |
| 13 | 19.7452 | 4.0000 | 38.8 | 1.67163 |
| 14 | -111.4451 | 1.0000 | | |
| 15 | -49.8231 | 6.0000 | 29.5 | 1.71736 |
| 16 | 19.0209 | 1.0000 | | |
| 17 | 52.0805 | 4.5000 | 40.3 | 1.60717 |
| 18 | -59.7886 | | | |

Table of variable distances:

| | | | |
|---|---|---|---|
| f | 36.00 | 50.00 | 68.00 |
| R | inf | inf | inf |
| d6 | 24.21825 | 10.54825 | 1.00115 |
| d11 | 9.62060 | 10.91310 | 12.61650 |
| f | 36.00 | 50.00 | 68.00 |
| R | 500.00 | 500.00 | 500.00 |
| d6 | 29.34137 | 15.49170 | 6.16728 |
| d11 | 4.49748 | 5.96965 | 7.45037 |

Values corresponding to the conditions:

$|f1|/fw = 1.278$ $f2/f3 = 0.957$ $x2/x3 = 1.129$ $f2/(|f1|+e1w) = 0.846$ $f2/(|f1|+e1t) = 1.196$ $\beta 2t = 6.102$ $\beta 2w = -5.475$ $f3/e3w = 1.137$ $f3/e3t = 0.826$ FIGS. 52A to 52C and 53A to 53C are aberration charts of the embodiment 13 at a phototaking distance R=inf., respectively at the wide angle end and at the telephoto end, while FIGS. 54A to 54C and 55A to 55C are aberration charts of the embodiment 13 at a phototaking distance R=500, respectively at the wide angle end and at the telephoto end. In these charts, FNO indicates F-number, NA indicates numerical aperture, Y indicates image height, d indicates d-line ($\lambda$=587.6 nm) and g indicates g-line ($\lambda$=435.6 nm). In the astigmatism chart, the solid line and the broken line respectively indicate the sagittal and meridional planes.

These aberration charts indicate that the present embodiment is satisfactorily corrected for the various aberrations, and has excellent imaging performance.

[Embodiment 14]

Figures 56A, 56B:
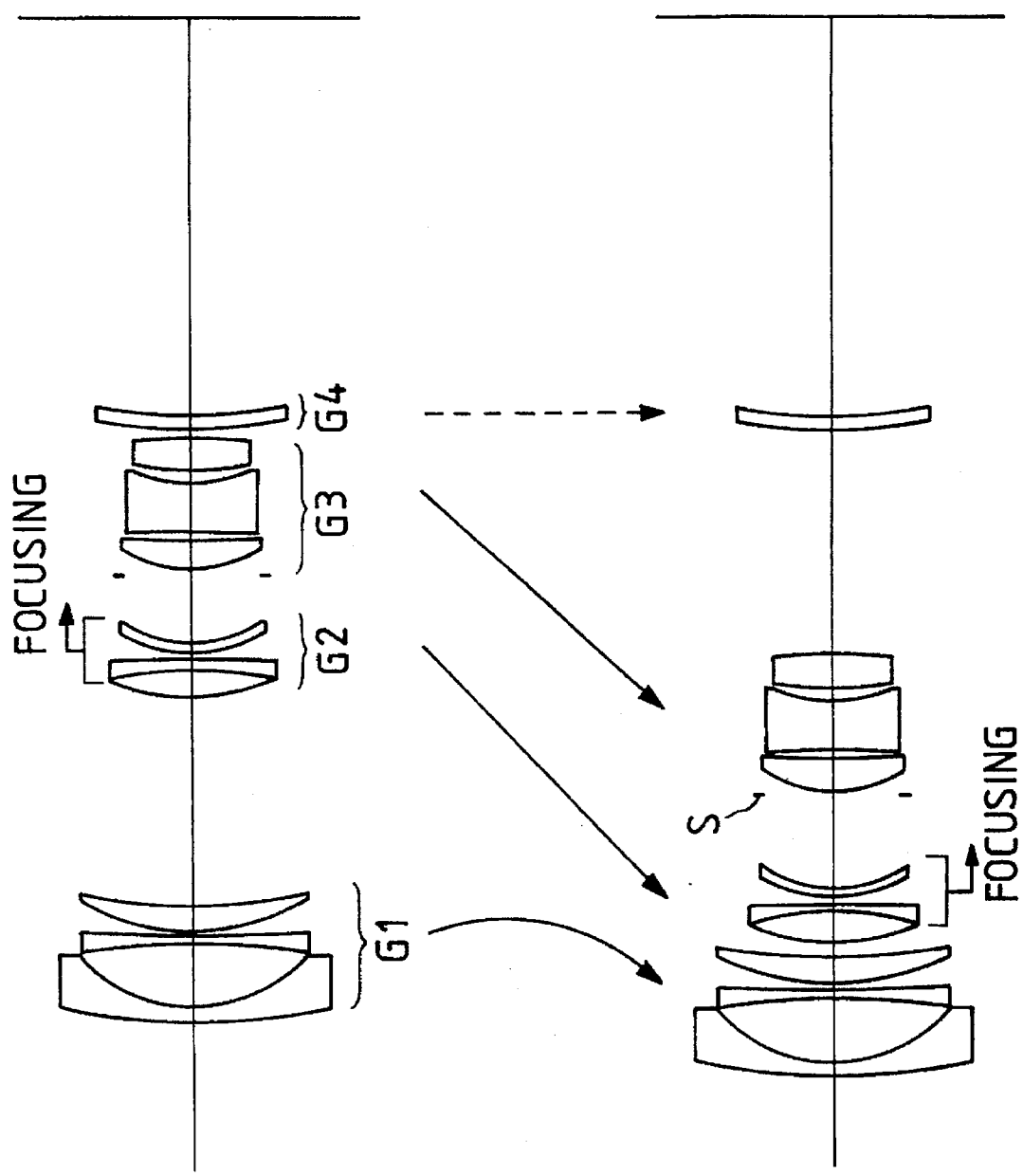
FIGS. 56A and 56B are views showing the configuration of an embodiment 14 of the present invention.
Figure 57A:
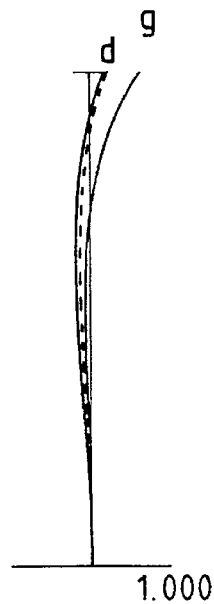
FIGS. 57A to 57C are aberration charts of the embodiment 14 at the wide angle end and at a phototaking distance R=inf.
Figure 57B:
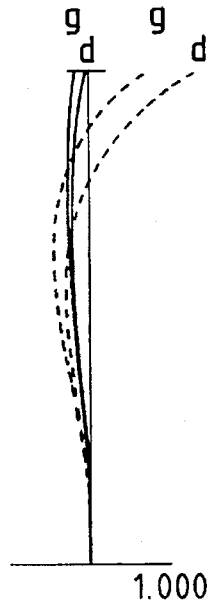
Figure 57C:
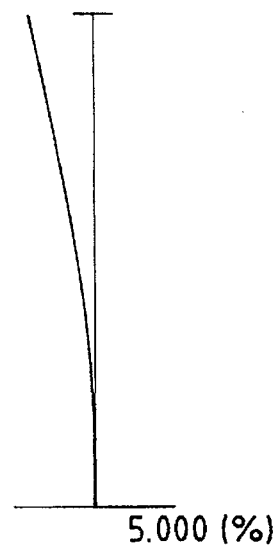
Figure 58A:
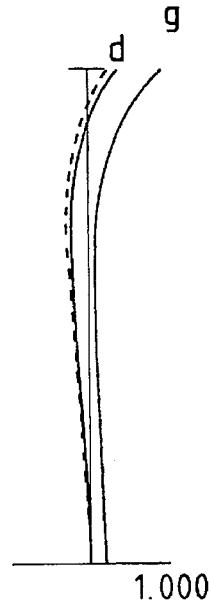
FIGS. 58A to 58C are aberration charts of the embodiment 14 at the telephoto end and at a phototaking distance R=inf.
Figure 58B:
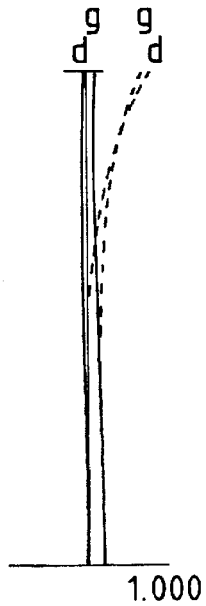
Figure 58C:
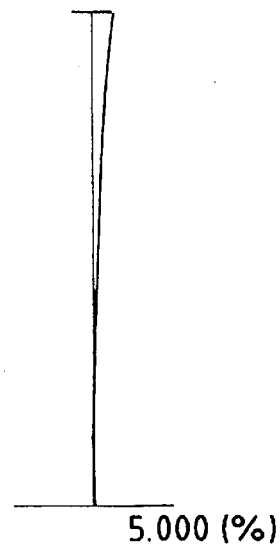
Figure 59A:
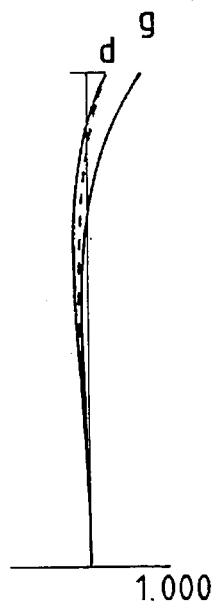
FIGS. 59A to 59C are aberration charts of the embodiment 14 at the wide angle end and at a phototaking distance R=500.
Figure 59B:
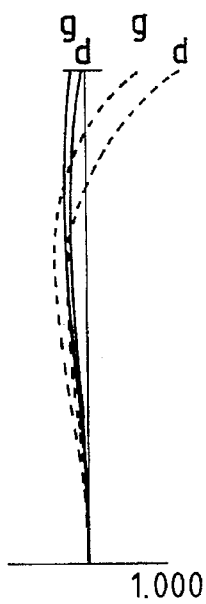
Figure 59C:
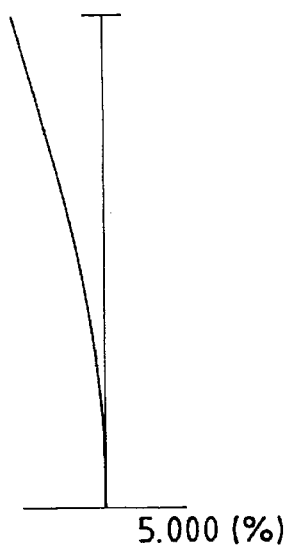
Figure 60A:
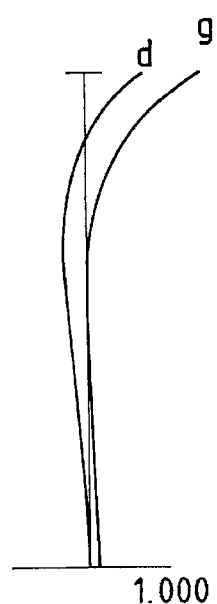
FIGS. 60A to 60C are aberration charts of the embodiment 14 at the telephoto end and at a phototaking distance R=500.
Figure 60B:
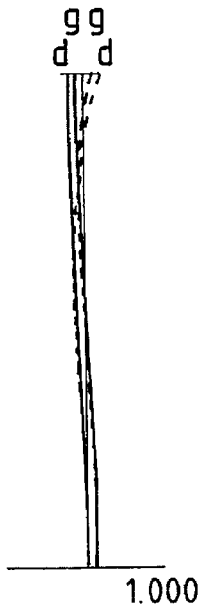
Figure 60C:
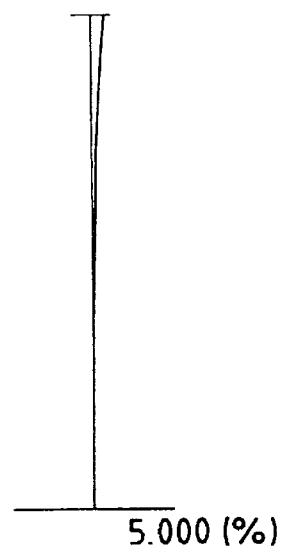
Figure 62A:
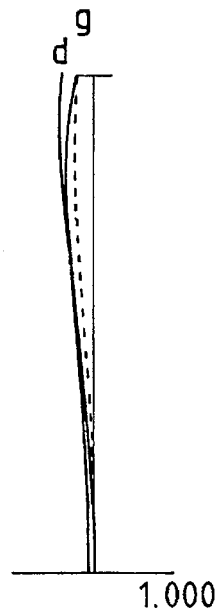
FIGS. 62A to 62C are aberration charts of the embodiment 15 at the wide angle end and at a phototaking distance R=inf.
Figure 62B:
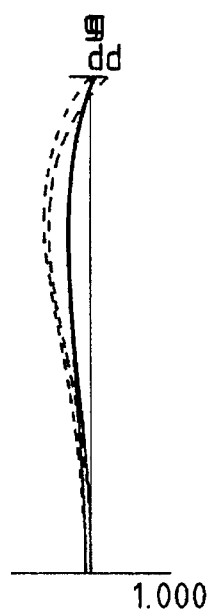
Figure 62C:
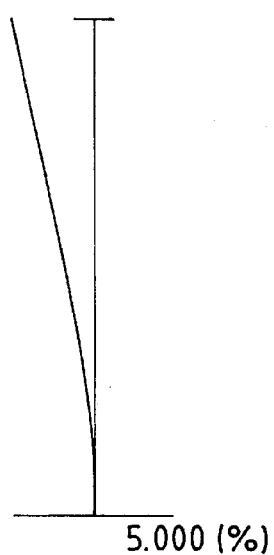
Figure 63A:
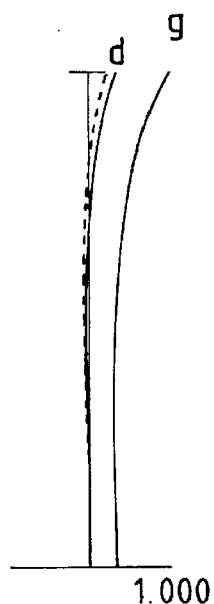
FIGS. 63A to 63C are aberration charts of the embodiment 15 at the telephoto end and at a phototaking distance R=inf.
Figure 63B:
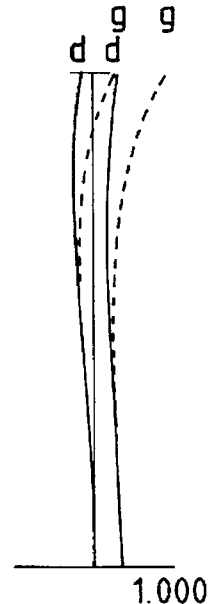
Figure 63C:
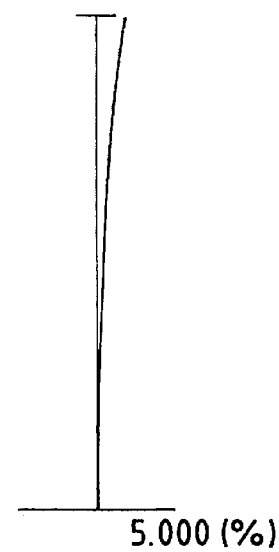
Figure 64A:
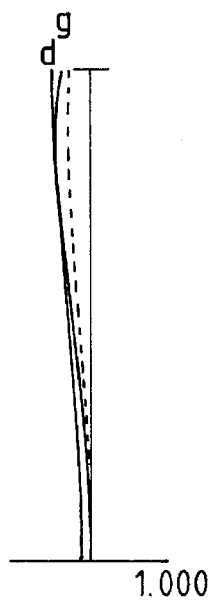
FIGS. 64A to 64C are aberration charts of the embodiment 15 at the wide angle end and at a phototaking distance R=500.
Figure 64B:
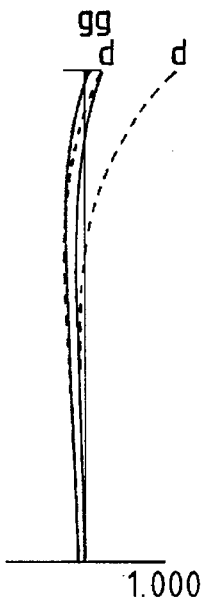
Figure 64C:
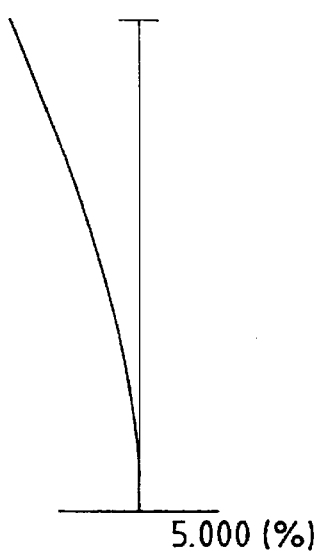
Figure 65A:
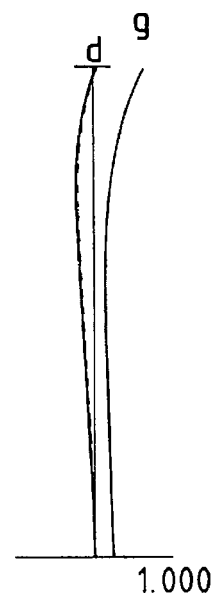
FIGS. 65A to 65C are aberration charts of the embodiment 15 at the telephoto end and at a phototaking distance R=500.
Figure 65B:
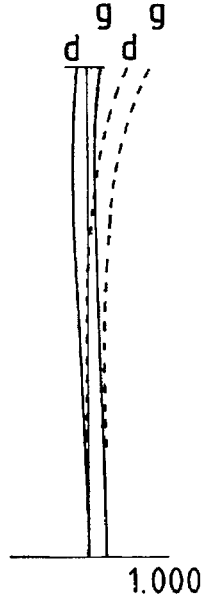
Figure 65C:
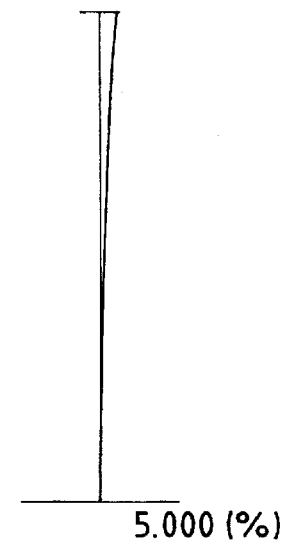

FIGS. 56A and 56B are views showing the configuration of the zoom lens of an embodiment 14, respectively at the wide angle end and at the telephoto end. The zoom lens is composed, in the order from the object side, of a negative first lens group G1, a positive second lens group G2, a diaphragm, a positive third lens group G3 and a negative fourth lens group G4, wherein, at the zooming from the wide angle end to the telephoto end, the first lens group moves toward the image side at the wide angle side and toward the object side at the telephoto side, while the second and third lens groups move toward the object side, the fourth lens group remains fixed, the air gap between the first and second lens groups decreases while that between the second and third lens groups increases and that between the third and fourth lens groups increases.

The focusing from a long object distance to a short object distance is achieved by a movement of the second lens group toward the image plane.

The following Table 14 shows the parameters of the embodiment 14 of the present invention, wherein f is the focal length, F is the F-number and $2\omega$ is the image angle. The numbers in the left-hand column indicate the order from the object side, r indicates the radius of curvature of the lens face, d is the distance between the lens faces, n and $\nu$ are the refractive index and the Abbe's number for d-line ($\lambda$=587.6 nm). R in the table of variable distances indicates the phototaking distance.

TABLE 14 f = 41.00 - 55.00 - 78.00
F/4.03 - 4.81 - 5.97
$2\omega = 57.58 - 42.24 - 30.59°$

| | r | d | ν | n |
|---|---|---|---|---|
| 1 | 71.4000 | 1.6000 | 58.5 | 1.65160 |
| 2 | 18.7000 | 8.3000 | | |
| 3 | −93.3000 | 1.1000 | 55.6 | 1.69680 |
| 4 | 206.8600 | 0.5000 | | |
| 5 | 31.1000 | 3.3000 | 31.1 | 1.68893 |
| 6 | 80.8811 | (d6) | | |
| 7 | 27.2400 | 3.8000 | 57.0 | 1.62280 |
| 8 | −41.0000 | 1.0000 | 37.9 | 1.72342 |
| 9 | −176.1500 | 1.0000 | | |
| 10 | 21.3000 | 1.0000 | 27.6 | 1.75520 |
| 11 | 15.8899 | (d11) | | |
| 12 | (diaphragm) | 0.5000 | | |
| 13 | 15.3600 | 4.0000 | 45.9 | 1.54814 |
| 14 | 115.2212 | 1.0000 | | |
| 15 | −118.5000 | 6.0000 | 35.2 | 1.74950 |
| 16 | 15.6240 | 1.5000 | | |
| 17 | 29.5000 | 4.5000 | 47.1 | 1.67003 |
| 18 | −66.4454 | (d18) | | |
| 19 | 78.2000 | 1.5000 | 60.0 | 1.64000 |
| 20 | 55.1518 | | | |

Table of variable distances:

| f | 41.00 | 55.00 | 78.00 |
|---|---|---|---|
| R | inf | inf | inf |
| d6 | 25.41124 | 12.32584 | 1.97394 |
| d11 | 8.50475 | 9.71815 | 11.54295 |
| d18 | 1.02639 | 11.94699 | 28.37009 |
| f | 41.00 | 55.00 | 78.00 |
| R | 500.00 | 500.00 | 500.00 |
| d6 | 30.59858 | 17.32515 | 7.21035 |
| d11 | 3.31741 | 4.71884 | 6.30654 |
| d18 | 1.02639 | 11.94699 | 28.37009 |

Values corresponding to the conditions:
|f1|/fw=1.122
f2/f3=0.957
x2/x3=1.111
f2/(|f1|+e1w)=0.845
f2/(|f1|+e1t)=1.199
β2t=6.017
β2w=−5.446

FIGS. 57A to 57C and 58A to 58C are aberration charts of the embodiment 14 at a phototaking distance R=inf., respectively at the wide angle end and at the telephoto end, while FIGS. 59A to 59C and 60A to 60C are aberration charts of the embodiment 14 at a phototaking distance R=500, respectively at the wide angle end and at the telephoto end. In these charts, FNO indicates F-number, NA indicates numerical aperture, Y indicates image height, d indicates d-line ($\lambda$=587.6 nm) and g indicates g-line ($\lambda$=435.6 nm). In the astigmatism chart, the solid line and the broken line respectively indicate the sagittal and meridional planes.

These aberration charts indicate that the present embodiment is satisfactorily corrected for the various aberrations, and has excellent imaging performance.

[Embodiment 15]

FIGS. 61A and 61B are views showing the configuration of the zoom lens of an embodiment 15, respectively at the wide angle end and at the telephoto end. The zoom lens is composed, in the order from the object side, of a negative first lens group G1, a positive second lens group G2, a diaphragm and a positive third lens group G3, wherein, at the zooming from the wide angle end to the telephoto end, the first lens group moves toward the image side at the wide angle side and toward the object side at the telephoto side, while the second and third lens groups move toward the object side, the air gap between the first and second lens groups decreases and that between the second and third lens groups increases in the vicinity of the wide angle end and decreases in the vicinity of the telephoto end.

The focusing from a long object distance to a short object distance is achieved by a movement of the second lens group toward the image plane.

The following Table 15 shows the parameters of the embodiment 15 of the present invention, wherein f is the focal length, F is the F-number and $2\omega$ is the image angle. The numbers in the left-hand column indicate the order from the object side, r indicates the radius of curvature of the lens face, d is the distance between the lens faces, n and $\nu$ are the refractive index and the Abbe's number for d-line ($\lambda$=587.6 nm). R in the table of variable distances indicates the phototaking distance.

TABLE 15 f = 29.02 - 35.00 - 53.93
F/3.97 - 4.88 - 5.76
$2\omega = 76.32 - 56.01 - 42.91°$

| | r | d | ν | n |
|---|---|---|---|---|
| 1 | 37.2114 | 1.5000 | 57.5 | 1.67025 |
| 2 | 17.5647 | 9.0000 | | |
| 3 | 219.3762 | 1.5000 | 46.8 | 1.76684 |
| 4 | 23.9348 | 1.5000 | | |
| 5 | 23.2030 | 3.9000 | 35.2 | 1.74950 |
| 6 | 85.5901 | (d6) | | |
| 7 | 35.6990 | 3.8000 | 60.0 | 1.64000 |
| 8 | −57.4167 | 1.0000 | 25.5 | 1.80518 |
| 9 | −86.7285 | 1.0000 | | |
| 10 | 27.4452 | 1.5000 | 28.6 | 1.79504 |
| 11 | 19.8264 | 2.0000 | | |
| 12 | (diaphragm) | (d12) | | |
| 13 | 17.9894 | 3.5000 | 35.2 | 1.74950 |
| 14 | −51.6005 | 1.0000 | | |
| 15 | −28.8329 | 4.8000 | 28.6 | 1.79504 |
| 16 | 18.9279 | 1.3000 | | |
| 17 | −69.9586 | 3.6000 | 56.1 | 1.56883 |
| 18 | −17.4637 | | | |

Table of variable distances:

| f | 29.02 | 35.00 | 53.93 |
|---|---|---|---|
| R | inf | inf | inf |
| d6 | 23.69493 | 9.80393 | 0.99703 |

TABLE 15-continued

| d12 | 6.76153 | 6.89333 | 5.20253 |
|---|---|---|---|
| f | 29.02 | 35.00 | 53.93 |
| R | 500.00 | 500.00 | 500.00 |
| d6 | 27.83455 | 13.84173 | 5.19807 |
| d12 | 2.62191 | 2.85553 | 1.00149 |

Values corresponding to the conditions:

|f1|/fw=1.447 f2/f3=1.182 x2/x3=0.922 f2/(|f1|+e1w)=0.877 f2/(|f1|+e1t)=1.265

β2t=4.777

β2w=−7.149 f3/e3w=1.107 f3/e3t=0.788

FIGS. 62A to 62C and 63A to 63C are aberration charts of the embodiment 15 at a phototaking distance R=inf., respectively at the wide angle end and at the telephoto end, while FIGS. 64A to 64C and 65A to 65C are aberration charts of the embodiment 15 at a phototaking distance R=500, respectively at the wide angle end and at the telephoto end. In these charts, FNO indicates F-number, NA indicates numerical aperture, Y indicates image height, d indicates d-line (λ=587.6 nm) and g indicates g-line (λ=435.6 nm). In the astigmatism chart, the solid line and the broken line respectively indicate the sagittal and meridional planes.

These aberration charts indicate that the present embodiment is satisfactorily corrected for the various aberrations, and has excellent imaging performance.

[Embodiment 16]

Figures 66A, 66B:
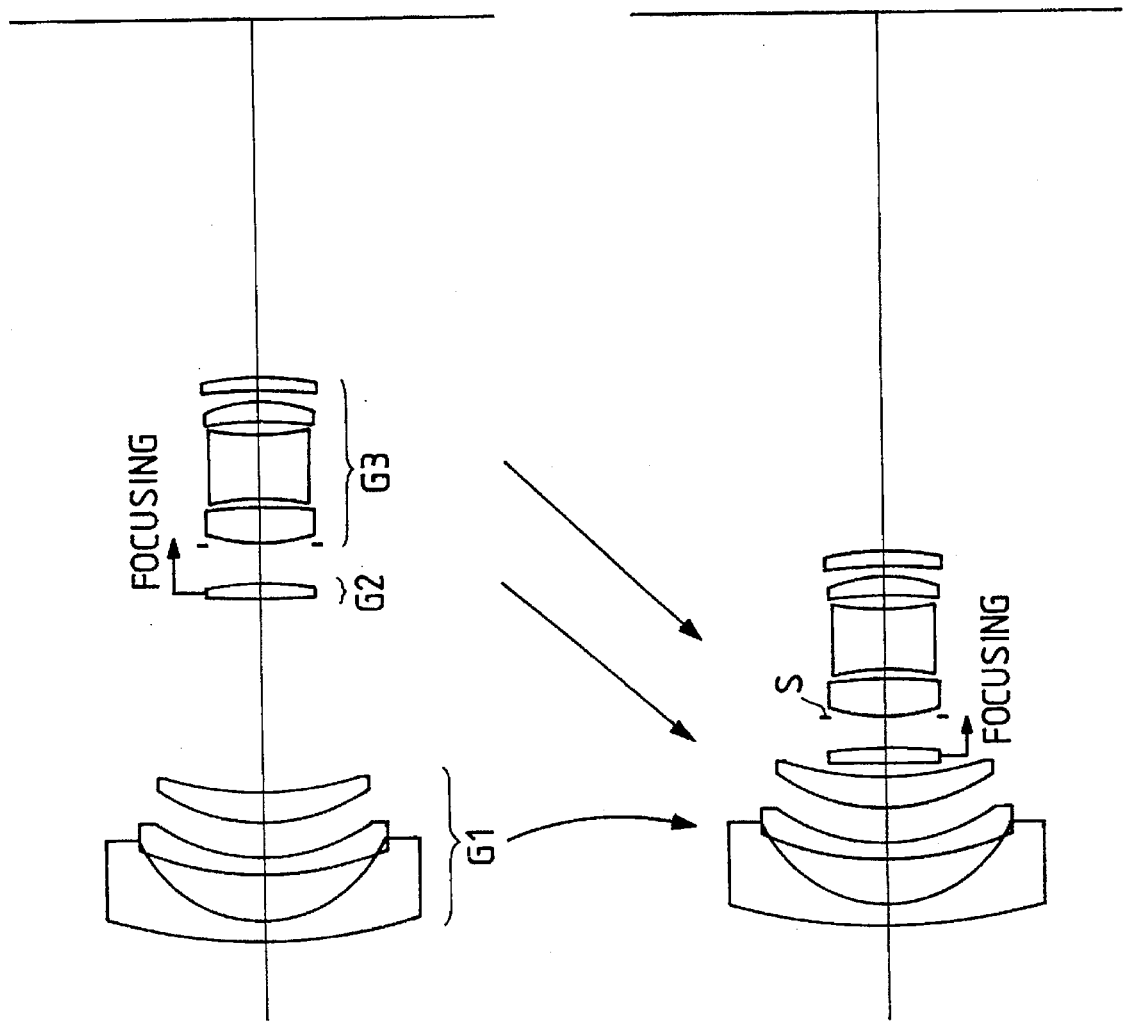
FIGS. 66A and 66B are views showing the configuration of an embodiment 16 of the present invention.
Figure 67A:
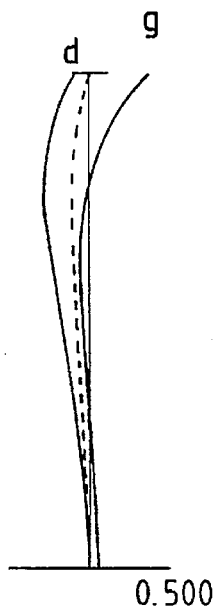
FIGS. 67A to 67C are aberration charts of the embodiment 16 at the wide angle end and at a phototaking distance R=inf.
Figure 67B:
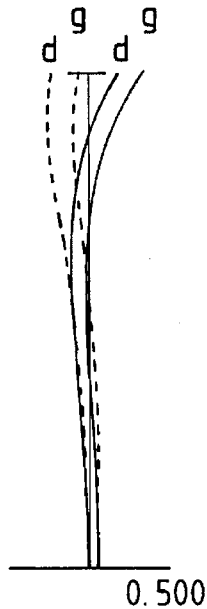
Figure 67C:
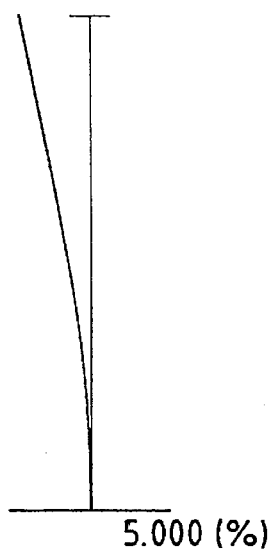
Figure 68A:
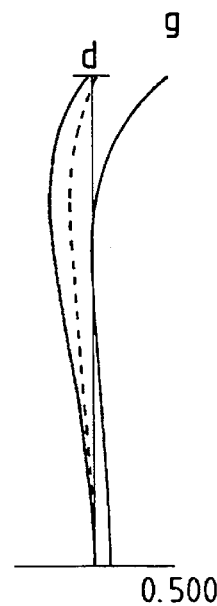
FIGS. 68A to 68C are aberration charts of the embodiment 16 at the telephoto end and at a phototaking distance R=inf.
Figure 68B:
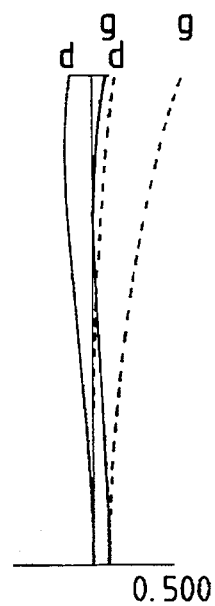
Figure 68C:
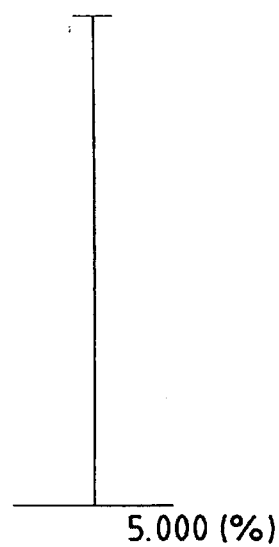
Figure 69A:
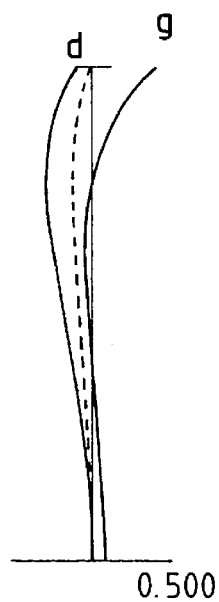
FIGS. 69A to 69C are aberration charts of the embodiment 16 at the wide angle end and at a phototaking distance R=500.
Figure 69B:
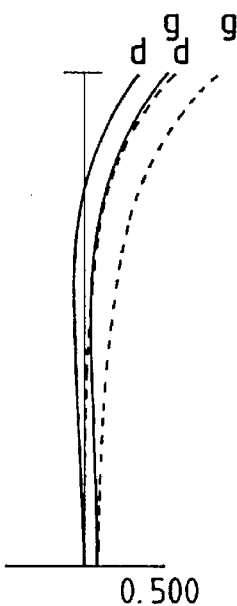
Figure 69C:
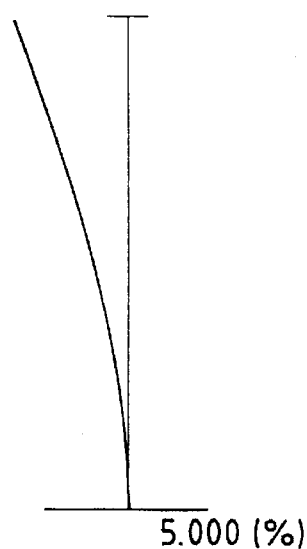
Figure 70A:
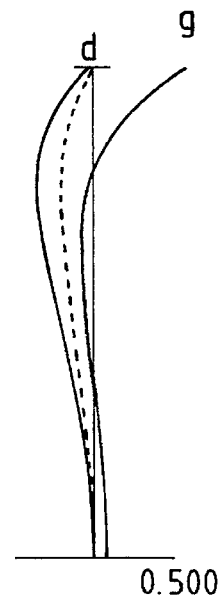
FIGS. 70A to 70C are aberration charts of the embodiment 16 at the telephoto end and at a phototaking distance R=500.
Figure 70B:
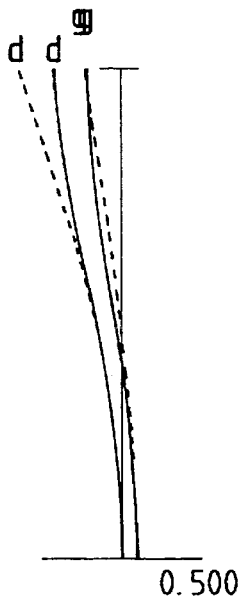
Figure 70C:
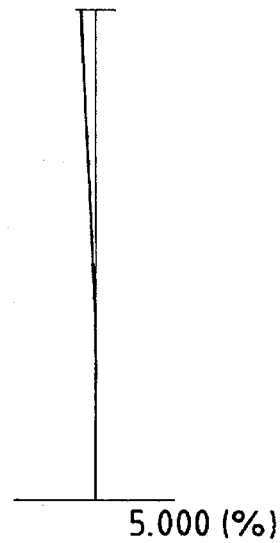

FIGS. 66A and 66B are views showing the configuration of the zoom lens of an embodiment 16, respectively at the wide angle end and at the telephoto end. The zoom lens is composed, in the order from the object side, of a negative first lens group G1, a positive second lens group G2, a diaphragm and a positive third lens group G3, wherein, at the zooming from the wide angle end to the telephoto end, the first lens groups moves toward the image side at the wide angle side and toward the object side at the telephoto side, while the second and third lens groups move toward the object side, the air gap between the first and second lens groups decreases and that between the second and third lens groups decreases.

The second lens face, from the object side, in the first lens group is an aspherical face, the shape of which is given by:

$$X(y)=y^2/r \cdot \{1+(1-k \cdot y^2/r^2)^{1/2}\}+C2 \cdot y^2+C4 \cdot y^4+C6 \cdot y^6+C8 \cdot y^8+C10 \cdot y^{10}$$

wherein X(y) is the axial distance from a tangential plane at the vertex of the aspherical face to a point of a height y on the aspherical face, r is the radius of paraxial curvature, k is the conical constant, and Ci is the i-th order aspherical coefficient.

The following Table 16 shows the parameters of the embodiment 16 of the present invention, wherein f is the focal length, F is the F-number and 2ω is the image angle. The numbers in the left-hand column indicate the order from the object side, r indicates the radius of curvature of the lens face, d is the distance between the lens faces, n and ν are the refractive index and the Abbe's number for d-line (λ=587.6 nm). R in the table of variable distances indicates the phototaking distance.

TABLE 16 f = 25.61 - 35.00 - 48.80
F/4.06 - 4.69 - 5.60
2ω =82.82 - 63.85 - 47.73°

| | r | d | ν | n |
|---|---|---|---|---|
| 1 | 68.0036 | 2.6507 | 53.8 | 1.69350 |
| 2 | 15.3447 | 5.8500 | | |
| 3 | 36.9646 | 2.3412 | 47.5 | 1.78797 |
| 4 | 24.6442 | 4.4493 | | |
| 5 | 23.7865 | 4.0233 | 25.5 | 1.73038 |
| 6 | 42.9447 | (d6) | | |
| 7 | 146.1275 | 2.1985 | 82.5 | 1.49782 |
| 8 | −41.3538 | (d8) | | |
| 9 | (diaphragm) | 0.1000 | | |
| 10 | 22.8142 | 5.0000 | 46.4 | 1.58267 |
| 11 | −43.2776 | 0.9000 | | |
| 12 | −25.4294 | 8.0000 | 31.6 | 1.75692 |
| 13 | 28.8306 | 1.7500 | | |
| 14 | −50.2391 | 2.7159 | 67.9 | 1.59319 |
| 15 | −17.9559 | 1.1000 | | |
| 16 | −65.7206 | 2.0333 | 82.5 | 1.49782 |
| 17 | −30.7708 | | | |

Aspherical coefficients of second face:

k=0.5871

C2=0.0000

C4=−7.3809E-10

C6=3.5998E-14

C8=−4.7697E-12

C10=1.8500E-14

Table of variable distances:

| f | 25.50 | 35.00 | 48.80 |
|---|---|---|---|
| R | inf | inf | inf |
| d6 | 25.03527 | 11.75045 | 1.61160 |
| d8 | 4.90539 | 4.45554 | 3.80098 |
| f | 25.50 | 35.00 | 48.80 |
| R | 500.00 | 500.00 | 500.00 |
| d6 | 28.14368 | 14.73325 | 4.71730 |
| d8 | 1.79698 | 1.47275 | 0.69528 |

Values corresponding to the conditions:

|f1|/fw=1.386 f2/f3=1.066 x2/x3=0.952 f2/(|f1|+e1w)=0.850 f2/(|f1|+e1t)=1.226

β2t=5.433

β2w=−5.672 f3/e3w=1.146 f3/e3t=0.798

FIGS. 67A to 67C and 68A to 68C are aberration charts of the embodiment 16 at a phototaking distance R=inf., respectively at the wide angle end and at the telephoto end, while FIGS. 69A to 69C and 70A to 70C are aberration charts of the embodiment 16 at a phototaking distance R=500, respectively at the wide angle end and at the telephoto end. In these charts, FNO indicates F-number, NA indicates numerical aperture, Y indicates image height, d indicates d-line (λ=587.6 nm) and g indicates g-line (λ=435.6 nm). In the astigmatism chart, the solid line and the broken line respectively indicate the sagittal and meridional planes.

These aberration charts indicate that the present embodiment is satisfactorily corrected for the various aberrations, and has excellent imaging performance.

[Embodiment 17]

Figure 71A:
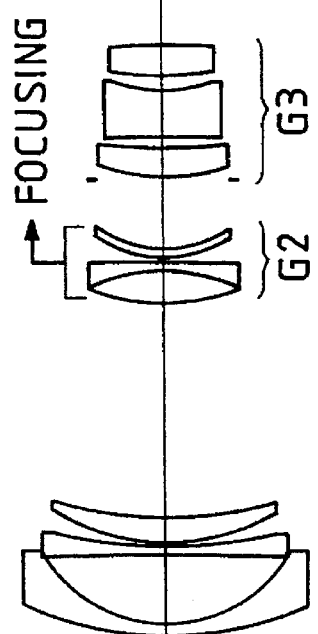
FIGS. 71A and 71B are views showing the configuration of an embodiment 17 of the present invention.
Figure 71B:
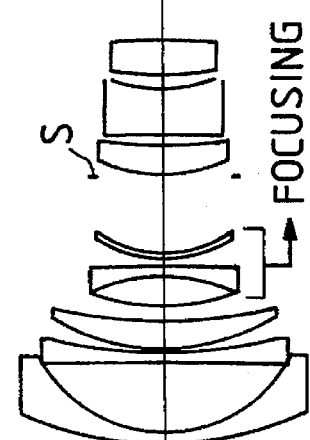
Figure 72A:
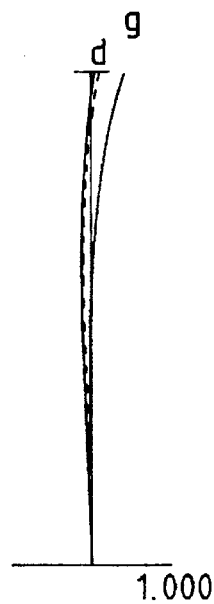
FIGS. 72A to 72C are aberration charts of the embodiment 17 at the wide angle end and at a phototaking distance R=inf.
Figure 72B:
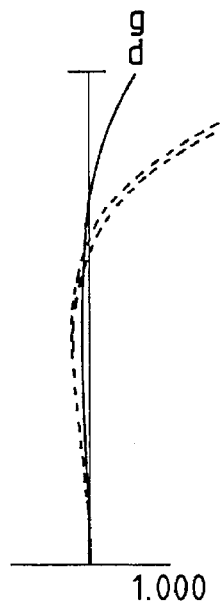
Figure 72C:
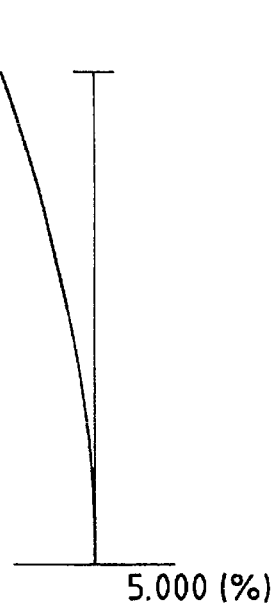
Figure 73A:
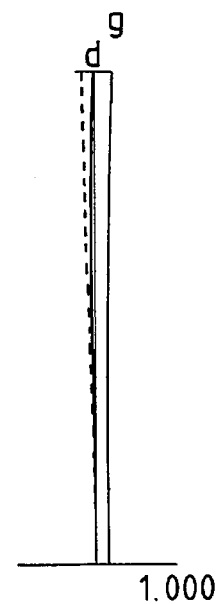
FIGS. 73A to 73C are aberration charts of the embodiment 17 at the telephoto end and at a phototaking distance R=inf.
Figure 73B:
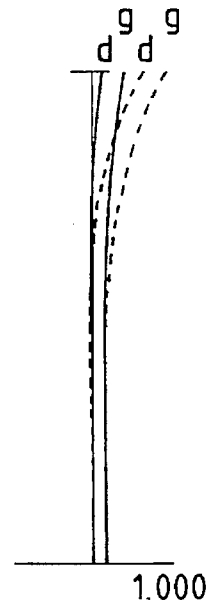
Figure 73C:
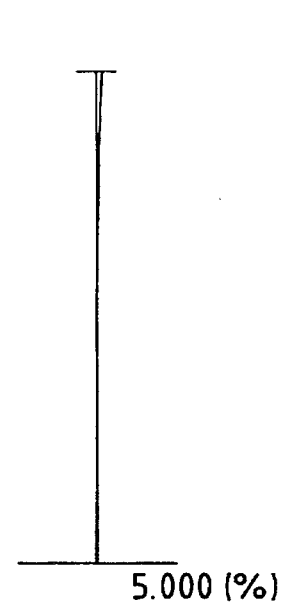
Figure 74A:
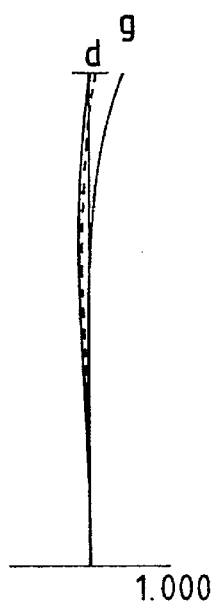
FIGS. 74A to 74C are aberration charts of the embodiment 17 at the wide angle end and at a phototaking distance R=500.
Figure 74B:
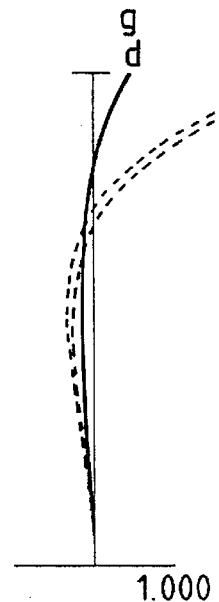
Figure 74C:
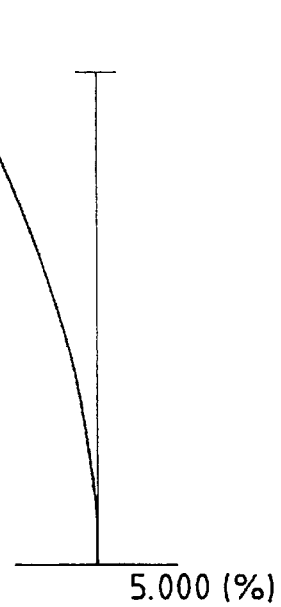
Figure 75A:
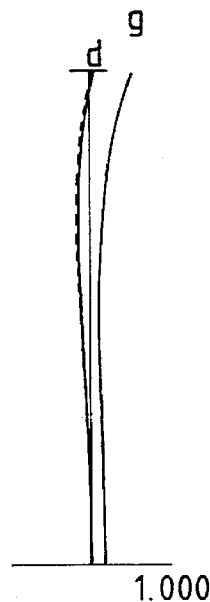
FIGS. 75A to 75C are aberration charts of the embodiment 17 at the telephoto end and at a phototaking distance R=500.
Figure 75B:
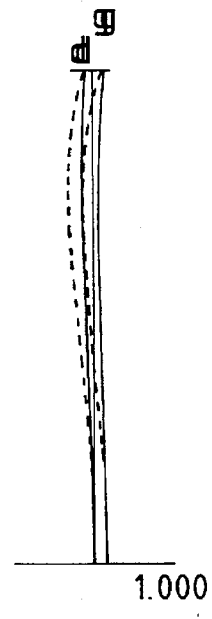
Figure 75C:
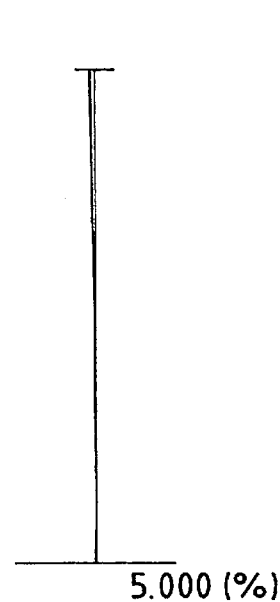

FIGS. 71A and 71B are views showing the configuration of the zoom lens of an embodiment 17, respectively at the wide angle end and at the telephoto end. The zoom lens is composed, in the order from the object side, of a negative first lens group G1, a positive second lens group G2, a diaphragm and a positive third lens group G3, wherein, at the zooming from the wide angle end to the telephoto end, the first lens group remains fixed while the second and third lens groups move toward the object side, the air gap between the first and second lens groups decreases and that between the second and third lens groups increases in the vicinity of the wide angle end and decreases in the vicinity of the telephoto end.

The focusing from a long object distance to a short object distance is achieved by a movement of the second lens group toward the image plane.

The following Table 17 shows the parameters of the embodiment 17 of the present invention, wherein f is the focal length, F is the F-number and $2\omega$ is the image angle. The numbers in the left-hand column indicate the order from the object side, r indicates the radius of curvature of the lens face, d is the distance between the lens faces, n and $\nu$ are the refractive index and the Abbe's number for d-line ($\lambda=587.6$ nm). R in the table of variable distances indicates the phototaking distance.

TABLE 17 f = 36.00 - 50.00 - 68.00
F/3.62 - 4.50 - 5.63
$2\omega$ = 65.13 - 47.14 - 35.15°

|   | r | d | v | n |
|---|---|---|---|---|
| 1 | 43.1721 | 1.7000 | 52.3 | 1.74810 |
| 2 | 18.7358 | 9.0000 | | |
| 3 | −1028.3813 | 1.2000 | 52.3 | 1.74810 |
| 4 | 58.6589 | 0.5000 | | |
| 5 | 28.5391 | 3.6000 | 28.6 | 1.79504 |
| 6 | 61.5275 | (d6) | | |
| 7 | 34.2399 | 4.0000 | 58.5 | 1.65160 |
| 8 | −23.8972 | 1.0000 | 38.0 | 1.60342 |
| 9 | 300.7253 | 1.0000 | | |
| 10 | 18.1228 | 1.0000 | 31.6 | 1.75692 |
| 11 | 15.5482 | (d11) | | |
| 12 | (diaphragm) | 0.2000 | | |
| 13 | 18.7977 | 4.0000 | 35.2 | 1.74950 |
| 14 | 45.2035 | 1.5000 | | |
| 15 | −292.0245 | 6.0000 | 28.3 | 1.72825 |
| 16 | 18.1901 | 2.0000 | | |
| 17 | 40.3435 | 4.5000 | 48.0 | 1.71700 |
| 18 | −63.6092 | | | |

Table of variable distances:

| f | 36.00 | 50.00 | 68.00 |
|---|---|---|---|
| R | inf | inf | inf |
| d6 | 27.81068 | 12.47948 | 2.00008 |
| d11 | 9.12937 | 13.42177 | 9.64957 |
| f | 36.00 | 50.00 | 68.00 |
| R | 500.00 | 500.00 | 500.00 |
| d6 | 33.94051 | 18.30951 | 7.96204 |
| d11 | 2.99954 | 7.59174 | 3.68761 |

Values corresponding to the conditions:
|f1|/fw=1.389
f2/f3=1.000
x2/x3=1.021
f2/(|f1|+e1w)=0.820
f2/(|f1|+e1t)=1.176
β2t=6.680
β2w=−4.566
f3/e3w=1.187 f3/e3t=0.831

FIGS. 72A to 72C and 73A to 73C are aberration charts of the embodiment 17 at a phototaking distance R=inf., respectively at the wide angle end and at the telephoto end, while FIGS. 74A to 74C and 75A to 75C are aberration charts of the embodiment 17 at a phototaking distance R=500, respectively at the wide angle end and at the telephoto end. In these charts, FNO indicates F-number, NA indicates numerical aperture, Y indicates image height, d indicates d-line ($\lambda=587.6$ nm) and g indicates g-line ($\lambda=435.6$ nm). In the astigmatism chart, the solid line and the broken line respectively indicate the sagittal and meridional planes.

These aberration charts indicate that the present embodiment is satisfactorily corrected for the various aberrations, and has excellent imaging performance.

[Embodiment 18]

The zoom lens of the embodiment 18 is the same, in the configuration and in the parameters, as that of the embodiment 11, except for the following values of the conditions, and the aberration charts are also the same as those of the embodiment 11:

Values corresponding to the conditions:
|f1|/fw=1.220
f2/f3=1.000
x2/x3=1.002
f2/(|f1|+e1w)=0.823
f2/(|f1|+e1t)=1.183
β2t=6.463
β2w=−4.660

[Embodiment 19]

Figures 76A, 76B:
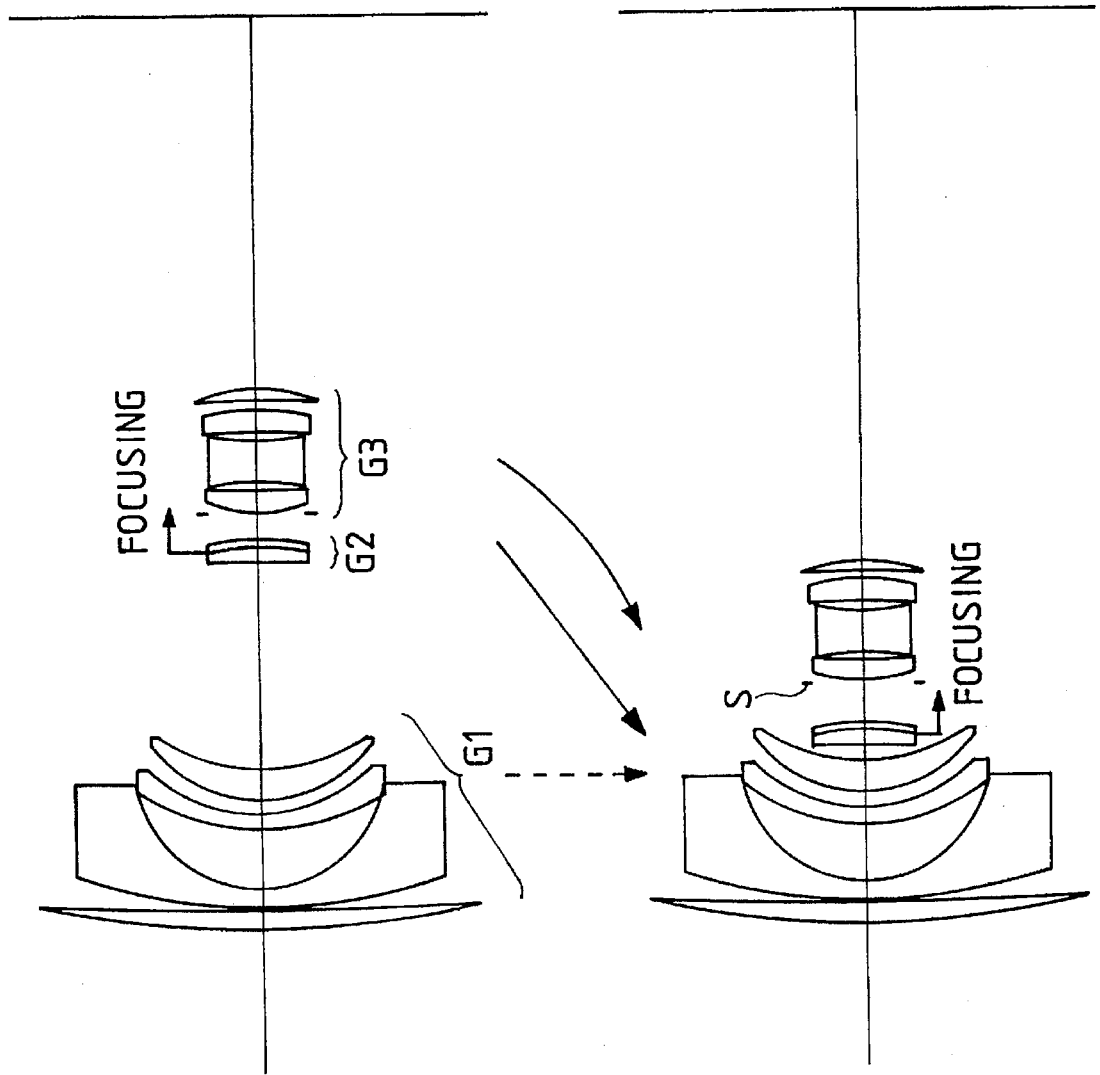
FIGS. 76A and 76B are views showing the configuration of an embodiment 19 of the present invention.
Figure 77A:
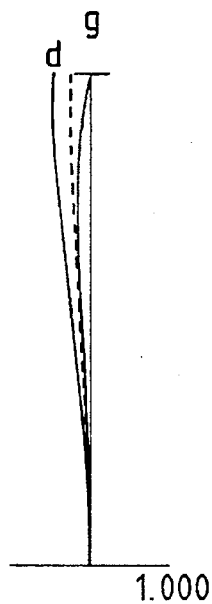
FIGS. 77A to 77C are aberration charts of the embodiment 19 at the wide angle end and at a phototaking distance R=inf.
Figure 77B:
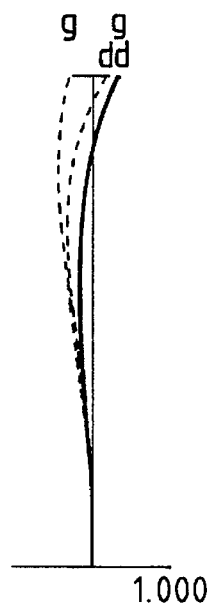
Figure 77C:
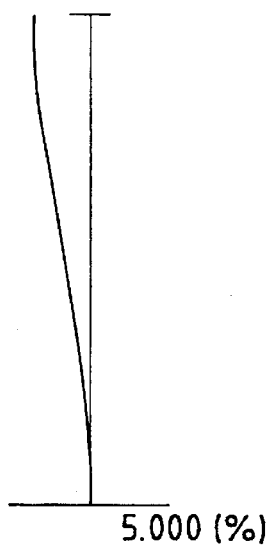
Figure 78A:
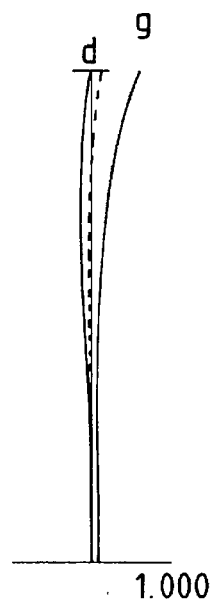
FIGS. 78A to 78C are aberration charts of the embodiment 19 at the telephoto end and at a phototaking distance R=inf.
Figure 78B:
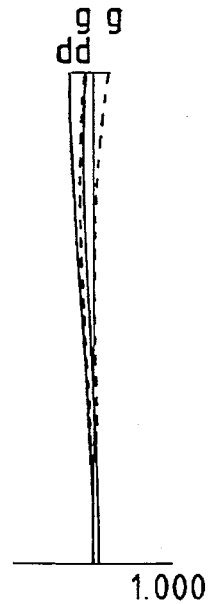
Figure 78C:
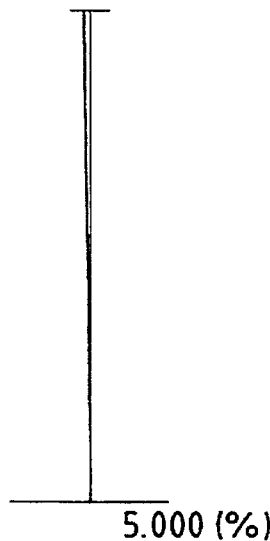
Figure 79A:
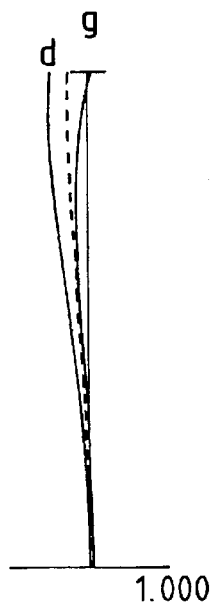
FIGS. 79A to 79C are aberration charts of the embodiment 19 at the wide angle end and at a phototaking distance R=500.
Figure 79B:
Figure 79C:
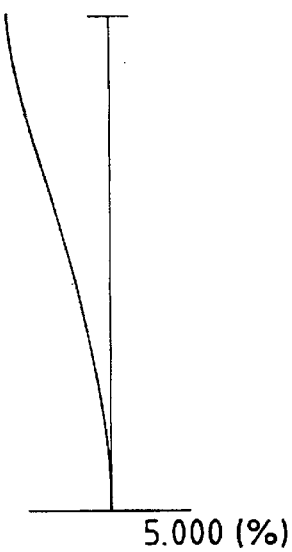
Figure 80A:
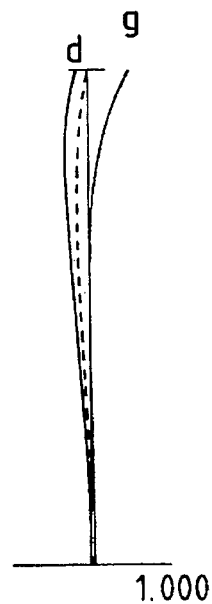
FIGS. 80A to 80C are aberration charts of the embodiment 19 at the telephoto end and at a phototaking distance R=500.
Figure 80B:
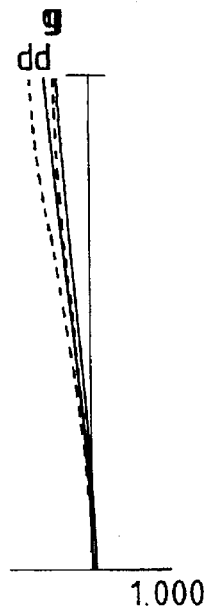
Figure 80C:
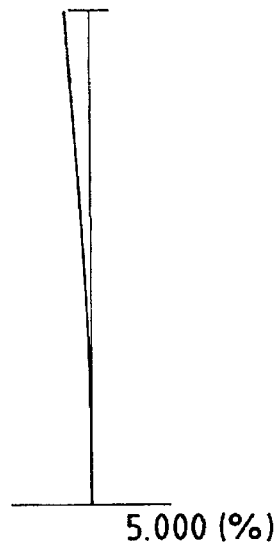

FIGS. 76A and 76B are views showing the configuration of the zoom lens of an embodiment 19, respectively at the wide angle end and at the telephoto end. The zoom lens is composed, in the order from the object side, of a negative first lens group G1, a positive second lens group G2, a diaphragm and a positive third lens group G3, wherein, at the zooming from the wide angle end to the telephoto end, the first lens group remains fixed while the second and third lens groups move toward the object side, the air gap between the first and second lens groups decreases and that between the second and third lens groups increases in the vicinity of the wide angle end and decreases in the vicinity of the telephoto end.

The fourth lens face, from the object side, in the first lens group is an aspherical face, the shape of which is given by:

$$X(y)=y^2/r \cdot \{1+(1-k \cdot y^2/r^2)^{1/2}\}]+C2 \cdot y^2+C4 \cdot y^4+C6 \cdot y^6+C8 \cdot y^8+C10 \cdot y^{10}$$

wherein X(y) is the axial distance from a tangential plane at the vertex of the aspherical face to a point of a height y on the aspherical face, r is the radius of paraxial curvature, k is the conical constant, and Ci is the i-th order aspherical coefficient.

The focusing from a long object distance to a short object distance is achieved by a movement of the second lens group toward the image plane.

The following Table 19 shows the parameters of the embodiment 19 of the present invention, wherein f is the focal length, F is the F-number and $2\omega$ is the image angle. The numbers in the left-hand column indicate the order from the object side, r indicates the radius of curvature of the lens face, d is the distance between the lens faces, n and $\nu$ are the refractive index and the Abbe's number for d-line ($\lambda=587.6$ nm). R in the table of variable distances indicates the phototaking distance.

TABLE 19 f = 24.50 - 35.00 - 49.00
F/3.97 - 4.63 - 5.62
2ω = 84.70 - 63.27 - 47.72°

|  | r | d | ν | n |
|---|---|---|---|---|
| 1 | 137.5419 | 2.7692 | 64.1 | 1.51680 |
| 2 | 777.1284 | 0.2769 |  |  |
| 3 | 73.3356 | 2.3077 | 60.0 | 1.64000 |
| 4 | 14.8646 | 7.8000 |  |  |
| 5 | 28.8487 | 2.0000 | 55.6 | 1.69680 |
| 6 | 21.1112 | 2.0000 |  |  |
| 7 | 18.2571 | 4.0000 | 25.5 | 1.73038 |
| 8 | 24.0542 | (d8) |  |  |
| 9 | 192.6173 | 2.1357 | 60.7 | 1.56384 |
| 10 | -34.0596 | 0.9286 | 28.6 | 1.79504 |
| 11 | -41.2855 | (d11) |  |  |
| 12 | (diaphragm) | 0.3000 |  |  |
| 13 | 18.8781 | 2.7290 | 42.0 | 1.66755 |
| 14 | 67.5287 | 1.1706 |  |  |
| 15 | -29.6285 | 5.5702 | 31.6 | 1.75692 |
| 16 | 29.1265 | 1.0909 |  |  |
| 17 | -182.8014 | 3.2751 | 67.9 | 1.59319 |
| 18 | -27.2905 | 0.7839 |  |  |
| 19 | -104.5100 | 1.8182 | 64.1 | 1.51680 |
| 20 | -19.9302 |  |  |  |

Aspherical coefficients of fourth face:
k=0.7165
C2=0.0000
C4=-7.8400E-7
C6=1.2600E-9
C8=-4.7300E-12
C10=1.9400E-14

| Table of variable distances: | | | |
|---|---|---|---|
| f | 24.50 | 35.00 | 49.00 |
| R | inf | inf | inf |
| d8 | 27.37057 | 11.99727 | 1.93247 |
| d11 | 3.43385 | 8.59145 | 5.24725 |
| f | 24.50 | 35.00 | 49.00 |
| R | 500.00 | 500.00 | 500.00 |
| d8 | 30.51639 | 15.09256 | 5.19064 |
| d11 | 0.28803 | 5.49616 | 1.98908 |

Values corresponding to the conditions:
|f1|/fw=1.469
f2/f3=1.182
x2/x3=1.077
f2/(|f1|+e1w)=0.868
f2/(|f1|+e1t)=1.315
β2t=4.170
β2w=-6.598
f3/e3w=1.115
f3/e3t=0.754

FIGS. 77A to 77C and 78A to 78C are aberration charts of the embodiment 19 at a phototaking distance R=inf., respectively at the wide angle end and at the telephoto end, while FIGS. 79A to 79C and 80A to 80C are aberration charts of the embodiment 19 at a phototaking distance R=500, respectively at the wide angle end and at the telephoto end. In these charts, FNO indicates F-number, NA indicates numerical aperture, Y indicates image height, d indicates d-line (λ=587.6 nm) and g indicates g-line (λ=435.6 nm). In the astigmatism chart, the solid line and the broken line respectively indicate the sagittal and meridional planes.

These aberration charts indicate that the present embodiment is satisfactorily corrected for the various aberrations, and has excellent imaging performance.

[Embodiment 20]

The zoom lens of the embodiment 20 is the same, in the configuration and in the parameters, except for the following values corresponding to the conditions, as that of the embodiment 10, and the aberration charts are also the same as those of the embodiment 10:

Values corresponding to the conditions:
|f1|/fw=1.358
f2/f3=1.157
x2/x3=1.101
f2/(|f1|+e1w)=0.835
f2/(|f1|+e1t)=1.238
β2t=5.205
β2w=-5.075

[Embodiment 21]

Figures 81A, 81B:
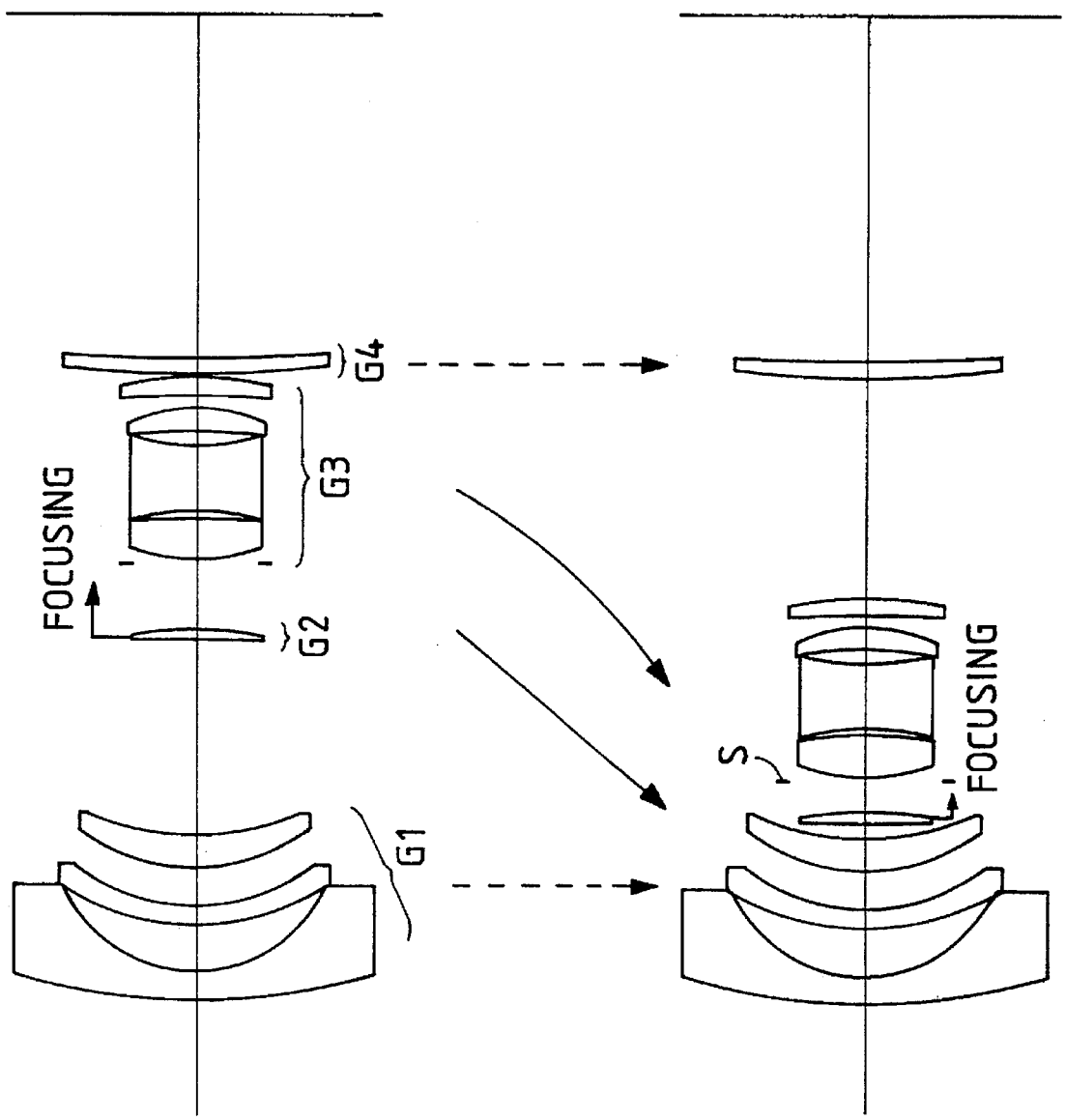
FIGS. 81A and 81B are views showing the configuration of an embodiment 21 of the present invention.
Figure 82A:
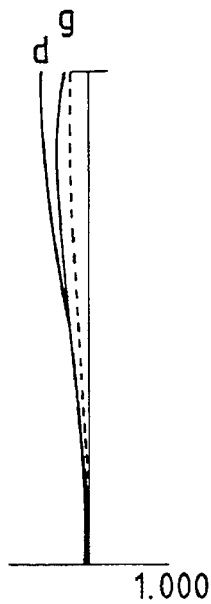
FIGS. 82A to 82C are aberration charts of the embodiment 21 at the wide angle end and at a phototaking distance R=inf.
Figure 82B:
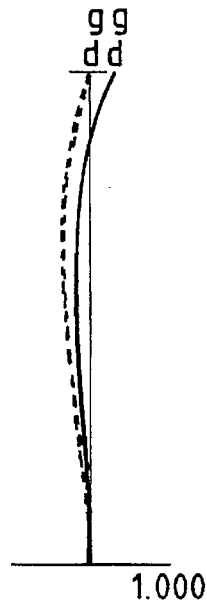
Figure 82C:
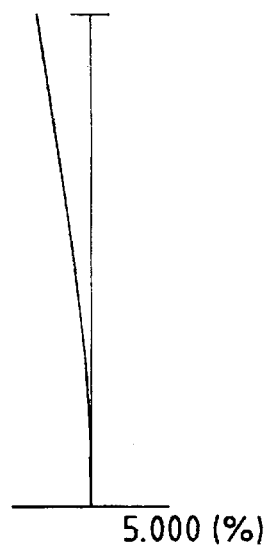
Figure 83A:
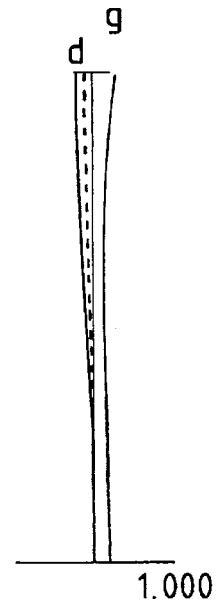
FIGS. 83A to 83C are aberration charts of the embodiment 21 at the telephoto end and at a phototaking distance R=inf.
Figure 83B:
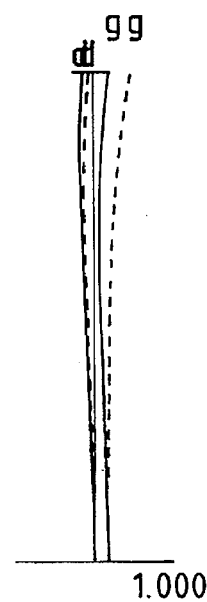
Figure 83C:
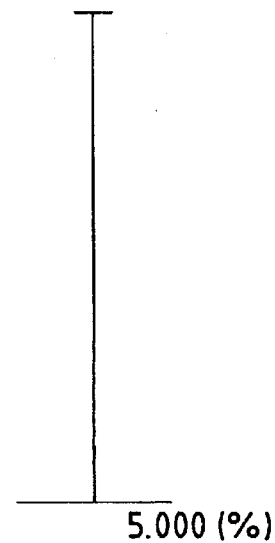
Figure 84A:
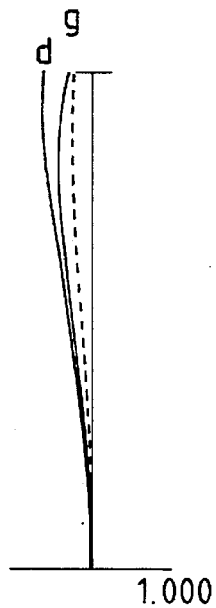
FIGS. 84A to 84C are aberration charts of the embodiment 21 at the wide angle end and at a phototaking distance R=500.
Figure 84B:
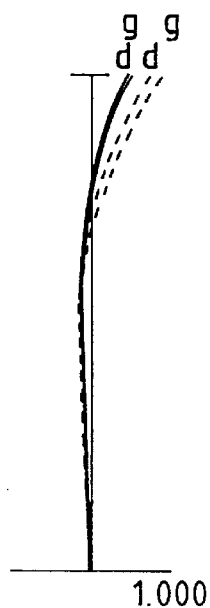
Figure 84C:
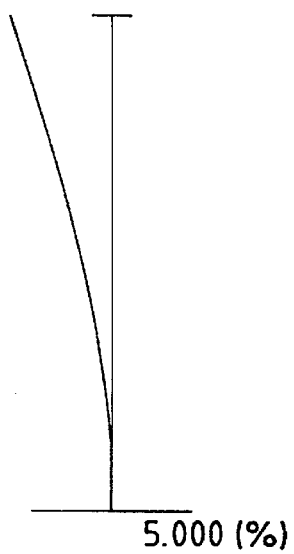
Figure 85A:
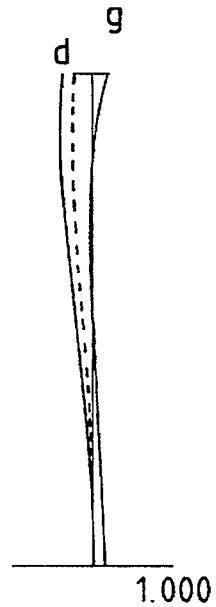
FIGS. 85A to 85C are aberration charts of the embodiment 21 at the telephoto end and at a phototaking distance R=500.
Figure 85B:
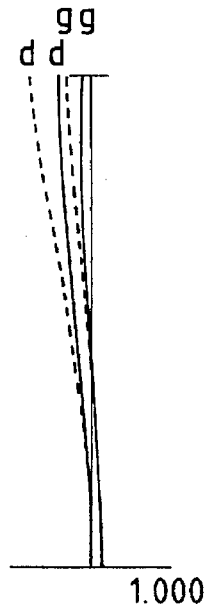
Figure 85C:
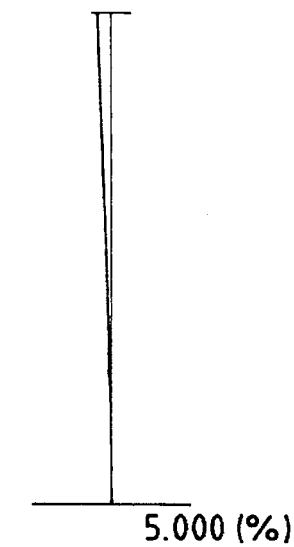

FIGS. 81A and 81B are views showing the configuration of the zoom lens of an embodiment 21, respectively at the wide angle end and at the telephoto end. The zoom lens is composed, in the order from the object side, of a negative first lens group G1, a positive second lens group G2, a diaphragm, a positive third lens group G3 and a positive fourth lens group G4, wherein, at the zooming from the wide angle end to the telephoto end, the first and fourth lens groups remain fixed while the second and third lens groups move toward the object side, the air gap between the first and second lens groups decreases while that between the second and third lens groups increases in the vicinity of the wide angle end and decreases in the vicinity of the telephoto end, and that between the third and fourth lens groups increases.

The second lens face, from the object side, in the first lens group is an aspherical face, the shape of which is given by:

$$X(y)=y^2/[r\cdot\{1+(1-k\cdot y^2/r^2)^{1/2}\}]+C2\cdot y^2+C4\cdot y^4+C6\cdot y^6+C8\cdot y^8+C10\cdot y^{10}$$

wherein X(y) is the axial distance from a tangential plane at the vertex of the aspherical face to a point of a height y on the aspherical face, r is the radius of paraxial curvature, k is the conical constant, and Ci is the i-th order aspherical coefficient.

The focusing from a long object distance to a short object distance is achieved by a movement of the second lens group toward the image plane.

The following Table 21 shows the parameters of the embodiment 21 of the present invention, wherein f is the focal length, F is the F-number and 2ω is the image angle. The numbers in the left-hand column indicate the order from the object side, r indicates the radius of curvature of the lens face, d is the distance between the lens faces, n and ν are the refractive index and the Abbe's number for d-line (λ=587.6 nm). R in the table of variable distances indicates the phototaking distance.

TABLE 21 f = 25.50 - 35.00 - 49.00
F/3.47 - 4.11 - 4.73
2ω = 82.56 - 62.90 - 47.60°

|  | r | d | ν | n |
|---|---|---|---|---|
| 1 | 79.6622 | 3.0000 | 58.5 | 1.61272 |
| 2 | 14.9036 | 5.9348 |  |  |
| 3 | 30.1296 | 2.3751 | 45.4 | 1.79668 |
| 4 | 22.5872 | 4.5000 |  |  |

TABLE 21-continued f = 25.50 - 35.00 - 49.00
F/3.47 - 4.11 - 4.73
2ω = 82.56 - 62.90 - 47.60°

| | r | d | ν | n |
|---|---|---|---|---|
| 5 | 22.4103 | 4.0000 | 25.5 | 1.73038 |
| 6 | 33.2972 | (d6) | | |
| 7 | 143.1473 | 1.6000 | 82.5 | 1.49782 |
| 8 | −38.4004 | (d8) | | |
| 9 | (diaphragm) | 0.5000 | | |
| 10 | 21.8482 | 5.0000 | 47.0 | 1.56013 |
| 11 | −55.8544 | 0.9429 | | |
| 12 | −28.8504 | 7.5429 | 31.1 | 1.68893 |
| 13 | 26.3305 | 1.8333 | | |
| 14 | −46.0254 | 2.8452 | 67.9 | 1.59319 |
| 15 | −18.8797 | 1.5000 | | |
| 16 | −91.7202 | 2.1300 | 82.5 | 1.49782 |
| 17 | −36.7451 | (d17) | | |
| 18 | 161.9599 | 2.0000 | 64.1 | 1.51680 |
| 19 | 432.1271 | | | |

Aspherical coefficients of second face:
k=0.5590
C2=0.0000
C4=1.9300E-7
C6=3.1800E-9
C8=−3.0000E-12
C10=8.0000E-14

| Table of variable distances: | | | |
|---|---|---|---|
| f | 25.85 | 35.00 | 48.80 |
| R | inf | inf | inf |
| d6 | 23.11846 | 10.70690 | 1.65476 |
| d8 | 7.95829 | 9.59439 | 3.51470 |
| d17 | 0.46783 | 11.24329 | 26.37513 |
| f | 25.85 | 35.00 | 48.80 |
| R | 500.00 | 500.00 | 500.00 |
| d6 | 26.13220 | 13.62221 | 4.65526 |
| d8 | 4.94455 | 6.67908 | 0.51420 |
| d17 | 0.46783 | 11.24329 | 26.37513 |

Values corresponding to the conditions:
|f1|/fw=1.373
f2/f3=0.953
x2/x3=0.828
f2/(|f1|+e1w)=0.852
f2/(|f1|+e1t)=1.206
β2t=5.860
β2w=−5.746

FIGS. 82A to 82C and 83A to 83C are aberration charts of the embodiment 21 at a phototaking distance R=inf., respectively at the wide angle end and at the telephoto end, while FIGS. 84A to 84C and 85A to 85C are aberration charts of the embodiment 21 at a phototaking distance R=500, respectively at the wide angle end and at the telephoto end. In these charts, FNO indicates F-number, NA indicates numerical aperture, Y indicates image height, d indicates d-line (λ=587.6 nm) and g indicates g-line (λ=435.6 nm). In the astigmatism chart, the solid line and the broken line respectively indicate the sagittal and meridional planes.

These aberration charts indicate that the present embodiment is satisfactorily corrected for the various aberrations, and has excellent imaging performance.

According to second and third aspects of the present invention, as explained in the foregoing, there can be realized a zoom lens capable, even in the use of the inner focusing method, of maintaining the amount of focusing movement of the focusing lens group substantially constant for a given object distance regardless of the zoom position, whereby the high-speed lens drive in the auto focusing and the convenience of manipulation in the manual focusing can both be achieved. Also, the use of the inner focusing method allows for fixing the lens group closest to the object side, so that the zoom lens of the present invention is suitable for use in a waterdrop-proof, water-proof or dust-proof camera.

Furthermore, correcting of vibration is possible by moving one of the lens groups in a direction perpendicular to the optical axis. The relatively small second or third lens group is preferably selected for the correction of vibration in order to make more compact the driving mechanism therefor.

What is claimed is:

1. A zoom lens comprising at least, in order from the object side, a first lens group of a negative refractive power that is closer to the object side than any other lens group of the zoom lens, a second lens group of a positive refractive power, a third lens group of a positive refractive power, a fourth lens group of a negative refractive power, and a fifth lens group of a positive refractive power, wherein, in the zooming operation from the wide angle end to the telephoto end, the distance between the first and second lens groups decreases, the distance between the second and third lens groups varies, the distance between the third and fourth lens groups increases, the distance between the fourth and fifth lens groups decreases, and the following condition is satisfied:

$$0.3 < f2/f3 < 3$$

wherein f2: focal length of the second lens group; and f3: focal length of the third lens group.

2. A zoom lens according to claim 1, wherein the focusing operation from a long object distance to a short object distance is executed by a movement of said second lens group toward the image plane.

3. A zoom lens according to claim 1, wherein, in the zooming operation from the wide angle end to the telephoto end, the first lens group remains fixed.

4. A zoom lens according to claim 3, wherein, in the zooming operation from the wide angle end to the telephoto end, the fourth lens group remains fixed.

5. A zoom lens according to claim 3, wherein, in the zooming operation from the wide angle end to the telephoto end, the third and fifth lens groups move integrally toward the object side.

6. A zoom lens according to claim 1, wherein, in the zooming operation from the wide angle end to the telephoto end, the first and fourth lens groups remain fixed, and the third and fifth lens groups move integrally toward the object side.

7. A zoom lens comprising at least, in order from the object side, a first lens group of a negative refractive power that is closer to the object side than any other lens group of the zoom lens, a second lens group of a positive refractive power, a third lens group of a positive refractive power, a fourth lens group of a negative refractive power, and a fifth lens group of a positive refractive power, wherein, in the zooming operation from the wide angle end to the telephoto end, the distance between the first and second lens groups decreases, the distance between the second and third lens groups increases, the distance between the third and fourth lens groups increases, and the distance between the fourth and fifth lens groups decreases.

8. A zoom lens according to claim 7, wherein the focusing operation from a long object distance to a short object distance is executed by a movement of said second lens group toward the image plane.

9. A zoom lens comprising, in order from the object side, a first lens group of a negative refractive power that is closer to the object side than any other lens group of the zoom lens, a second lens group of a positive refractive power, a third lens group of a positive refractive power, a fourth lens group of a negative refractive power, and a fifth lens group of a positive refractive power, wherein, in the zooming operation from the wide angle end to the telephoto end, the distance between said first and second lens groups decreases, the distance between said second and third lens groups varies, the distance between said third and fourth lens groups increases, and the distance between said fourth and fifth lens groups decreases.

10. A zoom lens according to claim 9, wherein the focusing operation from a long object distance to a short object distance is executed by a movement of said second lens group toward the image plane.

11. A zoom lens according to claim 9, wherein, in the zooming operation, said first lens group remains fixed.

* * * * *